(12) United States Patent
Vunjak-Novakovic et al.

(10) Patent No.: US 12,529,022 B2
(45) Date of Patent: Jan. 20, 2026

(54) HUMAN ORGAN-ON-CHIP MODELS FOR PREDICTIVE SCREENING

(71) Applicant: The Trustees of Columbia University in the City of New York, New York, NY (US)

(72) Inventors: Gordana Vunjak-Novakovic, New York, NY (US); Keith Yeager, Springfield, NJ (US); Kacey Ronaldson, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 1159 days.

(21) Appl. No.: 17/159,037

(22) Filed: Jan. 26, 2021

(65) Prior Publication Data

US 2021/0230527 A1    Jul. 29, 2021

Related U.S. Application Data

(63) Continuation of application No. PCT/US2019/043722, filed on Jul. 26, 2019.
(Continued)

(51) Int. Cl.
*C12M 3/00* (2006.01)
*C12M 1/00* (2006.01)
(Continued)

(52) U.S. Cl.
CPC ............ *C12M 21/08* (2013.01); *C12M 23/12* (2013.01); *C12M 23/16* (2013.01); *C12M 23/44* (2013.01); *C12M 27/16* (2013.01); *C12M 29/00* (2013.01)

(58) Field of Classification Search
CPC ...... C12M 21/08; C12M 23/12; C12M 23/16; C12M 23/44; C12M 25/04; C12M 27/16; C12M 29/00
See application file for complete search history.

(56) References Cited

U.S. PATENT DOCUMENTS 6,218,182 B1   4/2001   Naughton et al.
6,979,308 B1   12/2005  MacDonald et al.
(Continued)

FOREIGN PATENT DOCUMENTS

WO   2013086486 A1   12/2012
WO   2013086329 A1   6/2013
(Continued)

OTHER PUBLICATIONS

International Search Report and Written Opinion cited in corresponding International Application No. PCT/US2019/043722 dated Oct. 16, 2019.
(Continued)

*Primary Examiner* — Lydia Edwards
(74) *Attorney, Agent, or Firm* — Amster, Rothstein & Ebenstein LLP

(57) ABSTRACT

An integrated modular microphysiological system is provided which includes a two or more chambers and a vascular network which includes at least one channel. The chamber can be configured for culturing a tissue and includes a layer of endothelial cells which forms an endothelial barrier within the well. The endothelial barrier can be in fluid contact with at least one of the at least one channels in the vascular network. The endothelial barrier can also be in fluid contact with a fluid in the chamber.

21 Claims, 49 Drawing Sheets

Related U.S. Application Data

(60) Provisional application No. 62/711,221, filed on Jul. 27, 2018.

(51) Int. Cl.
*C12M 1/32* (2006.01)
*C12M 3/06* (2006.01)

(56) References Cited

U.S. PATENT DOCUMENTS

| | | | |
|---|---|---|---|
| 7,198,940 | B2 | 4/2007 | Vellinger et al. |
| 7,604,987 | B2 | 10/2009 | Hutmacher et al. |
| 7,919,062 | B2 | 4/2011 | Yuen |
| 8,492,140 | B2 | 7/2013 | Smith et al. |
| 8,748,180 | B2 | 6/2014 | Shuler et al. |
| 9,725,687 | B2 | 8/2017 | Wikswo et al. |
| 10,913,925 | B2 | 2/2021 | Cuiffi et al. |
| 2004/0132184 | A1 | 7/2004 | Dennis et al. |
| 2007/0038384 | A1 | 2/2007 | Kirk et al. |
| 2011/0250585 | A1 | 10/2011 | Ingber et al. |
| 2013/0316396 | A1* | 11/2013 | Fricking ............... C12M 33/14 435/297.1 |
| 2014/0094388 | A1 | 4/2014 | Wakatsuki |
| 2014/0212964 | A1* | 7/2014 | Cuiffi ............... C12M 23/44 435/325 |
| 2014/0335496 | A1 | 11/2014 | Grego et al. |
| 2015/0087004 | A1 | 3/2015 | Chen et al. |
| 2016/0015860 | A1 | 1/2016 | Murry et al. |
| 2016/0130555 | A1 | 5/2016 | Ruohola-Baker et al. |
| 2016/0201037 | A1 | 7/2016 | Tuan et al. |
| 2017/0016875 | A1 | 1/2017 | Parker et al. |
| 2017/0226457 | A1 | 8/2017 | Mosig et al. |
| 2017/0227525 | A1 | 8/2017 | Griffith et al. |

FOREIGN PATENT DOCUMENTS

| | | |
|---|---|---|
| WO | 2013184527 | 12/2013 |
| WO | 2014085933 | 6/2014 |
| WO | 2014201254 | 12/2014 |
| WO | 2015013210 | 1/2015 |
| WO | 2015054383 | 4/2015 |
| WO | 2015061907 | 5/2015 |
| WO | 2015084168 | 6/2015 |
| WO | 2016004394 | 1/2016 |
| WO | 2016174607 | 11/2016 |
| WO | 2016183143 | 11/2016 |
| WO | 2016191179 | 12/2016 |
| WO | 2017059173 A1 | 4/2017 |
| WO | 2018052953 A1 | 3/2018 |
| WO | 2018071354 A1 | 4/2018 |
| WO | 2018090035 A1 | 5/2018 |

OTHER PUBLICATIONS

Edington CD et al., "Interconnected microphysiological systems for quantitative biology and pharmacology studies", Sci Rep, vol. 8 / Issue 1, pp. 4530, Mar. 2018.
N. Tsamandouras et al., "Integrated gut and liver microphysiological systems for quantitative in vitro pharmacokinetic studies", AAPS J, vol. 19 / Issue 5, pp. 1499-1512, Sep. 2017.
H. Lee et al., "A pumpless multi organ-on-a-chip (MOC) combined with a pharmacokinetic-pharmacodynamic (PK-PD) model", Biotechnol Bioeng, vol. 114 / Issue 2, pp. 432-443, Feb. 2017.
C. Maass et al., "Establishing quasi-steady state operations of microphysiological systems (MPS) using tissue-specific metabolic dependencies", Sci Rep, vol. 8 / Issue 1, pp. 8015, May 2018.
S. Sances et al., "Human iPSC-derived endothelial cells and microengineered organ-chip enhance neuronal development", Stem Cell Reports, vol. 10 / Issue 4,pp. 1222-1236,Apr. 2018.
Leong KW, "Integrated microphysiological system of cerebral organoid and blood vessel for disease modeling and neuropsychiatric drug screening", Awardee Organization: Columbia University Health Sciences, NIH Grant #: 1UG3TR002151-01.
Schuler ML, "Integration of a kidney module into a 4-organ human-on-a-chip system", Awardee Organization: Hesperos, LLC, NIH Grant #: 1R43DK116589-01.
Sebastian Schaaf, Aya Shibamiya, Marco Mewe, Alexandra Eder, Andrea Stöhr, Marc N. Hirt, Thomas Rau, Wolfram-Hubertus Zimmermann, Lenard Conradi, Thomas Eschenhagen, Arne Hansen, Human Engineered Heart Tissue as a Versatile Tool in Basic Research and Preclinical Toxicology, PLoS ONE Oct. 20, 2011 6(10): e26397, https://doi.org/10.1371/journal.pone.0026397.
Caspi O, Lesman A, Basevitch Y, Gepstein A, Arbel G, Habib IH, Gepstein L, Levenberg S., Tissue Engineering of Vascularized Cardiac Muscle from Human Embryonic Stem Cells, Circulation Research Jan. 11, 2007; 100: pp. 263-272.
L. T. Shenje, P. Andersen, M. K. Halushka, C. Lui, L. Fernandez, G. B. Collin, N. Amat-Alarcon, W. Meschino, E. Cutz, K. Chang, R. Yonescu, D. A. S. Batista, Y. Chen, S. Chelko, J. E. Crosson, J. Scheel, L. Vricella, B. D. Craig, B. A. Marosy, D. W. Mohr, K. N. Hetrick, J. M. Romm, L. F. Scott, D. Valle, J. K. Naggert, C. Kwon, K. F. Doheny, D. P. Judge, Mutations in Alström Protein Impair Terminal Differentiation of Cardiomyocytes, Nature Communications, Mar. 4, 2014, vol. 5, Article No. 3416.
Li H, Sun S, Liu H, Chen H, Rong X, Lou J, Yang Y, Yang Y, Liu H, Use of a biological reactor and platelet-rich plasma for the construction of tissue-engineered bone to repair articular cartilage defects, Exp. Ther. Med. Aug. 2016, vol. 12(2) pp. 711-719.
Masuda S, Shimizu T, Three-dimensional cardiac tissue fabrication based on cell sheet technology, Adv. Drug Deliv. Rev. Jan. 2016, vol. 96 pp. 103-109.
Ramachandran SD, Schirmer K, Munst B, Heinz S, Ghafoory S, Wolfl S, Simon-Keller K, Marxa Oie CI, Ebert MP, Walles H, Braspenning J, Breitkopf-Heinlein K, In Vitro Generation of Functional Liver Organoid-Like Structures Using Adult Human Cells, PLoS One, Oct. 2015, vol. 10(10) pp. e0139345.
De Peppo GM, Vunjak-Novakovic G, Marolt D, Cultivation of human bone-like tissue from pluripotent stem cell-derived osteogenic progenitors in perfusion bioreactors, Methods Mol. Biol. 2014 vol. 1202 pp. 173-184.
Bhumiratana S, Bernhard JC, Alfi DM, Yeager K, Eton RE, Bova J, Shah F, Gimble JM, Lopez MJ, Eisig SB, Vunjak-Novakovic G, Tissue-engineered autologous grafts for facial bone reconstruction, Sci. Transl. Med. Jun. 2016, vol. 8(343) pp. 343ra83.
Ding M, Henrikesen SS, Wendt D, Overgaard S, An automated perfusion bioreactor for the streamlined production of engineered osteogenic grafts, J. Biomed. Mater. Res. B Appl. Biomate., Apr. 2016, vol. 104(3) pp. 532-537.
Figallo E, Cannizzaro C, Gerecht S, Burdick JA, Langer R, Elvassore N, Vunjak-Novakovic G, Micro-bioreactor array for controlling cellular environments, Lab Chip, Jun. 2007, vol. 7(6) pp. 710-719.
Hansmann J, Groeber F, Kahlig A, Kleinhans C, Walles H., Bioreactors in tissue engineering—principles, applications and commercial constraints. Biotechnol. J., Mar. 2013, 8(3) pp. 298-307.
Wang Z, Kim K., Organ-on-a-Chip Platforms for Drug Screening and Tissue Engineering, Biomedical Engineering: Frontier Research and Converging Technologies, Jan. 2016, pp. 209-233.
The IPRP mailed Sep. 1, 2016 in Application No. PCT/ US2016/ 031768.
Eschenhagen et al.: "Cardiac tissue engineering.", Transpl. Immunol., vol. 9, No. 2-4, May 2002 (May 1, 2002), pp. 315-321.
Masutani et al.: "Levosimendan restores the positive force-frequency relation in heart failure.", Am J Physiol Heart Circ Physiol., vol. 301, No. 2, Aug. 2011 (Aug. 1, 2011), pp. H488-H49.
Tulloch et al.: "Growth of engineered human myocardium with mechanical loading and vascular coculture.", Circulation Research., vol. 109, No. 1, 2011, pp. 47-59.
Yazawa et al.: "Using induced pluripotent stem cells to investigate cardiac phenotypes in Timothy syndrome.", Nature, vol. 471, No. 7337, Mar. 10, 2011 (Mar. 10, 2011), pp. 230-234.

(56) References Cited

OTHER PUBLICATIONS

Shamir and Ewald, "Three-dimensional organotypic culture: experimental models of mammalian biology and disease." Nat Rev Mal Cell Biol. Oct. 2014;15(10):647-64. doi: 10.1038/nrm3873. Epub Sep. 17, 2014. (Year: 2014).
Liau et al. "Pluripotent stem cell-derived cardiac tissue patch with advanced structure and function." Biomaterials. Dec. 2011;32(35): 9180-7 (Year: 2011).
Ronaldson et al. "P-431: Human iPS Cell Based Cardiac Microtissue Platform for Predictive Toxicity Studies" Tissue Engineering Part A.Dec. 2014. Published in vol. 20 Issue S1: Dec. 3, 2014 (Year: 2014).
Stevens et al. "Physiological function and transplantation of scaffold-free and vascularized human cardiac muscle tissue." Proc Natl Acad Sci U S A. Sep. 29, 2009; 106(39): 16568-16573. (Year: 2009).
The IPRP mailed Sep. 29, 2017 in Application No. PCT/ US2017/ 041996.
Elisa Cimetta, Elisa Figallo, Christopher Cannizzaro, Nicola Elvassore, and Gordana Vunjak-Novakovic, Microbioreactor arrays for controlling cellular environments: design principles for human embryonic stem cell applications Methods. Feb. 2009 ; 47(2): 81-89.
Meyvantsson I and Beebe DJ, Cell Culture Models in Microfluidic Systems, Annu. Rev. Anal. Chem. 2008, 1:423-49.
Ellis BW, Acun A., Can UI, Zorlutuna P., "Human iPSC-derived myocardium-on-chip with capillary-like flow for personalized medicine". Biomicrofluidics, vol. 11/Issue 2, No. 024105, Mar. 2017.
Marsano A, Conficconi C, Lemme M, Occhetta P, Gaudiello E, Votta E, Cerino G, Redaelli A, Rasponi M, "Beating heart on a chip: a novel microfluidic platform to generate functional 3D cardiac microtissues" Lab on a Chip, vol. 16 / Issue 7, pp. 599-610, Feb. 2016.
Aratyn-Schaus Y, Pasqualini FS, Yuan H, McCain ML, Ye Gj, Sheehy SP, Campbell PH, Parker KK, "Coupling primary and stem cell-derived cardiomyocytes in an in vitro model of cardiac cell therapy", The Journal of Cell Biology, vol. 212 / Issue 4, pp. 389-397, Feb. 2016.
Lind JU, Busbee TA, Valentine AD, Pasqualini FS, Yuan H. Yadid M, Park SJ, Kotikian A, Nesmith AP, Campbell PH, Vlassak JJ, Lewis JA, Parker KK, "Instrumented cardiac microphysiological devices via multimaterial three-dimensial printing", Nature Materials, vol. 16 / Issue 3, pp. 303-308, Mar. 2017.
Zhang YS, Arneri A, Bersini S, Shin SR, Zhu K, Goli-Malekabadi Z, Aleman J, Colosi C, Busignani F, Del'Erba V, Bishop C, Shupe T, Demarchi D, Moretti M, Rasponi M, Dokmeci MR, Atala A, Khademhossenini A, "Bioprinting 3D microfibrous scaffolds for engineering endothelialized myocardium and heart-on-a-chip", Biomaterials, vol. 110, pp. 45-59, Dec. 2016.
Miklas JW, Nunes SS, Sofia A, Reis LA, Pahnke A, Xiao Y, Laschinger C, Radisic M, "Bioreactor for modulation of cardiac microtissue phenotype by combined static stretch and electrical stimulation", Biofabrication, vol. 6 / Issue 2, No. 024113, Jun. 2014.
Huebsch N. Loskill P, Deveshwar N. Spencer CI, Judge LM, Mandeagar MA, Fox CB, Mohamed TM, Ma Z, Mathur A, Sheehan AM, Truong A, Saxton M. Yoo J, Srivastava D, Desai TA, So PL, Healy KE, Conklin BR, "Miniaturized iPS-Cell-Derived Cardiac Muscles for Physiologically Relevant Drug Response Analyses", Scientific Reports, vol. 6, No. 24726, Apr. 2016.
Parker KK, "Human cardio-pulmonary system on a chip", Harvard Medical School, NIH Grant No. 3UH3TR000522-05S1.
Wikswo JP. The relevance and potential roles of microphysiological systems in biology and medicine.Exp Biol Med. Feb. 2014; 239(9) pp. 1061-1072.
Zhang YS. Engineering challenges in microphysiological systems. Future Sci OA. Aug. 2017; 3(3) FSO209.
Low LA and Tagle DA. Microphysiological Systems ("Organs-on-Chips") for Drug Efficacy and Toxicity Testing. Clin Transl Sci. Jul. 2017; 10(4): pp. 237-239.

* cited by examiner

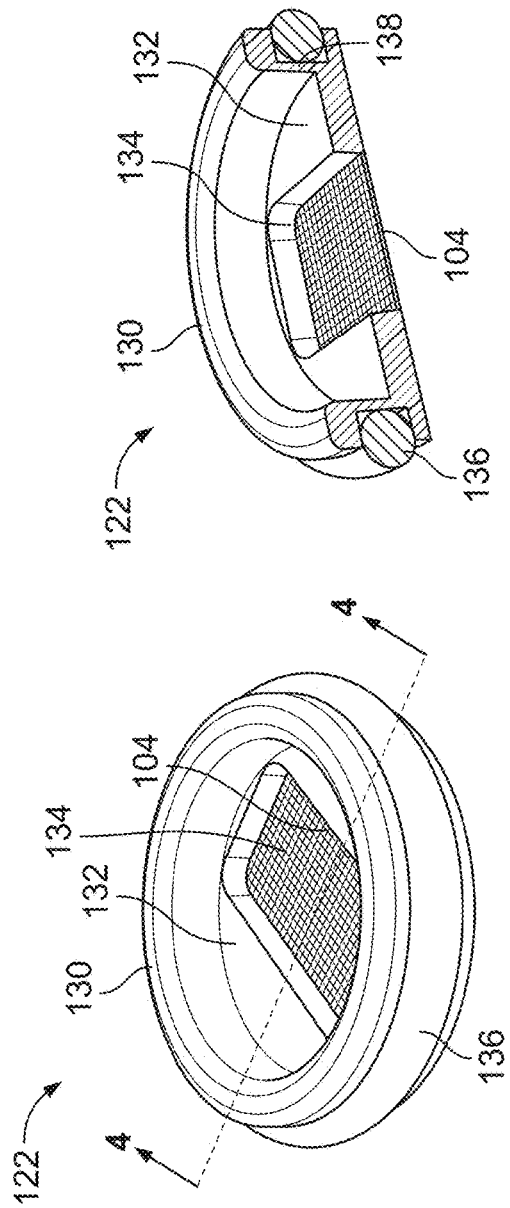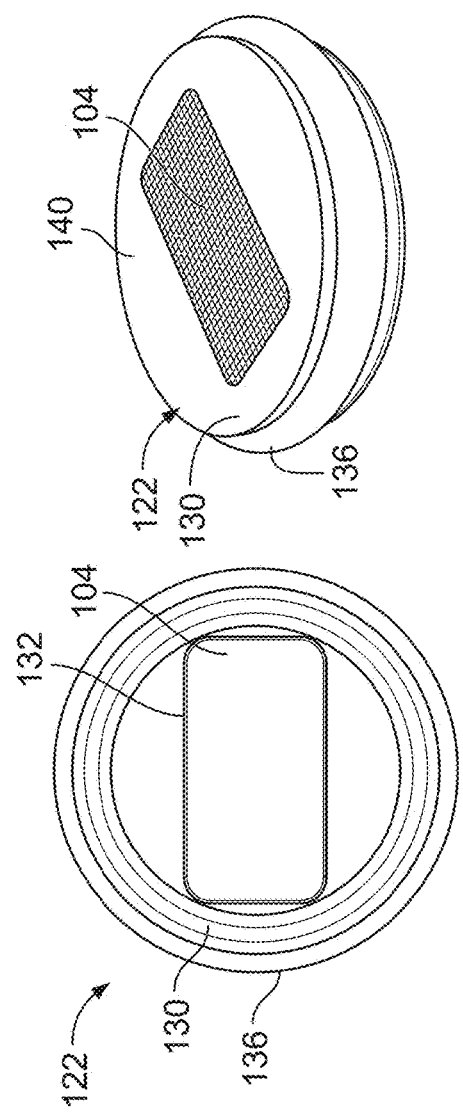

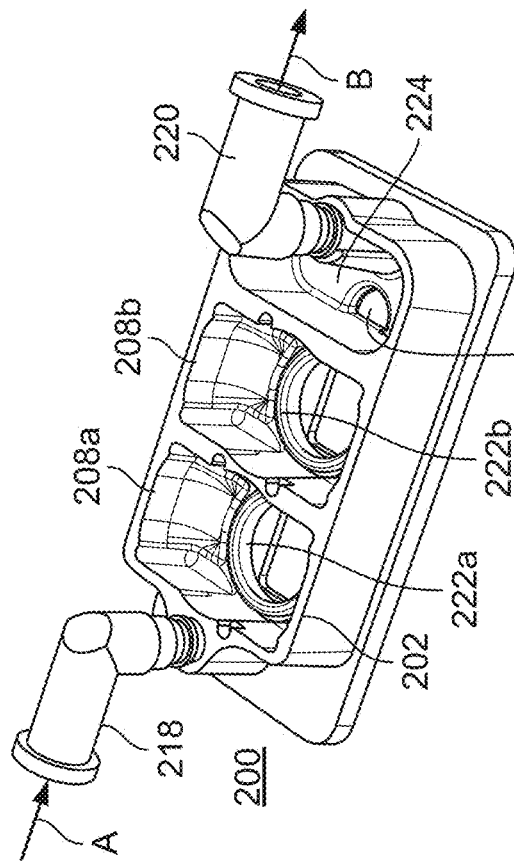
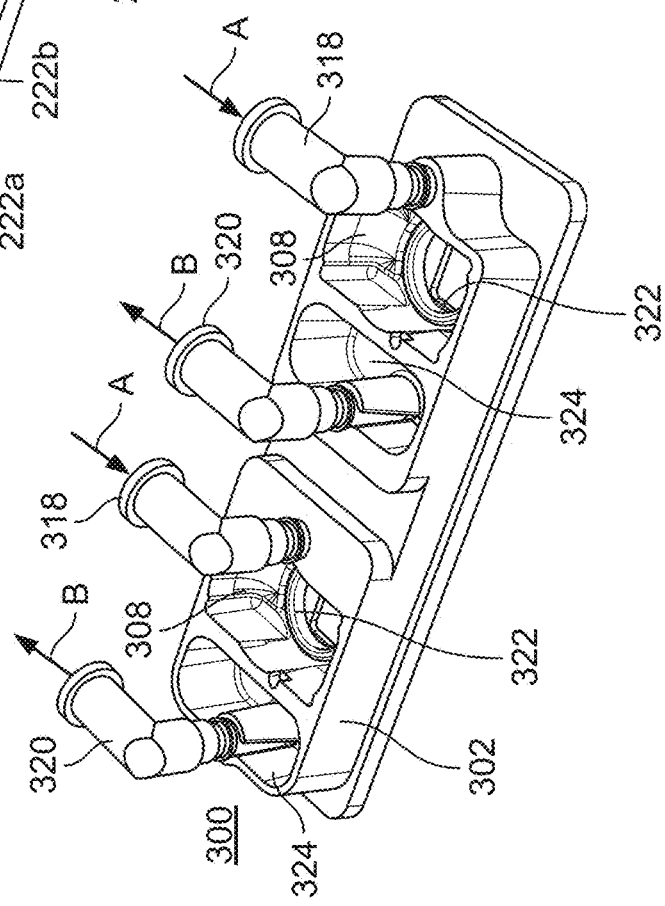

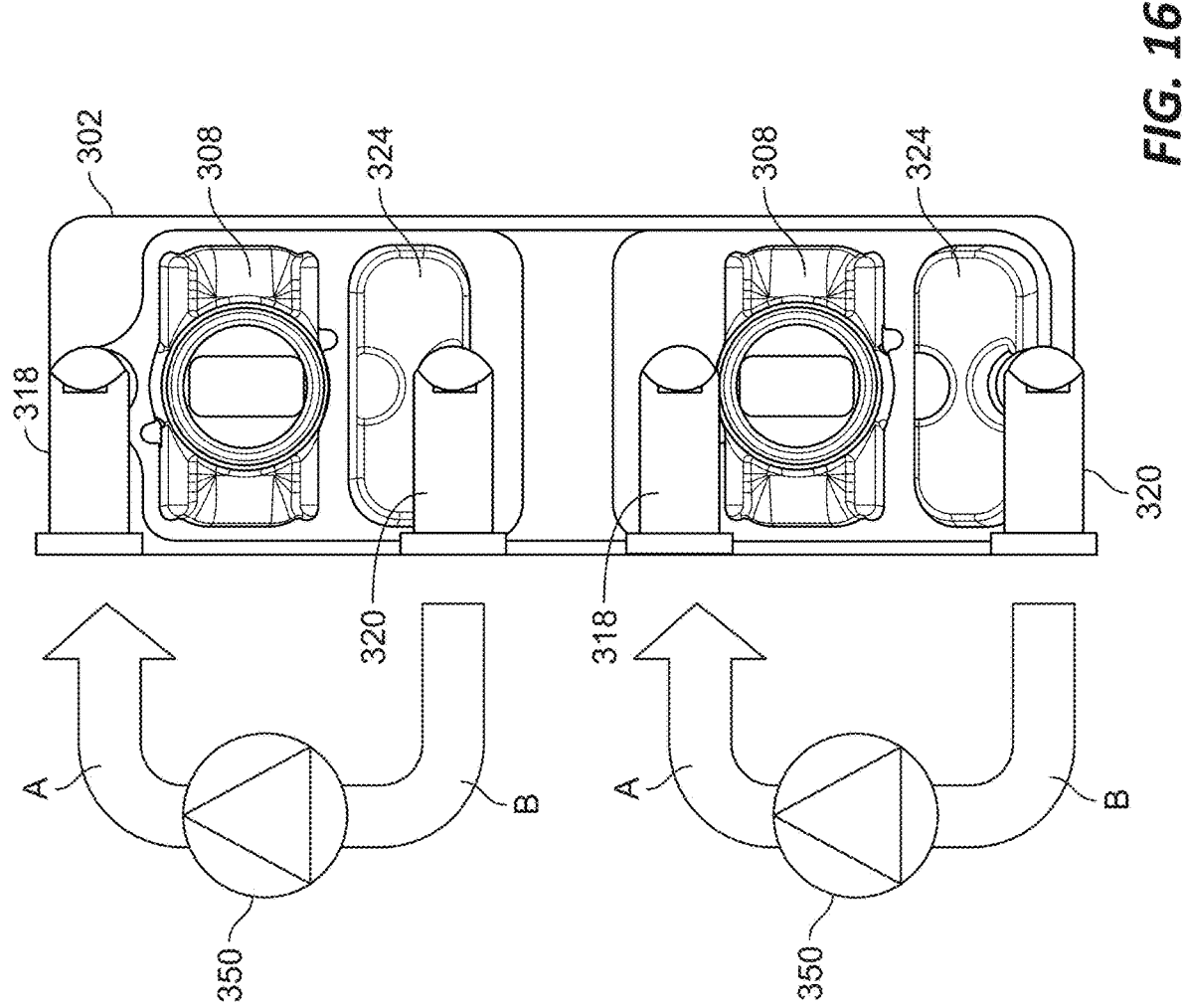

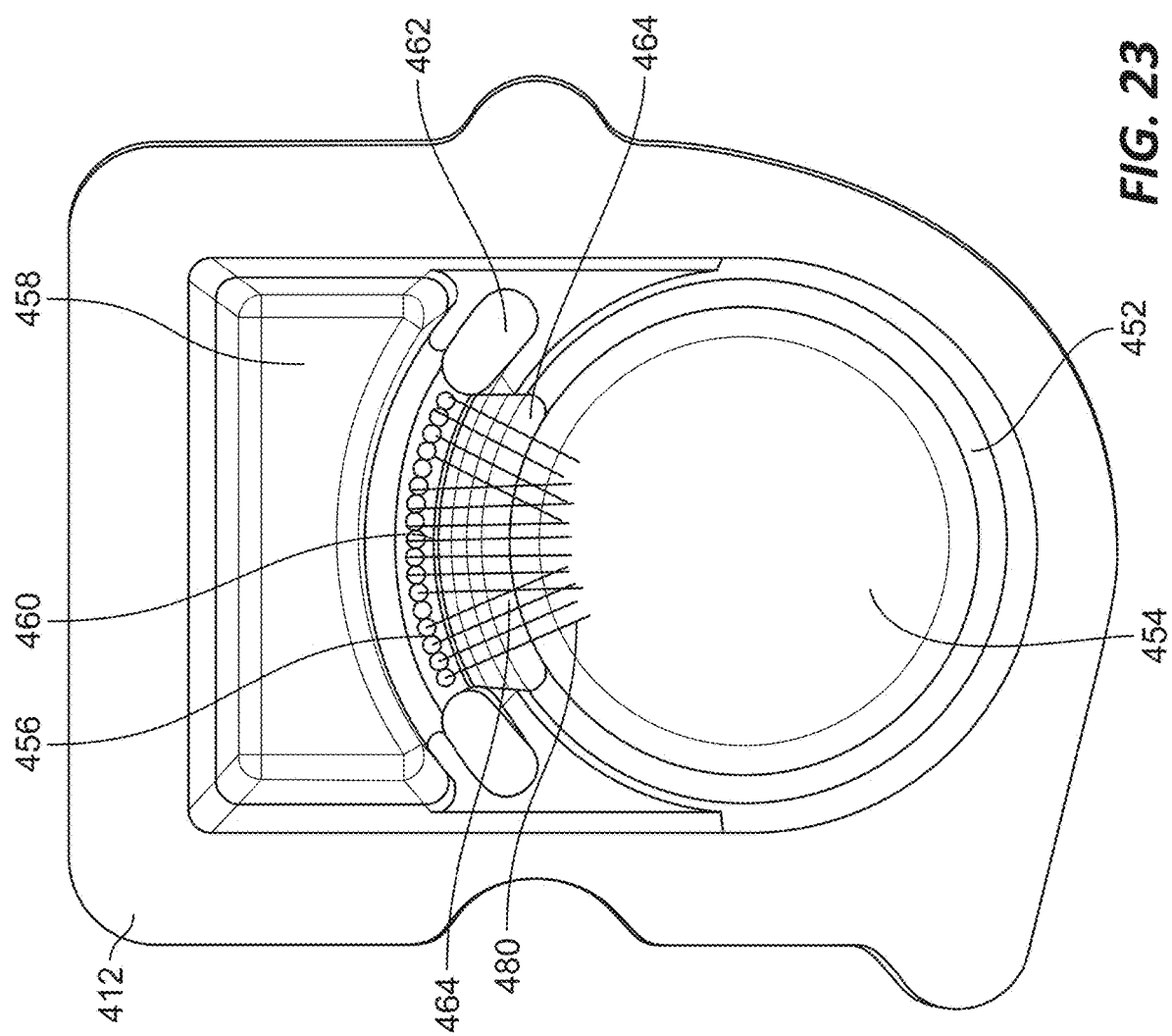

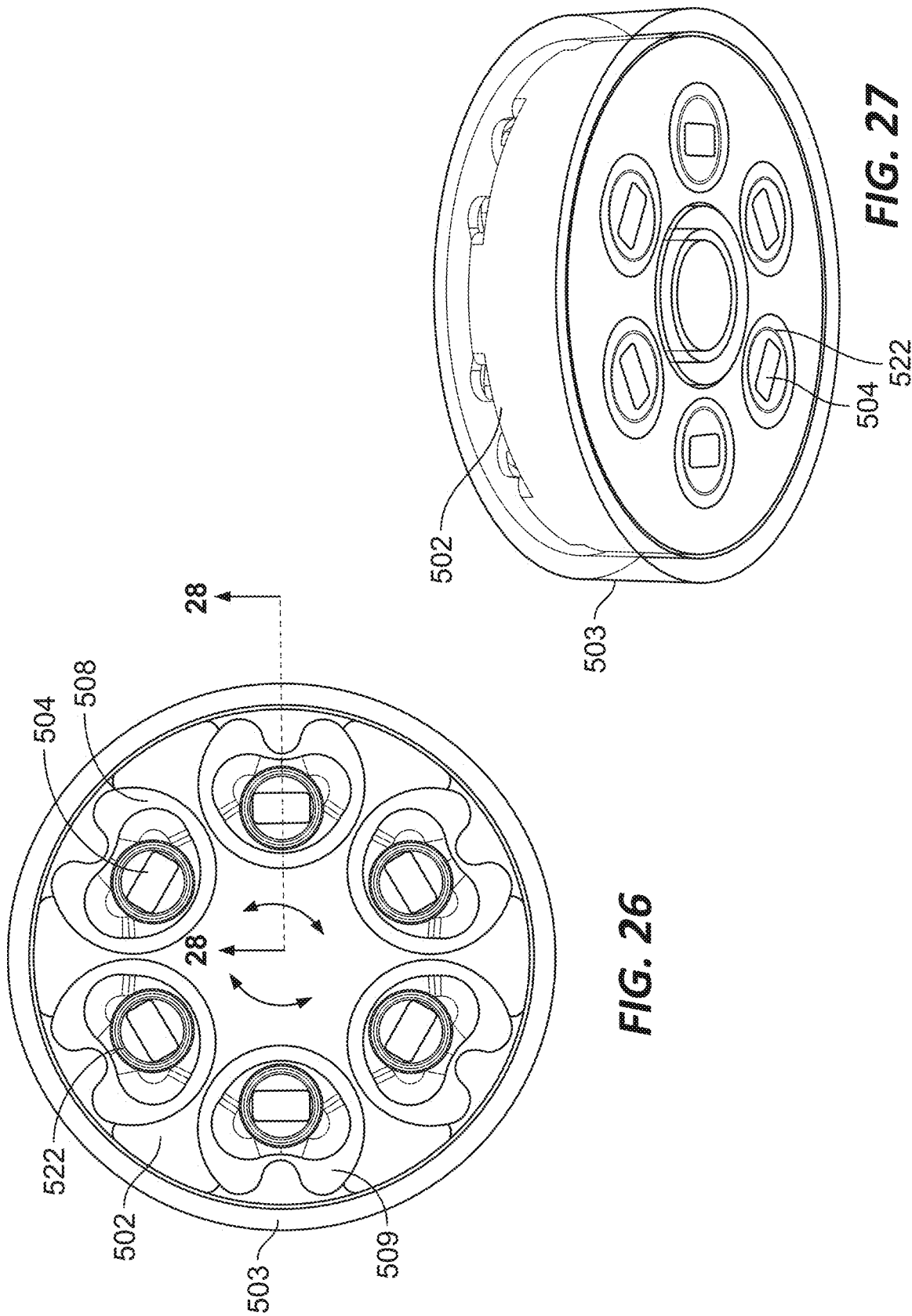

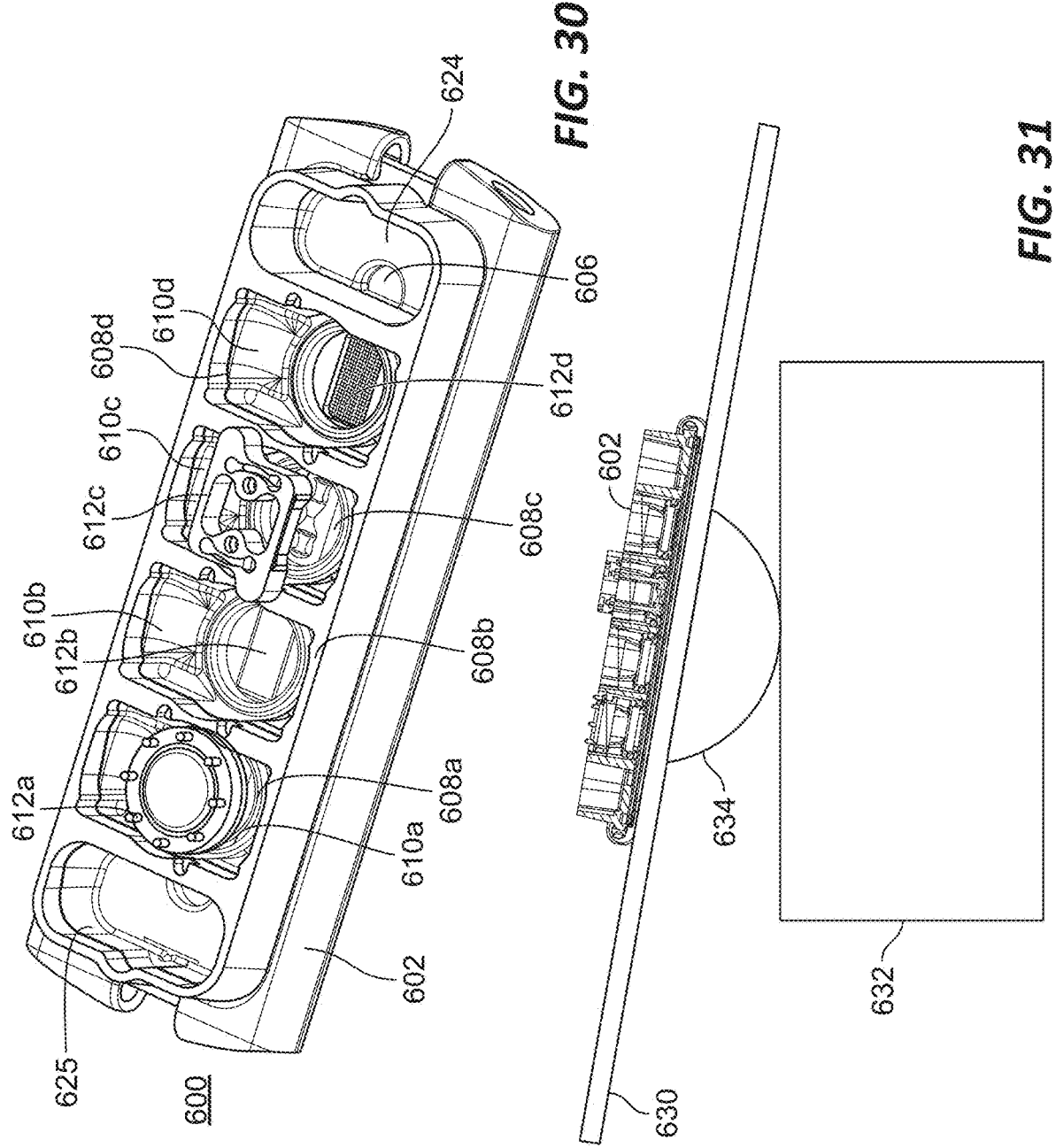

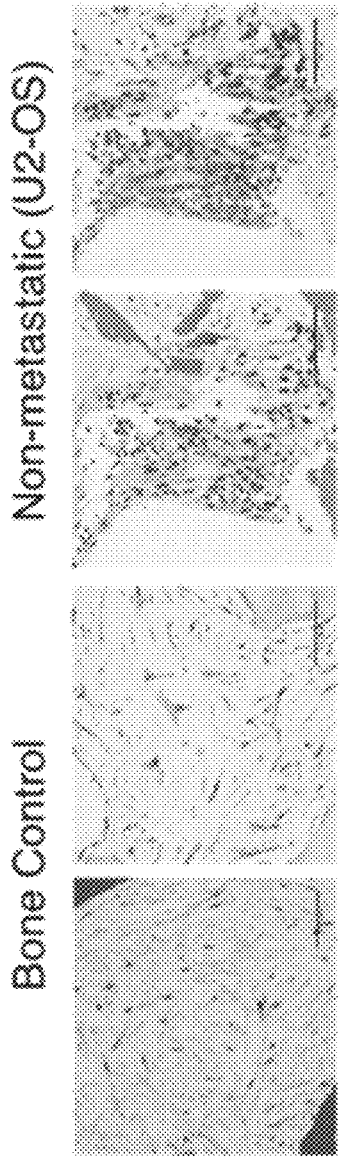
FIG. 36 A
FIG. 36 B
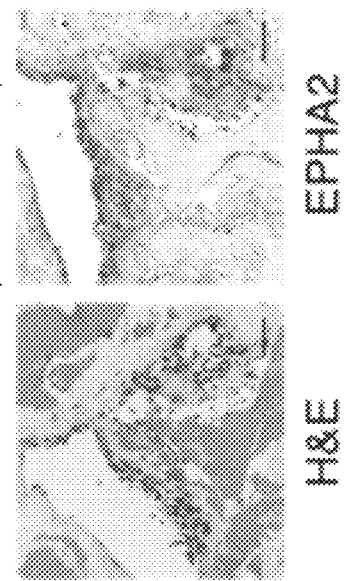
FIG. 37 A
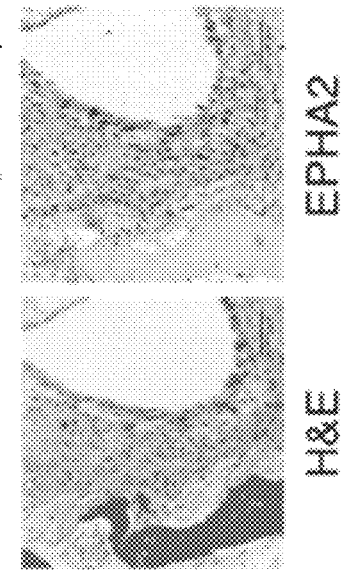
FIG. 37 B

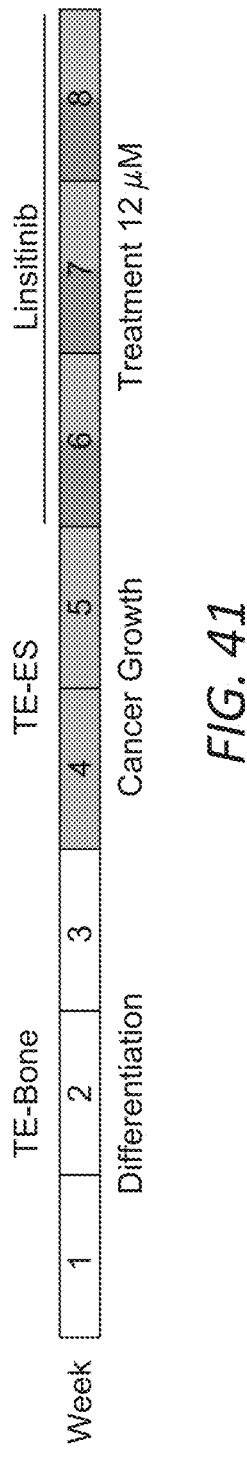
FIG. 41
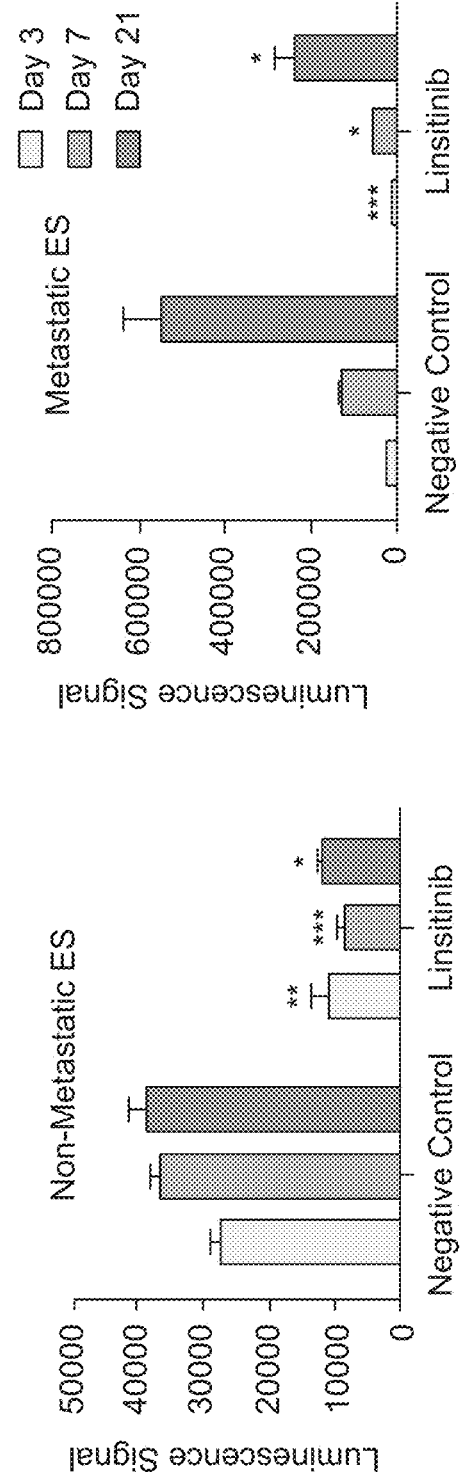
FIG. 42
FIG. 43

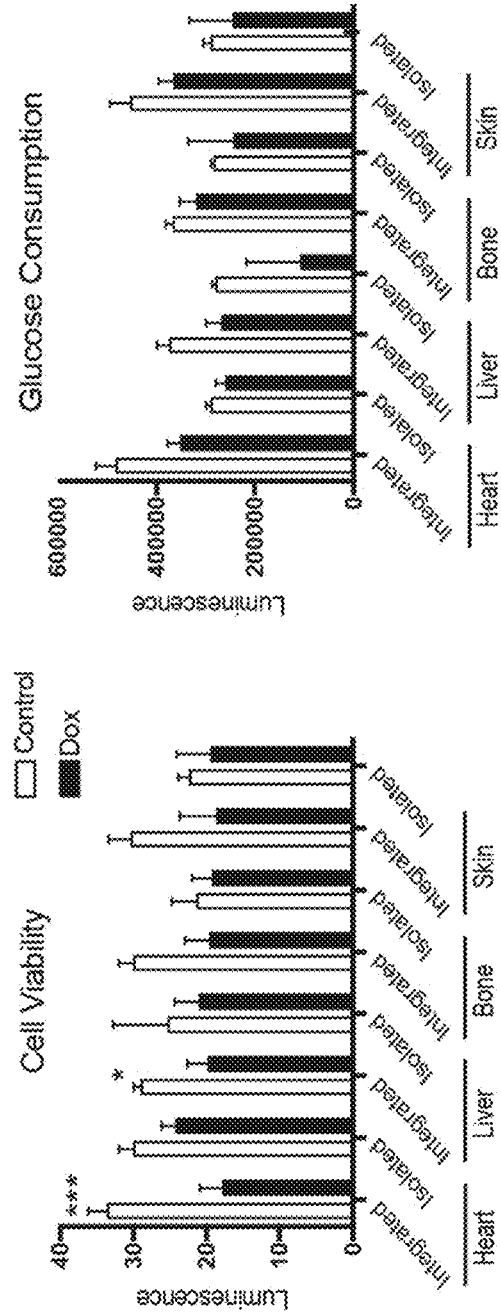
FIG. 62
FIG. 63
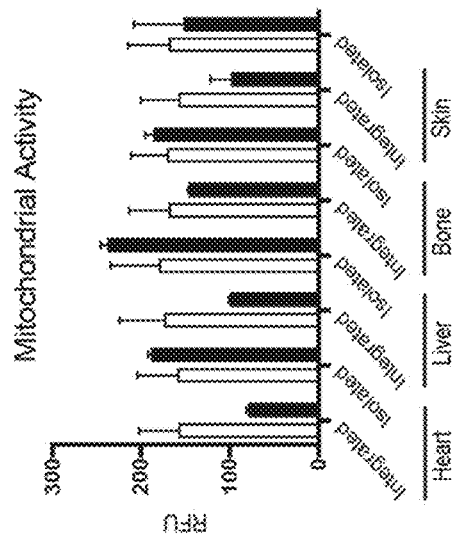
FIG. 64

| Top Pathways | p-value | % Overlap |
|---|---|---|
| InterOrgan Platform | | |
| SSB 7 | 4.98E-29 | 95.5% |
| TGFB1 4 | 1.52E-08 | 70.0% |
| Cancer drug resistance mRNA | 1.34E-02 | 16.7% |
| let-7 44 | 1.48E-01 | 2.5% |
| Isolated Tissue | | |
| Proteomics overlap RNA | 4.21E-133 | 93.7% |
| Oxidative Phosphorylation | 5.76E-23 | 75.2% |
| MYOCD 37 | 1.49E-13 | 88.9% |
| GATA4 38 | 9.24E-11 | 92.0% |
| MYOCD 24 | 9.54E-10 | 85.7% |

FIG. 73

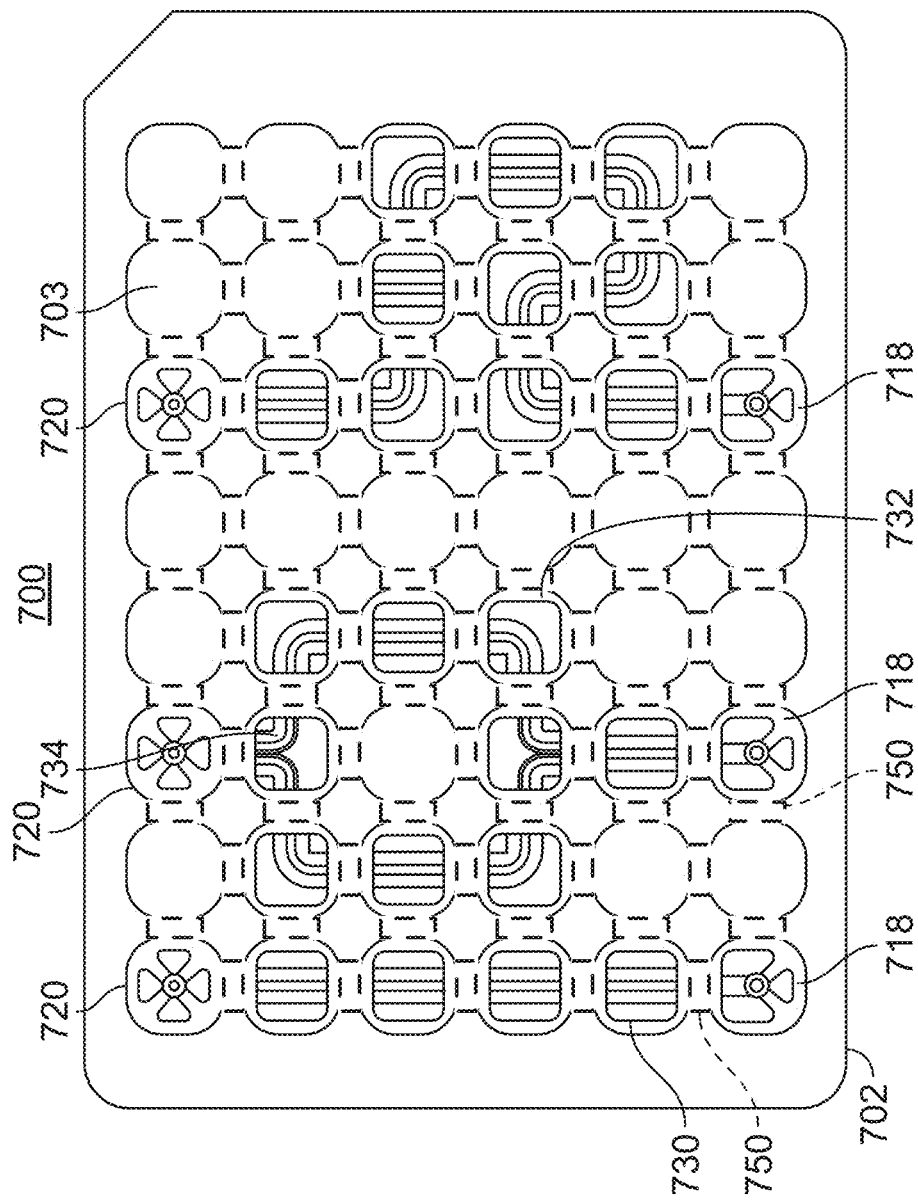
FIG. 74
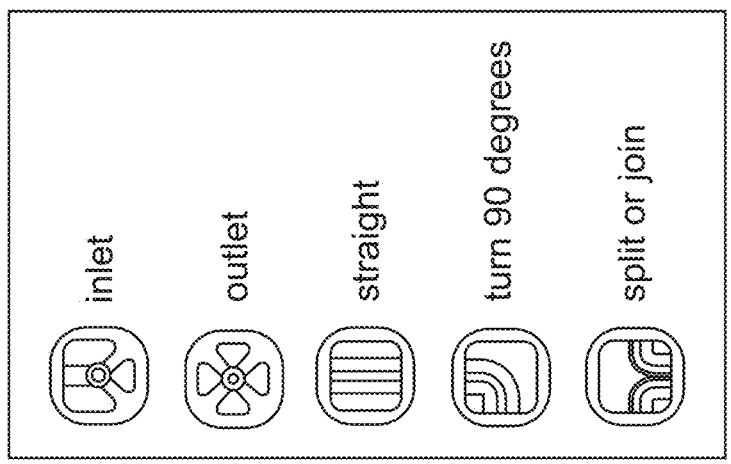

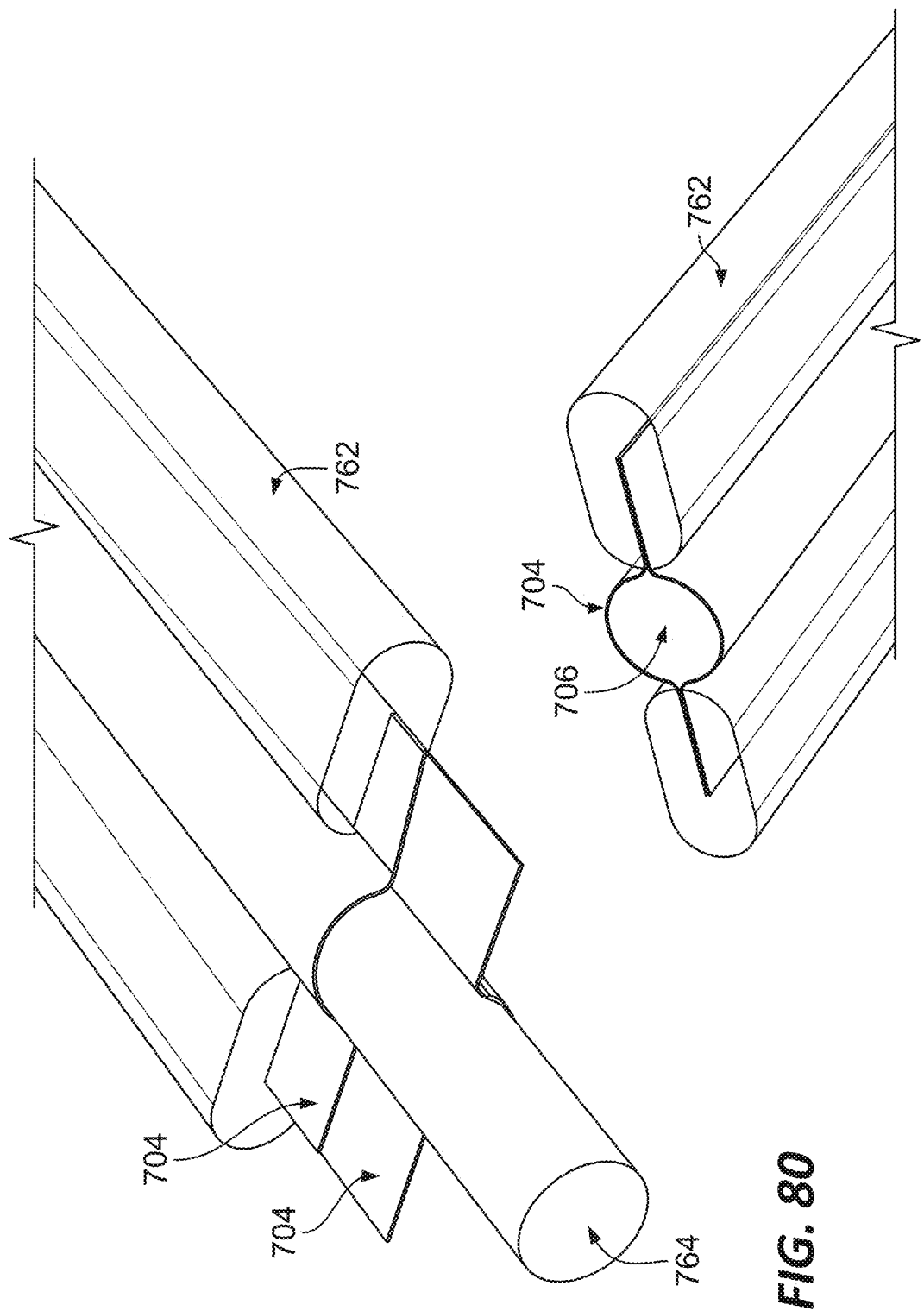

HUMAN ORGAN-ON-CHIP MODELS FOR PREDICTIVE SCREENING

CROSS-REFERENCE TO RELATED APPLICATIONS

This application is a continuation of International Application No. PCT/US19/43722, filed Jul. 26, 2019, which claims priority to U.S. Provisional Application Ser. No. 62/711,221 filed Jul. 27, 2018, entitled "Integrated Modular Microphysiological System on a Chip," each of which are incorporated herein in their entireties by reference thereto.

GOVERNMENT FUNDING

This invention was made with government support under EB025765 awarded by the National Institutes of Health. The government has certain rights in the invention.

TECHNICAL FIELD

The disclosed subject matter describes an integrated modular microphysiological system including two or more wells and a vascular network comprising at least one channel, and at least one endothelial barrier in fluid contact with the wells and the vascular network.

BACKGROUND

The current process of drug development is long, expensive, and inefficient largely due to the lack of predictive preclinical testing models. The development of new cancer therapeutics has one of the lowest success rates compared to other medical fields, with only 1 in 15 new drugs that have reached clinical trials receiving FDA approval. At the same time, some potentially effective therapeutic modalities may be eliminated in preclinical studies. While cancer remains a leading cause of morbidity and mortality worldwide, treatment options are limited by the low translational success of current preclinical testing models.

Cancer drugs, such as endostatin, have yielded promising results in mice, such as full tumor elimination when used alone, to subsequently show only minimal results in human patients. On the other hand, tamoxifen, a selective estrogen-receptor modulator, has been successfully used to treat breast cancer for years. However, if its predisposition to cause liver tumor in rats had been discovered in preclinical tests, the drug would have been eliminated during developmental testing. Other drugs have passed preclinical trials and then withdrawn, due to the side effects detected only during clinical trials or even after entering the market and being used by large numbers of patients. This is particularly true for cardiac side effects, as successful preclinical and clinical screening still allowed cardiotoxic drugs to enter the market. Rofecoxib, a COX-2 inhibitor used as an analgesic and anti-inflammatory drug, was approved by the FDA in 1999 and then removed from market in 2004 because of side effects not seen in preclinical and clinical trials. Unfortunately, by that time, the drug had already caused an estimated 140,000 heart attacks associated with 60,000 deaths.

Results like these illustrate the need for more predictive models of drug safety and efficacy, which would enable thorough testing of cardiac side effects. While regulatory changes have prevented drugs causing lethal arrhythmia from reaching the market, the current screening models are often oversensitive to proarrythymic side effects and result in elimination of numerous drugs. To date, as high as 60% of new drugs test positive for proarrhythmic events, based on assessing the rapid component of the delayed rectifier potassium current (IKr) for its blocking liability. The false positives are responsible for preventing the potentially life-saving compounds from reaching the market.

What is needed is a preclinical model that could more accurately predict both the efficacy and the safety of new drugs in humans that could enable more reliable drugs to progress through the developmental pipeline. While the development of human induced pluripotent stem (iPS) cells provides a human cell source for preclinical testing, the relative immaturity and the lack of biological fidelity limit their use.

SUMMARY

The present disclosure is directed to an integrated modular microphysiological system on a chip.

The present disclosure provides a complex human-based integrated organ-on-a-chip system which can be used as a model during drug discovery, screening, and preclinical to clinical trials, specifically, by using an endothelial barrier the system enables the integration of multiple tissue types in a way that provides true separation to enable each tissue to be cultured in its specific culture media while still providing communication between tissues via a vascular network. The system can also provide a tool for researchers to investigate mechanisms underlying disease.

The present disclosure also provides a method and system for independently culturing multiple organ systems and connecting mature tissue cultures in a modular microphysiological system that overcomes many of the aforementioned limitations. Multiple tissue types can be derived from a single human induced pluripotent stem cell line and tissues are separated into individual compartments that eliminate the need for common culture media. Perfusion of a vascular medium, such as a blood substitute, through the entire system mimics the human circulatory system and allows for the introduction of drugs or circulating immune cells in a biomimetic manner. Moreover, the platform can be fabricated from a biocompatible, non-absorptive material and need not contain PDMS. This system can provide a customizable model of human physiological response and has the potential to facilitate more efficient and cost-effective drug development and drug screening In some embodiments an integrated modular microphysiological system is provided which includes two or more chambers and a vascular network which includes at least one channel. Each well can be configured for culturing a tissue and includes a layer of endothelial cells which forms an endothelial barrier within the chamber. The endothelial barrier can be in fluid contact with at least one of the at least one channels in the vascular network. The endothelial barrier can also be in fluid contact with a fluid in the chamber.

In some embodiments, an integrated modular microphysiological system is provide which includes a vascular network and two or more chambers for culturing two or more tissues. Each chamber can include a layer of endothelial cells to form at least one endothelial barrier at the bottom of the chamber. The at least one endothelial barrier can be in fluid contact with at least one of the said at least one channel of the vascular network to separate a fluid in each of the chambers from a vascular fluid in the vascular network.

In some embodiments, an integrated modular microphysiological system is provided that includes a vascular network which includes at least one channel and two or more chambers where each chamber has at least one endothelial barrier with a first surface and second surface oppositional to one another and a layer of endothelial cells to act as an endothelial barrier between a fluid in the chamber and a vascular fluid in the vascular network. Each chamber is configured to culture a tissue.

BRIEF DESCRIPTION OF THE DRAWINGS

A detailed description of various aspects, features and embodiments of the subject matter described herein is provide with reference to the accompanying drawings, which are briefly described below. The drawings are illustrative and are not necessarily drawn to scale, with some components being exaggerated for clarity. The drawings illustrate various aspects and features of the present subject matter and may illustrate one or more embodiment(s) or example(s) of the present subject matter in whole or in part. Together with the description, the drawings serve to explain the principles of the disclosed subject matter.

FIG. 3 is a perspective view of a component of the OOC platform of FIG. 2.

FIG. 4 is a perspective view in partial cross-section of the component of FIG. 3, taken along line 4-4 of FIG. 3.

FIG. 5 is a top view of the component of FIG. 3.

FIG. 6 is a bottom view of the component of FIG. 3.

FIG. 14 is perspective view from above of an OOC platform in accordance with another exemplary embodiment of the disclosed subject matter.

FIG. 15 is a perspective view from above of an OOC platform in accordance with a further exemplary embodiment of the disclosed subject matter.

FIG. 16 is a top view of the OOC platform of FIG. 15, illustrating a flow pattern of vascular media.

FIG. 23 is a top view of the component of FIG. 21.

FIG. 26 is a top view of an OOC platform in accordance with another exemplary embodiment of the disclosed subject matter.

FIG. 27 is a perspective view from below of the OOC platform of FIG. 26.

FIG. 30 is a perspective view from above of an OOC platform in accordance with another exemplary embodiment of the disclosed subject matter.

FIG. 31 is a side view of the OCC platform of FIG. 30, illustrating a rocker mechanism.

FIGS. 36A, 36B, 37A and 37B are IHC analysis of non-metastatic and metastatic osteosarcoma OOC; and tissue engineered bone scaffold as control.

FIG. 41 is a schematic of the development of the bone tumor organ-on-chip (OOC) as well as of the subsequent 3 week linsitinib drug treatment regimen.

FIGS. 42 and 43 are graphs illustrating non-metastatic (RD-ES cell line derived, FIG. 42) and metastatic (SK-N-MC cell line derived, FIG. 43) Ewing sarcoma OOCs exposed to linsitinib (12 μM) according to the drug treatment regimen.

FIGS. 62-64 are graphs representing cell viability, glucose consumption, and mitochondrial activity, respectively, for the engineered cells 72 hours after administration of a 30 µM Doxorubicin dose.

FIG. 73 is a chart illustrating miRNA levels in the engineered tissue.

FIG. 74 is a top view of an OOC platform in accordance with another embodiment of the disclosed subject matter.

FIG. 80 is an enlarged perspective view illustrating the manufacture of the components of FIGS. 77-79.

FIG. 81 is an enlarged perspective view of a portion of the components illustrated in FIGS. 77-79.

DETAILED DESCRIPTION OF THE DISCLOSED SUBJECT MATTER

It is to be understood that both the foregoing general description and the following detailed description are exemplary and explanatory only, and are not restrictive of the invention, as claimed. In this description, the use of the singular includes the plural, the word "a" or "an" means "at least one," and the use of "or" means "and/or," unless specifically stated otherwise. Furthermore, the use of the term "including," as well as other forms, such as "includes" and "included" is not limiting. Also, terms such as "element" or "component" encompass both elements or components comprising one unit and elements or components that comprise more than one unit unless specifically stated otherwise. The use of the term "or" in the claims and the present disclosure is used to mean "and/or" unless explicitly indicated to refer to alternatives only or the alternatives are mutually exclusive.

Use of the term "about", when used with a numerical value, is intended to include +/−10%. For example, if a number of amino acids is identified as about 200, this would include 180 to 220 (plus or minus 10%).

The terms "patient," "individual," and "subject" are used interchangeably herein, and refer to a mammalian subject to be treated, with human patients being preferred. In some cases, the methods of the invention find use in experimental animals, in veterinary application, and in the development of animal models for disease, including, but not limited to, rodents including mice, rats, and hamsters, and primates.

Organs-on-chip could significantly improve the efficacy and safety of preclinical trials, by emulating in vitro the environmental conditions present in native tissues and organs, individually and in their interactions. In this article, we report the use of human organ-on-chip models of two types of metastatic and non-metastatic bone tumors (Ewing sarcoma and osteosarcoma) and cardiac muscle in studies of drug efficacy and safety. After the model validation using known pharmaceutical agents, we investigated the efficacy and safety of linsitinib, an anti-cancer drug with known cardiac side effects that is currently in clinical trials for advanced stage Ewing Sarcoma.

The integrated modular microphysiological system can enable models of the "human body in a dish" by combining tissues in a perfusable, modular, HTS compatible, PDMS free platform.

The integrated modular microphysiological system enables integration of multiple organ tissues via microfluidic connection through a vascularized porous membrane insert. Mature tissues can be used in the system, including after functional maturation of each organ system towards physiological relevance according to their individual timelines by delivering individualized organ-specific biomimetic cues.

Figure 1:
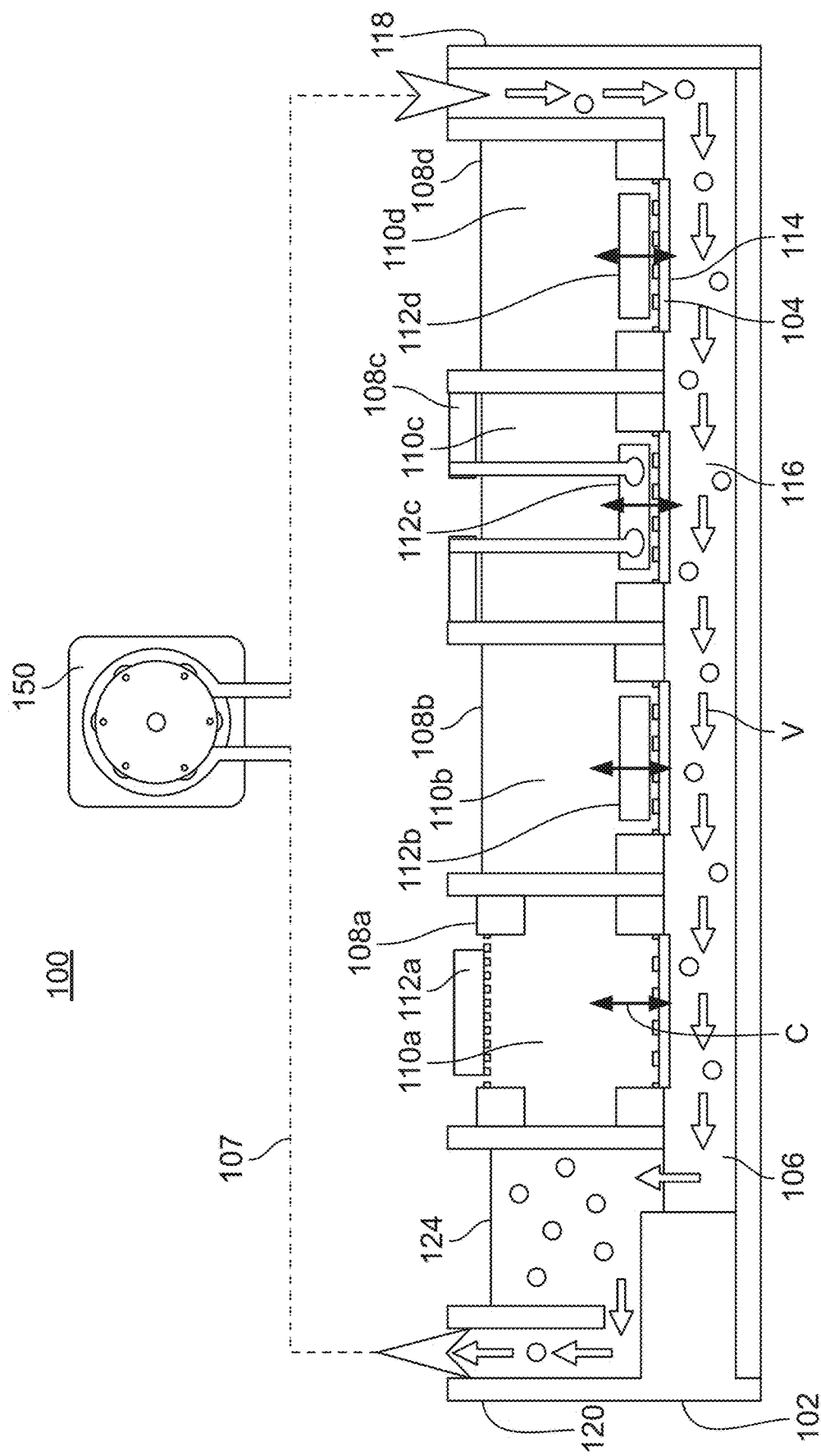
FIG. 1 is a cross-sectional schematic view of an organ-on-chip (OOC) platform in accordance with an exemplary embodiment of the disclosed subject matter.
Figure 2:
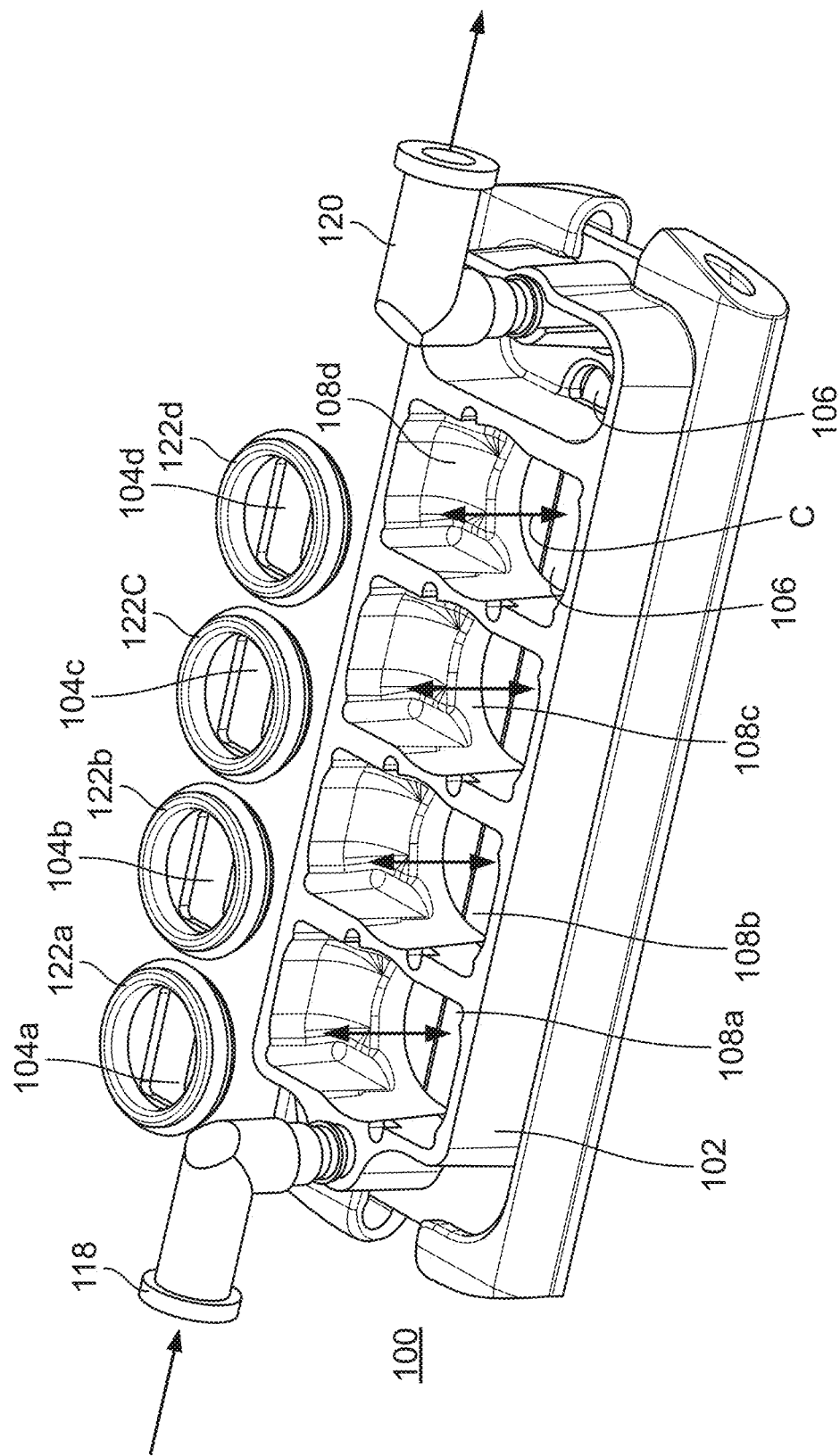
FIG. 2 is a perspective view from above with parts separated of an OOC platform in accordance with an exemplary embodiment of the disclosed subject matter.

FIG. 1 illustrates a system 100 incorporating an OOC platform 102. The platform 102 includes a plurality of tissue wells (described interchangeably as "chambers") 108a, 108b, 108c, 108d that are separated from a vascular network including a flow channel 106 by a porous membrane 104 (dotted line) supporting a layer of endothelial cells forming an endothelial barrier 114 (solid line). Vascular medium (described interchangeably as "vascular fluid") 116, such as a blood substitute, flows through channel 106 from an inlet 118 to an outlet 120 in a general flow direction V. Platform 102 further includes an outlet reservoir 124. The vascular medium flows from the channel 106 into reservoir 124 first and is withdrawn on an offset port. Reservoir 124 helps mix the vascular medium, acts as a bubble trap, is open to ambient to facilitate gas exchange, and allows the user to sample the medium periodically. Vascular network further includes a circuit 107 which includes pump 150, such as a pulsatile pump as is known in the art.

Each of the wells 108a, 108b, 108c, and 108d is configured to hold a culture medium, such as tissue-specific medium 110a (e.g., skin), 110b (e.g., bone), 110c (e.g., cardiac), and 110d (e.g., liver). The endothelial barrier 114 is in fluid contact with at least one of the chambers and the flow channel 106. Endothelial barrier 114 controls the flow between vascular medium 116 and each of the tissue-specific media 110a, 110b, 110c, and 110d (as shown by arrow C). The endothelial barrier 114 can be specifically tailored to the characteristics of the tissue being cultured in each chamber. Each of the chambers can support a specific tissue-engineered organoid therein, e.g., liver 112d, cardiac 112c, bone 112b and/or skin 112a. Four tissue wells are illustrated in FIG. 1, and is contemplated that platform 102 may include a fewer or greater number of wells as required.

The modular approach enables custom configuration of multi-organ on a chip studies to best fit the needs of the question being asked. To recapitulate the homeostasis that occurs naturally within the body, the system incorporates perfusion networks that enable individual control of media and flow locally within each organ system, as well as an endothelialized common interconnected flow containing immune elements to mimic the circulatory system in vivo. In particular, each tissue compartment or chamber 108a, 108b, 108c, 108d can be independently regulated and separated from the vascular flow 116 by the endothelial barrier 114. (See, FIG. 16.) This unique feature enables the ability to maintain and mature each tissue under optimal conditions (e.g., without the need for "common media" that are known to provide only suboptimal culture conditions), and to provide communication between the individual tissue/organ systems through factors secreted into the vascular flow, like in the body. The vascular flow can also be used to deliver drugs (to mimic IV, intramuscular or oral drug administration into the blood) and to introduce circulating immune cells.

The system can be designed to scale for advanced manufacturing and can be made of biocompatible, non-absorptive material, for example, medical grade formulations of polysulfone, polypropylene, polyetherimide, or polycarbonate. It can enable on line readouts of tissue functionality for dynamic longitudinal studies. The system can also enable drug screening in multi-tissue models of health and disease.

In some embodiments an integrated modular microphysiological system is provided which includes two or more wells and a vascular network which includes at least one channel 106. Each well 108a, 108b, 108c, 108d can be configured for culturing a tissue and includes an endothelial barrier 114 which forms at the bottom of the well. The endothelial barrier can be in fluid contact with at least one of the at least one channels in the vascular network.

In some embodiments, an integrated modular microphysiological system is provided which includes a vascular network and a well for culturing tissues. Each well can include a layer of endothelial cells to form at least one endothelial barrier at the bottom of the well. The at least one endothelial barrier can be in fluid contact with at least one of the said at least one channel of the vascular network to separate a fluid in each of the wells from a vascular fluid in the vascular network.

In some embodiments, an integrated modular microphysiological system is provided that includes a vascular network which includes at least one channel and two or more wells where each well has at least one porous membrane insert with a first surface and second surface oppositional to one another and a layer of endothelial cells to act as an endothelial barrier between a fluid in the well and a vascular fluid in the vascular network. Each well is configured to culture a tissue.

In the foregoing embodiments, each well or chamber can be configured to culture a tissue. Any tissue can be cultured. By way of example but not limitation, such tissues can include cardiac tissue, skin tissue, liver tissue, bone tissue, immune tissue, vascular tissue and lung tissue. In some aspects, the tissue is of human origin. In some embodiments, the tissue is derived from induced pluripotent stem cells (iPSCs). Such tissues can be obtained by methods known to those of skill in the art. Such methods can differentiate iPSCs into organ-specific tissues. In some aspects, the tissues are obtained from iPSCs from the same subject.

In the foregoing embodiments, each well or chamber can be configured to be in fluid communication with a media inlet flow path and a media outlet flow path. This configuration can enable control over the media in each well or chamber and permit the use of different media in each well or chamber.

In the foregoing embodiments, the vascular network can be operably connected to a fluid management system that is configured to circulate a vascular fluid in the vascular network. In some aspects, the fluid management system can also be configured to circulate the vascular fluid at a defined shear rate. In some embodiments, each well or chamber can also be operably connected to a fluid management system configured to circulate a culture medium.

In the foregoing embodiments, the endothelial cells can also be derived from the same subject as the tissues in the wells or chambers. For example, iPSCs from a subject can be differentiated into different organ tissues and endothelial cells to be used in constructing the integrated modular microphysiological system. The endothelial barriers of the foregoing embodiments enable the separation of the vascular fluid in the vascular network from the culture media in each well or chamber while also permitting communication between the vascular network and each well or chamber. This configuration enables communication between the multiple tissues in the integrated modular microphysiological system which can better mimic in vivo behavior.

In some embodiments, the integrated modular microphysiological system is PDMS-free.

An exemplary embodiment of the system 100 is illustrated in FIGS. 2-13. OOC platform 102 can be fabricated from a biocompatible, non-absorptive material and need not contain PDMS. A number of lightweight thermoplastics useful for toughness and stability at high temperatures may be used to fabricate the platform 102. e.g., polysulfone and polypropylene. OOC platform 102 includes a plurality of chamber 108a, 108b, 108c, 108d, each of which includes an opening at the bottom portion that is in fluid communication with a vascular network. The vascular network includes channel 106 in communication with inlet 118 defining an inlet flow path to introduce vascular media into the channel 106 and an outlet 120 defining an outlet flow path to allow the media to exit the system.

As illustrated in FIGS. 3-6, a porous membrane insert 122 is provided for each chamber. (Porous membrane inserts 122a, 122b, 122c and 122d are provided for each of chambers 108a, 108b, 108c and 108d of OOC platform 102.) Porous membrane insert 122 has a substantially circular configuration including a wall portion 130 surrounding a circular well 132. A rectangular opening 134 of about 8 mm by 4 mm is provided in bottom portion 140. A permeable membrane 104 is positioned across the opening 134. Porous membrane 104 is provided to support the endothelial barrier 114. In some embodiments, the endothelial barrier 114 is adhered to the porous membrane 104. In some embodiments, porous membrane 104 is fabricated from a durable porous material such as track-etched polycarbonate or poly (ethylene terephthalate) (PET) having a pore size of about 20 μm. As illustrated in FIG. 4, the wall portion 130 of porous membrane insert 122 includes a circumferential recess 138 for receiving an elastomeric sealing ring 136 to separate fluidic compartments above (chambers 108a, 108b, 108c, 108d) and below (channel 106). In some embodiments, the porous membrane 104 and/or endothelial barrier 144 are adhered directly to the platform 102 without the use of porous membrane inserts 122.

Figure 7:
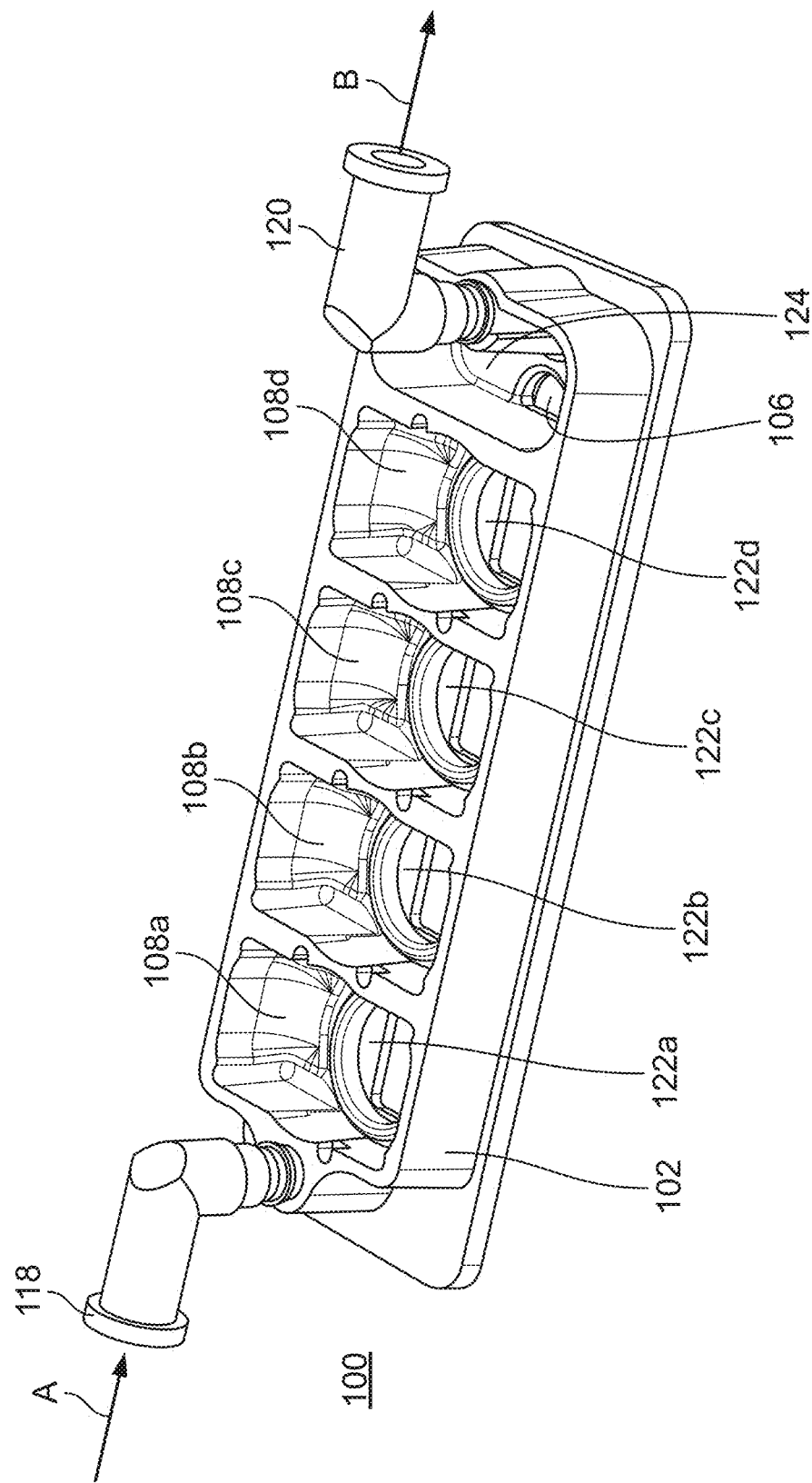
FIG. 7 is a perspective view from above of the OOC platform of FIG. 2 with certain components assembled.
Figure 8:
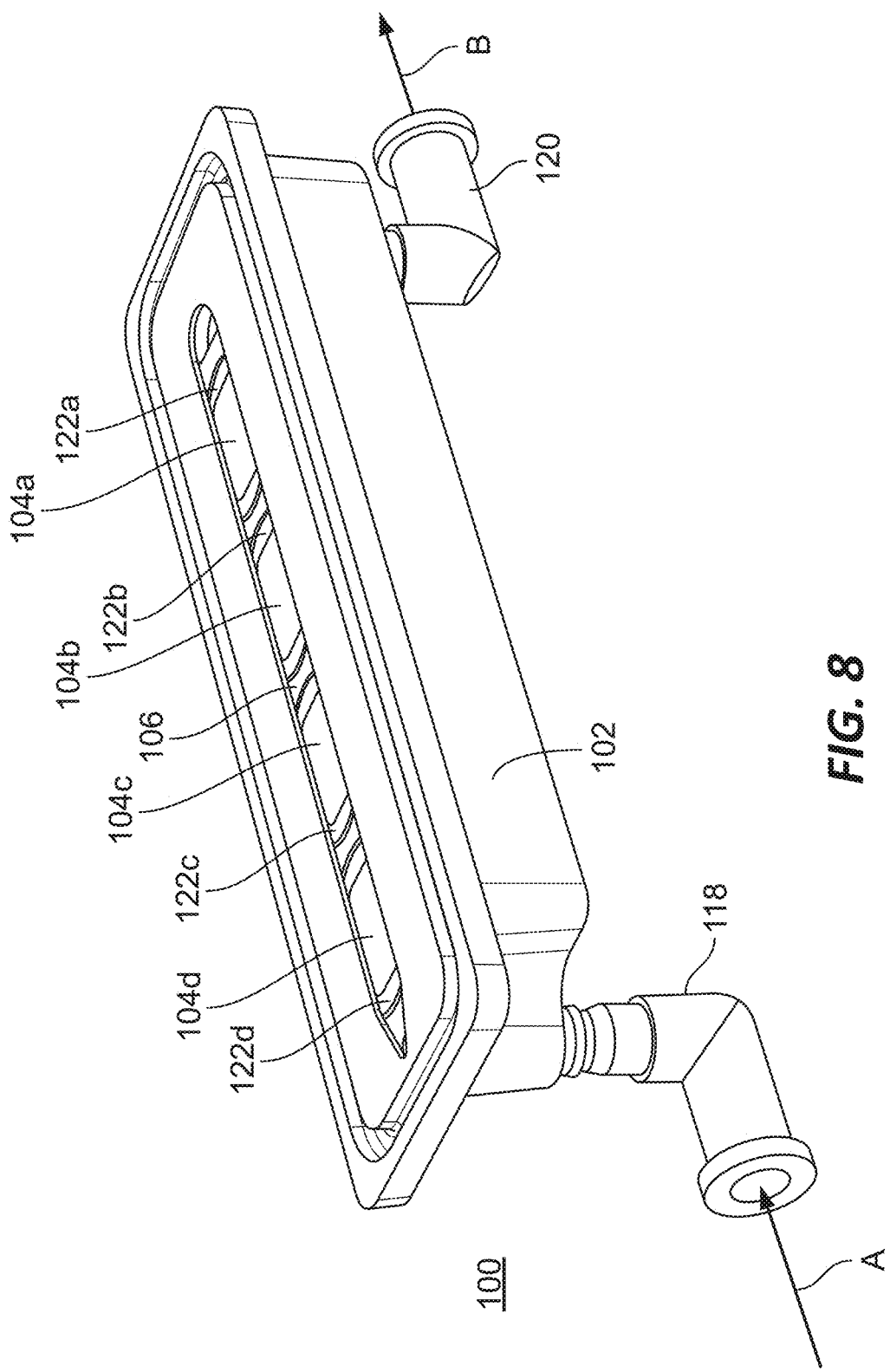
FIG. 8 is a perspective view from below of the OOC platform of FIG. 7.

As illustrated in FIGS. 7 and 8, the porous membrane inserts 122a, 122b, 122c, and 122d are inserted into the apertures in the bottom portion of each of chambers 108a, 108b, 108c, 108d. A base plate (not shown in FIG. 8) maintains the vascular medium 116 within channel 106.

Figure 9:
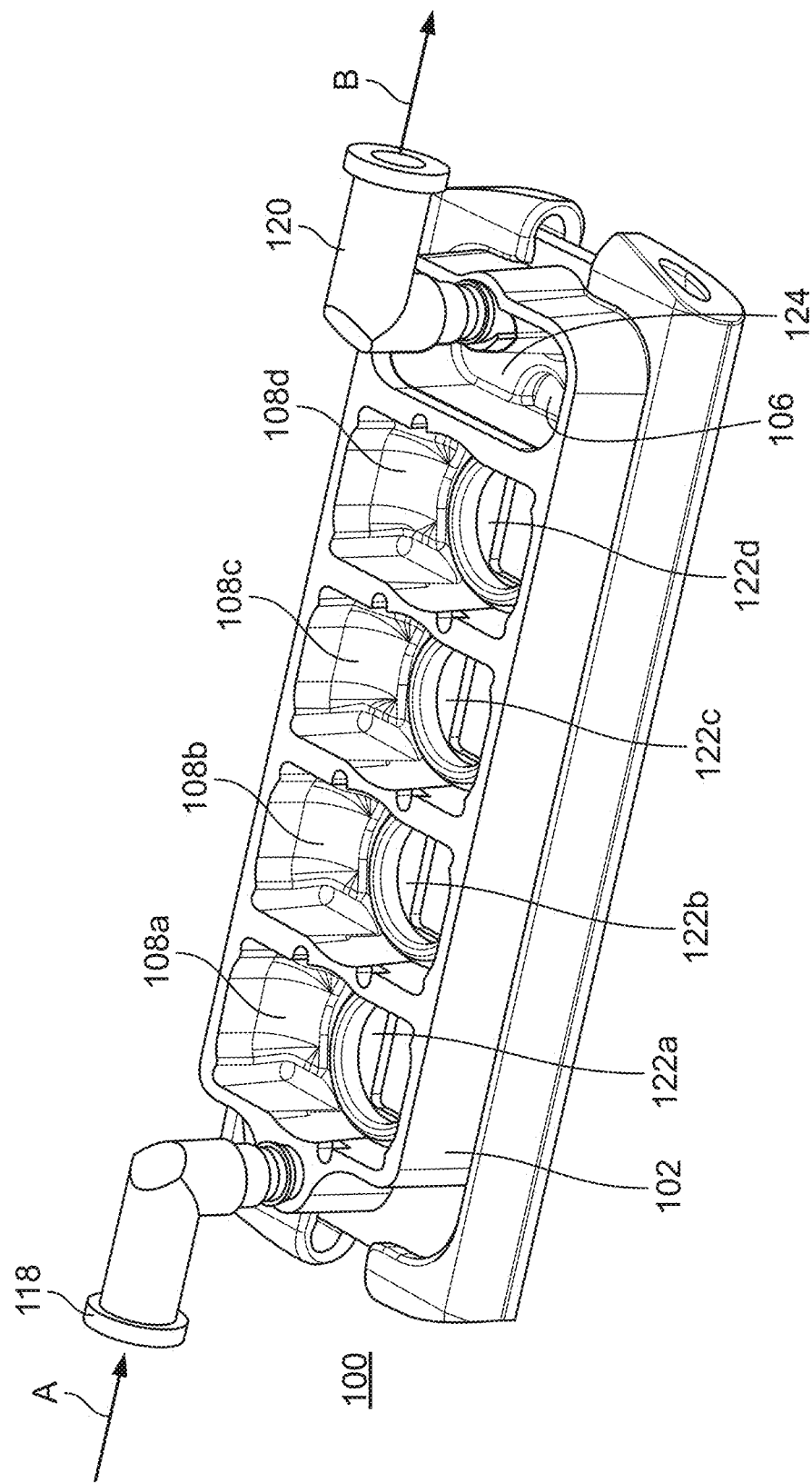
FIG. 9 is a perspective view from above of the OOC platform of FIG. 7 with vascular medium introduced therein.
Figure 10:
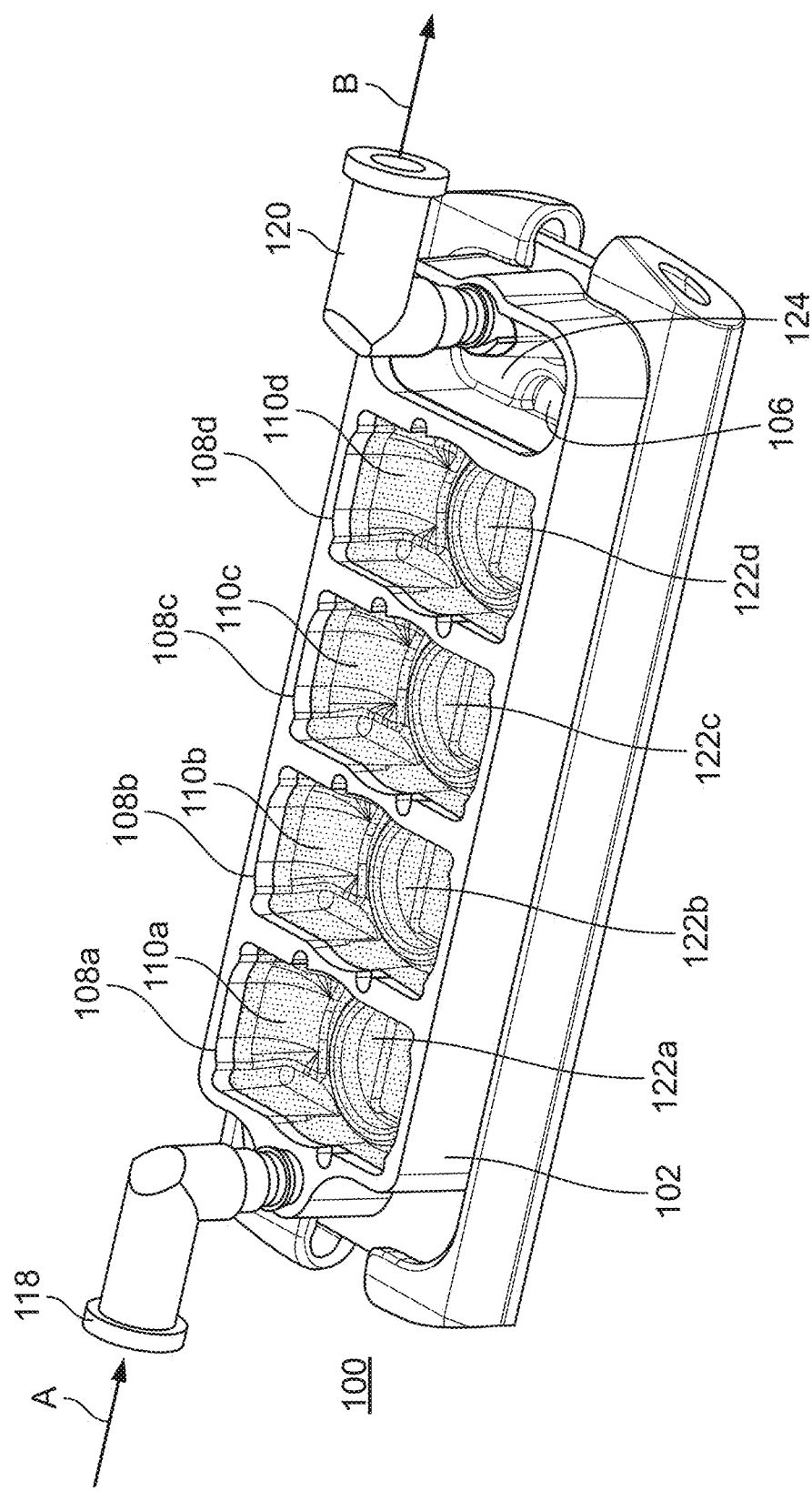
FIG. 10 is a perspective view from above of the OOC platform of FIG. 7 with tissue-specific media introduced therein.
Figure 11:
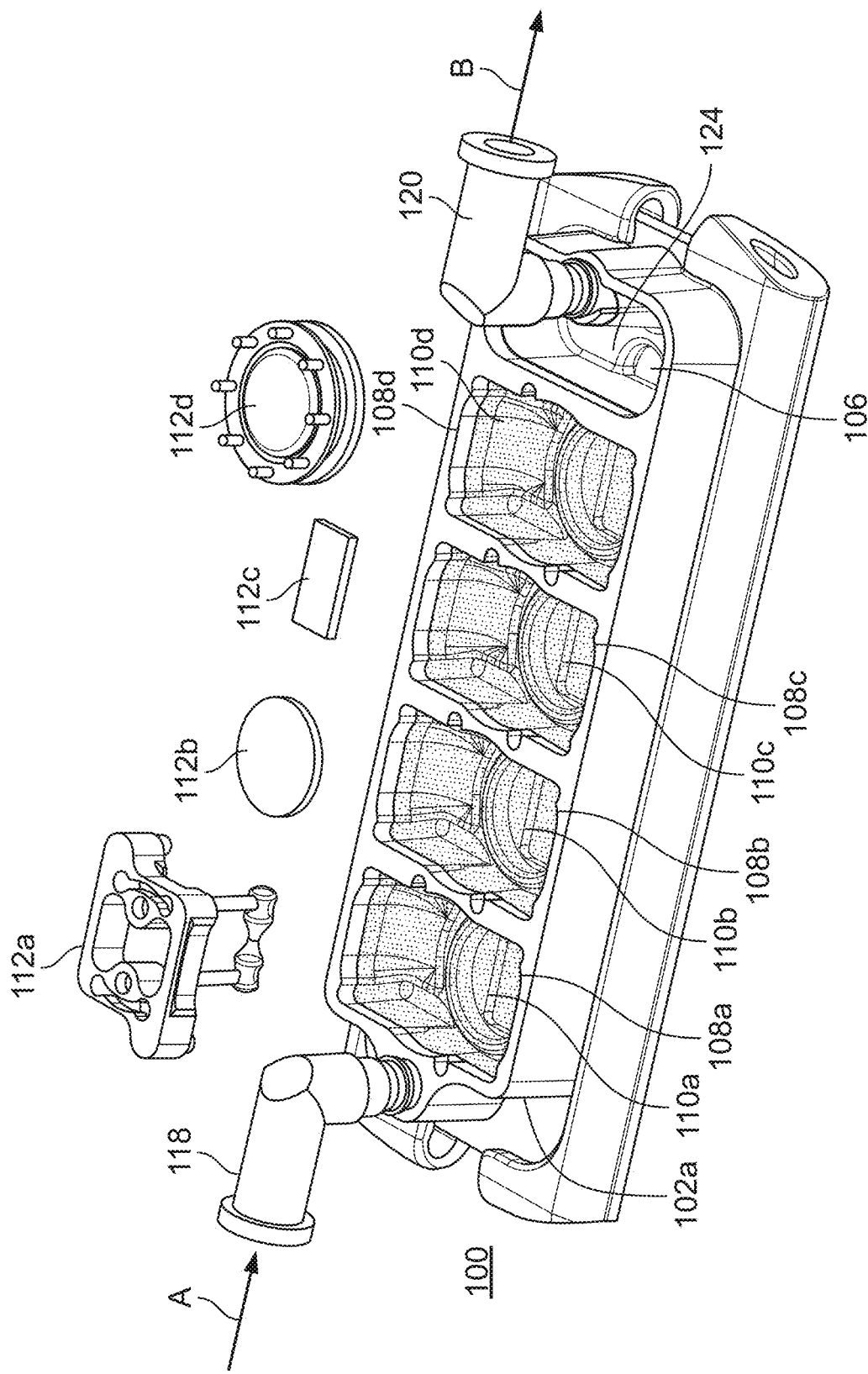
FIG. 11 is a perspective view from above of the OOC platform of FIG. 7 illustrating a plurality of tissue-engineered organoids.
Figure 12:
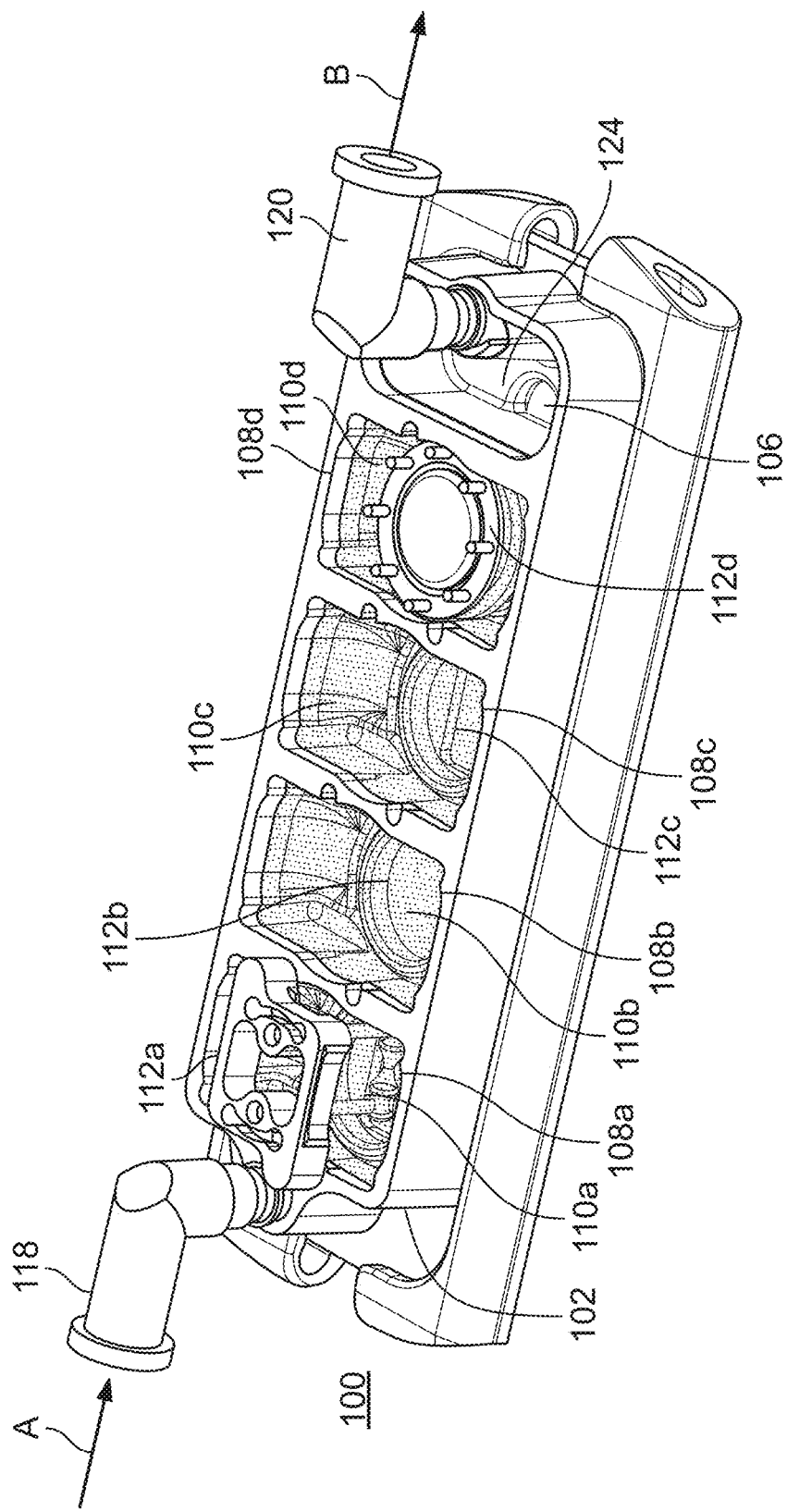
FIG. 12 is a perspective view from above of the OOC platform of FIG. 7 illustrating a plurality of tissue-engineered organoids positioned within tissue chambers.

FIG. 9 illustrates the platform 102 with a vascular medium disposed in outlet reservoir 124, which is then capable of flowing through channel 106 and out via outlet 120. FIG. 10 illustrates each tissue-specific medium 110a, 110b, 110c, and 110d disposed in its respective chamber 108a, 108b, 108c, 108d. The endothelial barrier 114 is disposed on the porous membrane 104 (not shown). Each of the tissue-engineered organoids together with their supporting structure 112a, 112b, 112c, 112d are positioned within their respective chambers 108a, 108b, 108c and 108d as shown in FIGS. 11 and 12.

Figure 13:
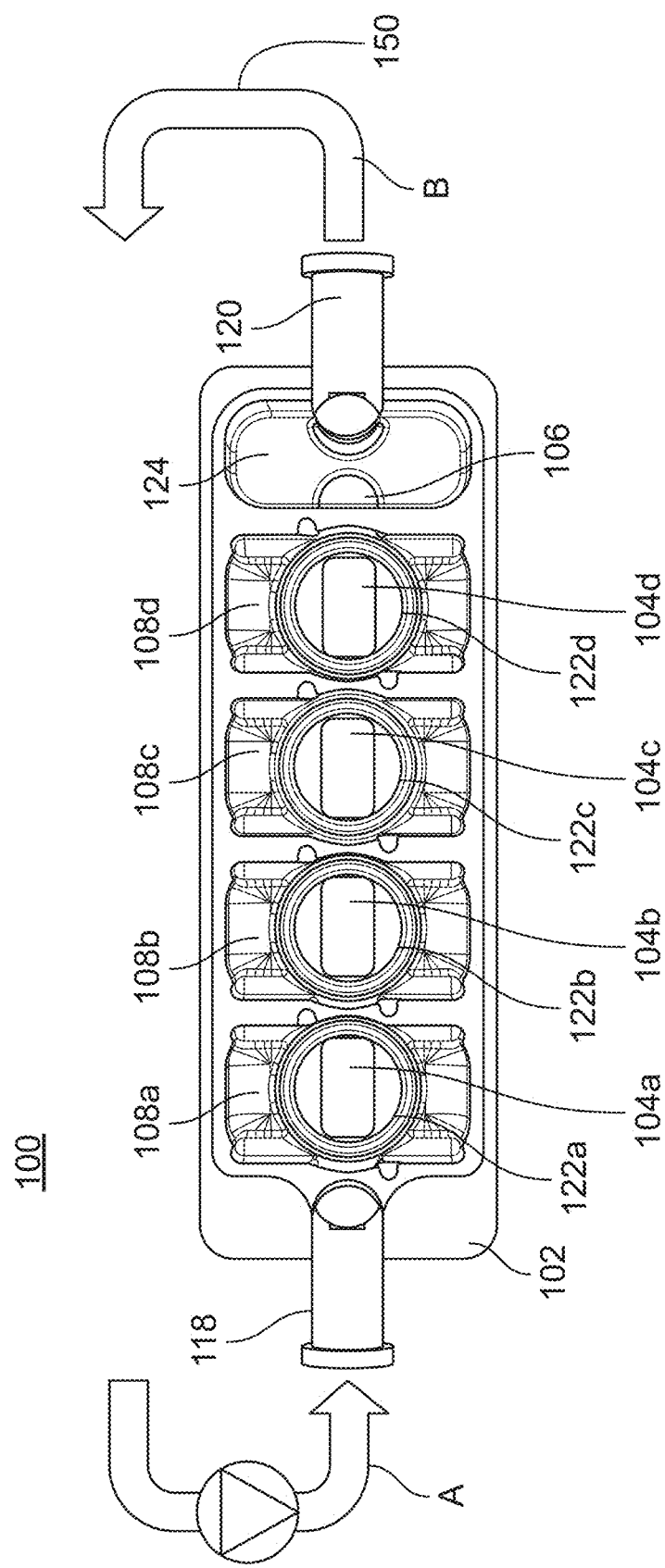
FIG. 13 is a top view of the OOC platform of FIG. 7, illustrating an exemplary flow pattern of vascular medium.

FIG. 13 illustrates an exemplary flow pattern of vascular medium within the OOC platform 102. In particular, the vascular network further includes a pump 150, which circulates the flow of vascular media 116 into inlet 118 and through channel 106. Vascular medium exits the platform 102 via outlet 120. The flow of the vascular medium 106 across the endothelial barrier 114 applies a fluidic shear of about 1-100 dyne/cm$^2$, e.g., about 5 dyne/cm$^2$. The fluid management system can be configured to circulate the vascular fluid at a defined shear rate, e.g., by controlling the pressure and flow rate through the use of pumps, Couette flow, a rocker system, etc.

The OOC platform may include fewer or more chambers as required. FIG. 14 illustrates OOC platform 202 in accordance with another embodiment. Platform 202 includes two chambers 208a, 208c. In other respects, platform 202 is substantially identical to platform 102.

FIGS. 15-16 illustrate a further embodiment. Platform 304 includes a pair of single chamber configurations. In particular, each configuration includes one chamber 308, which receives the vascular medium via inlet 318, which in turn supplies channel 206. Medium 106 exits the system via outlet reservoir 324 and outlet 320. System 300 may be useful where two tissue-engineered organoids each requires different vascular medium characteristics, e.g., composition of the vascular medium or flow characteristics, such as flow rate or pressure. In other respects, platform 302 is substantially identical to platform 102. As shown in FIG. 16, the vascular network can includes two pumps 350 that are provided to tailor the flow characteristics for each chamber 108a, 108b. The fluid management system can be configured to circulate the vascular fluid at a defined shear rate, e.g., by controlling the pressure and flow rate through the use of pumps, Couette flow, a rocker system, etc. For example, transmural pressure across the vascular barrier to a tissue chamber can be controlled via restriction of the channel, e.g., pinch valve on tubing or needle valve on the open port).

Figure 17:
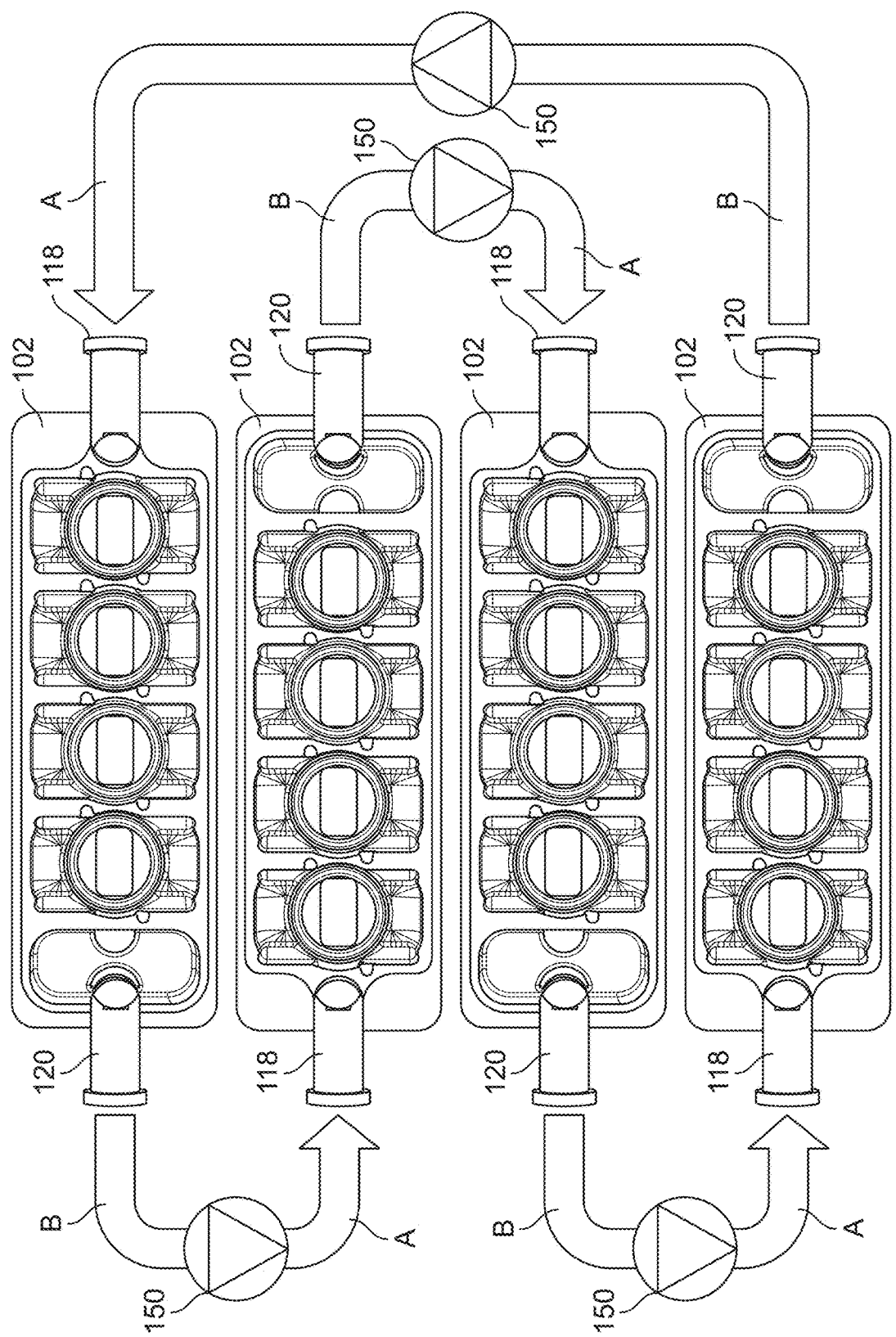
FIG. 17 is a top view, illustrating a plurality of OOC platforms of FIG. 7, illustrating a flow pattern of vascular media.
Figure 18:
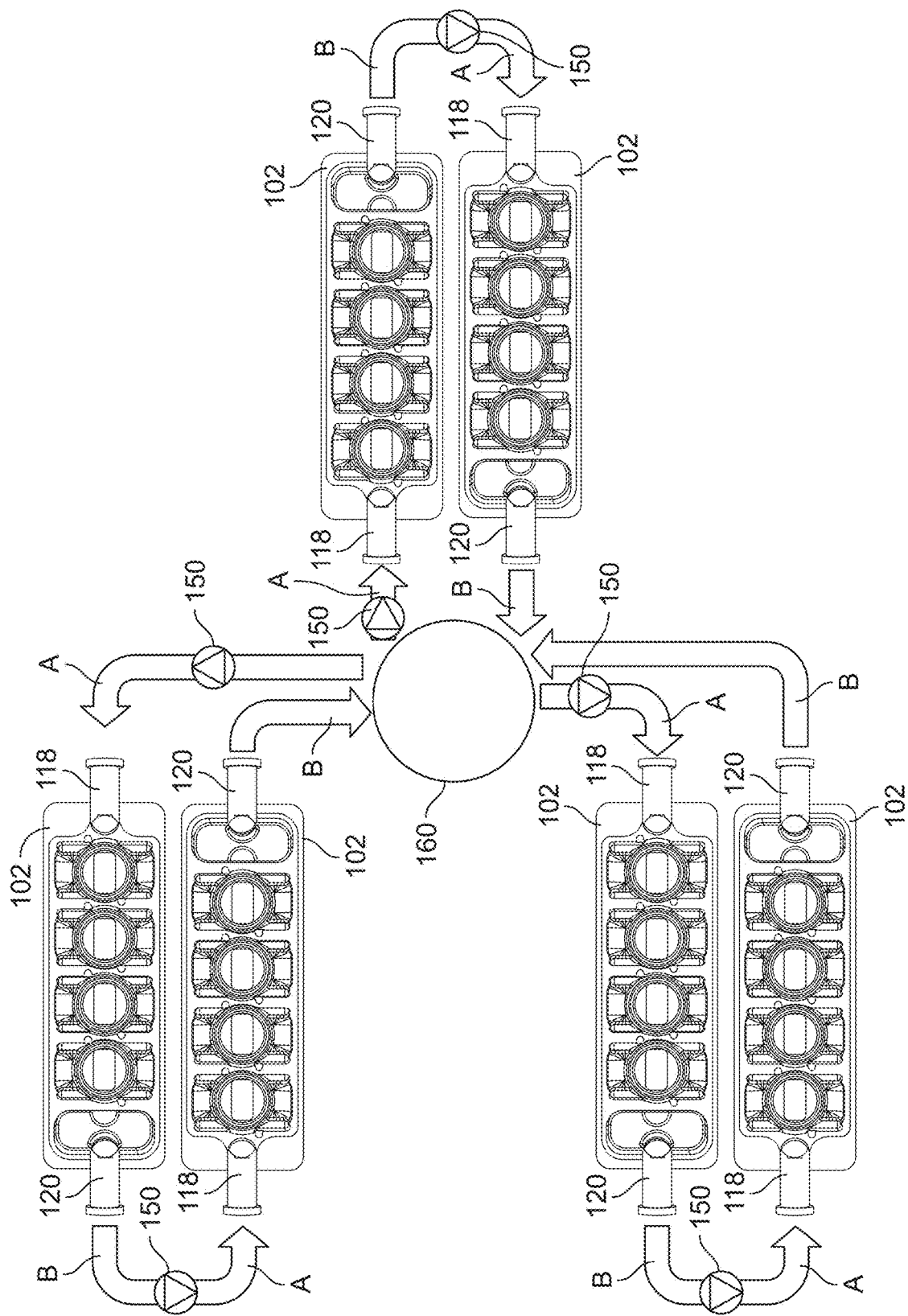
FIG. 18 is a top view, illustrating a plurality of OOC platforms of FIG. 7, illustrating another flow pattern of vascular media.

FIGS. 17 and 18 illustrate further exemplary flow patterns for the OOC platforms. As illustrated in FIG. 17, a plurality of platforms 102 can be interconnected in series to form a compact configuration. For example, the flow rate and/or pressure of the vascular medium can be controlled by four pumps 150. It is contemplated that fewer pumps, e.g., a single pump, may be used to recirculate the medium.

FIG. 18 illustrates another embodiment in which parallel circuits are provided with a common reservoir 160. According to this embodiment, three circuits are shown, each including two platforms 102 (8 wells total), which receive vascular medium from and return medium to reservoir 160. In some embodiments, pump 150 is provided at the inlet to each platform 102.

Figure 19:
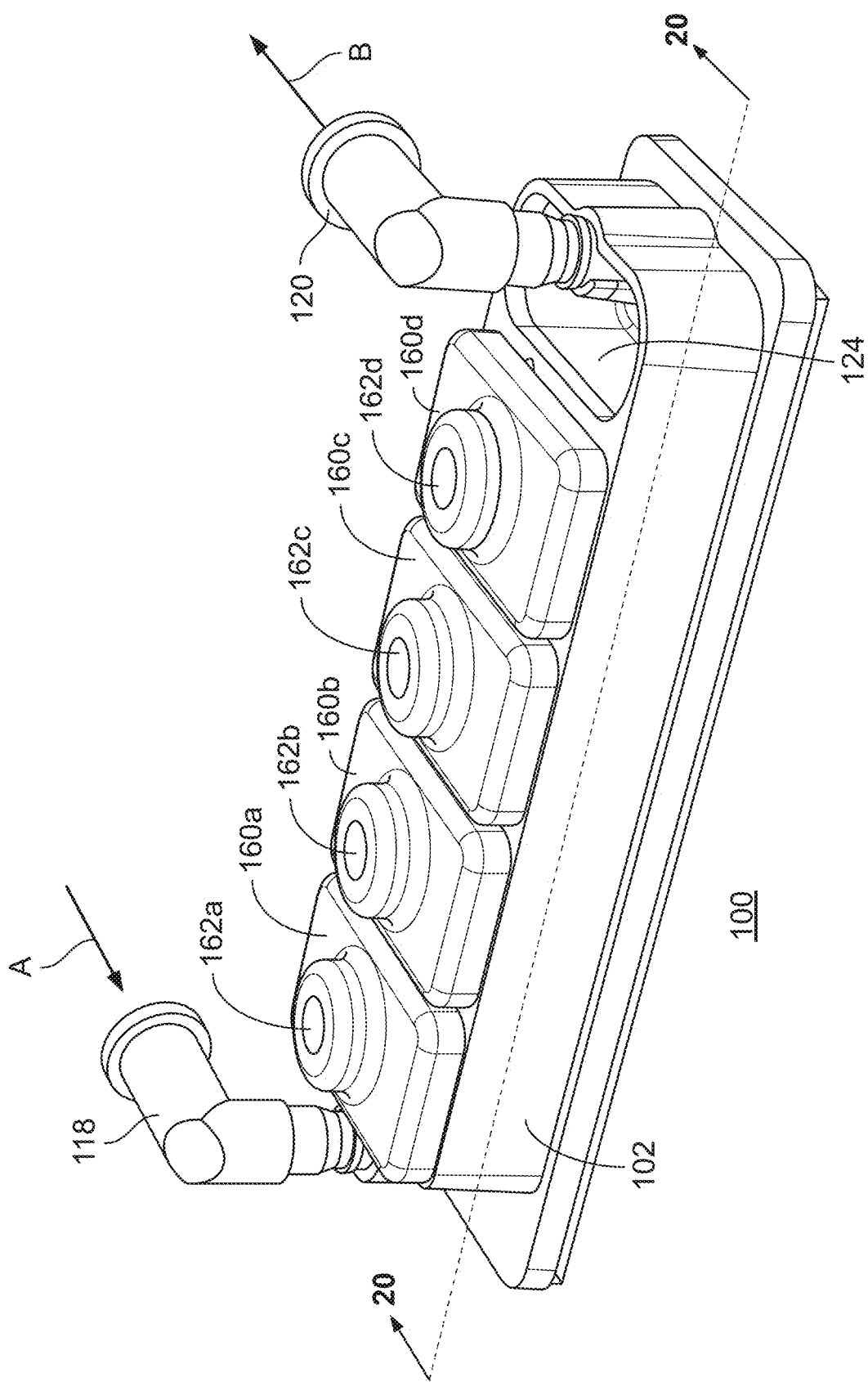
FIG. 19 is a perspective view from above of an OOC platform in accordance with another exemplary embodiment of the disclosed subject matter.
Figure 20:
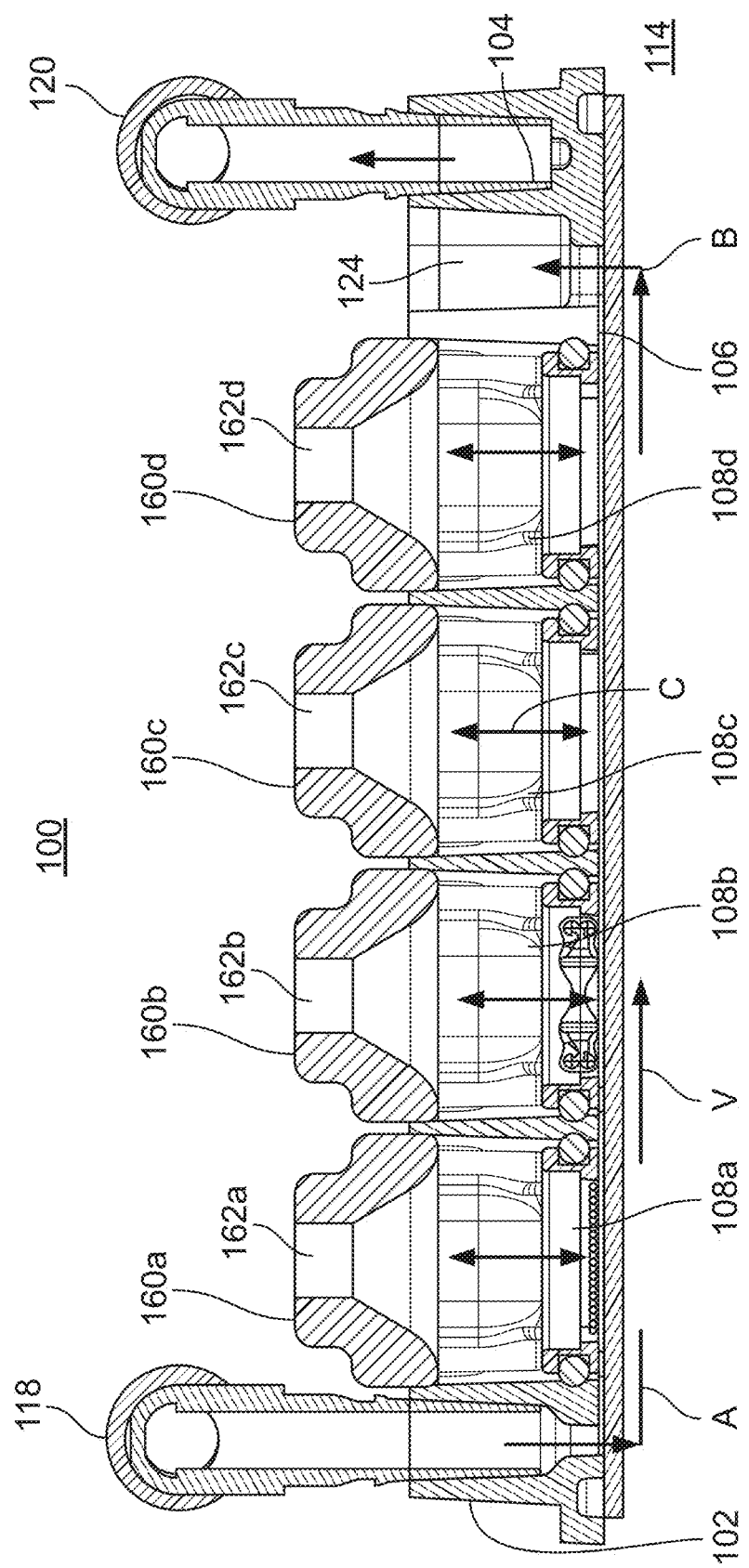
FIG. 20 is a cross-sectional view of the OOC platform of FIG. 19, taken along line 20-20 of FIG. 19.
Figure 22:
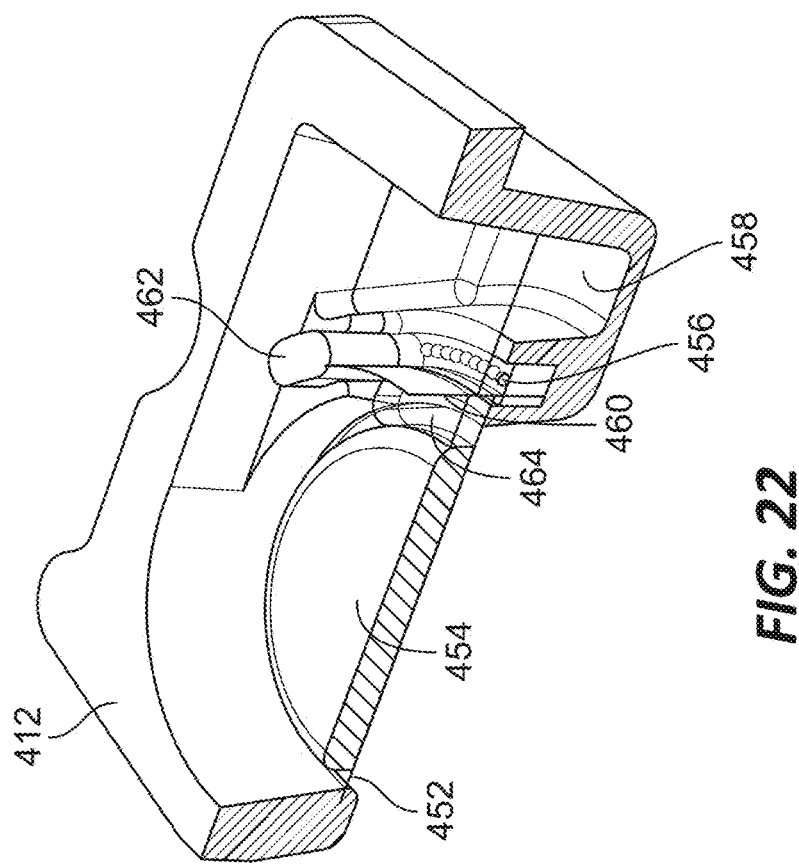
FIG. 22 is a perspective view in partial cross-section of the component of FIG. 21, taken along line 22-22 of FIG. 21.
Figure 21:
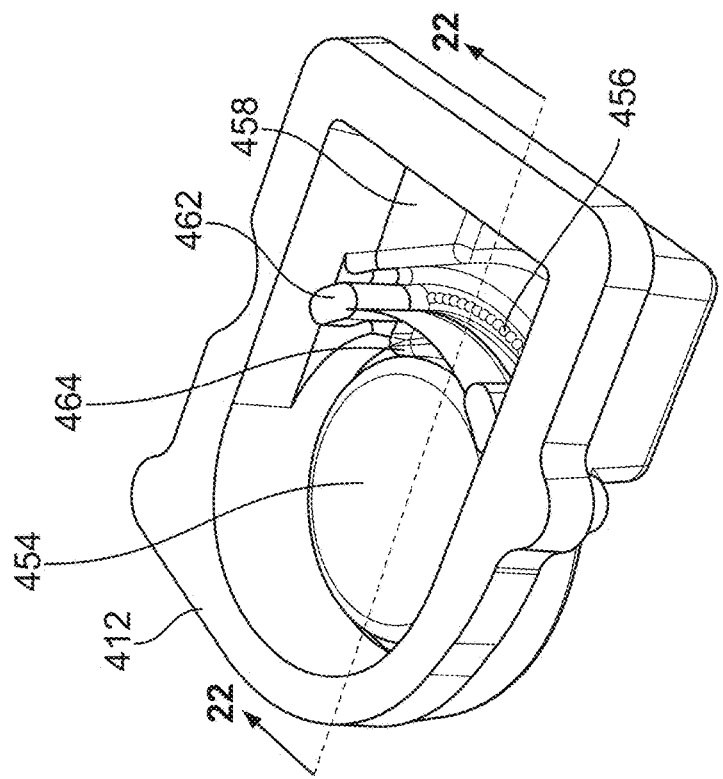
FIG. 21 is a perspective view from above of a component of the OOC platform in accordance with another exemplary embodiment of the disclosed subject matter.
Figure 24:
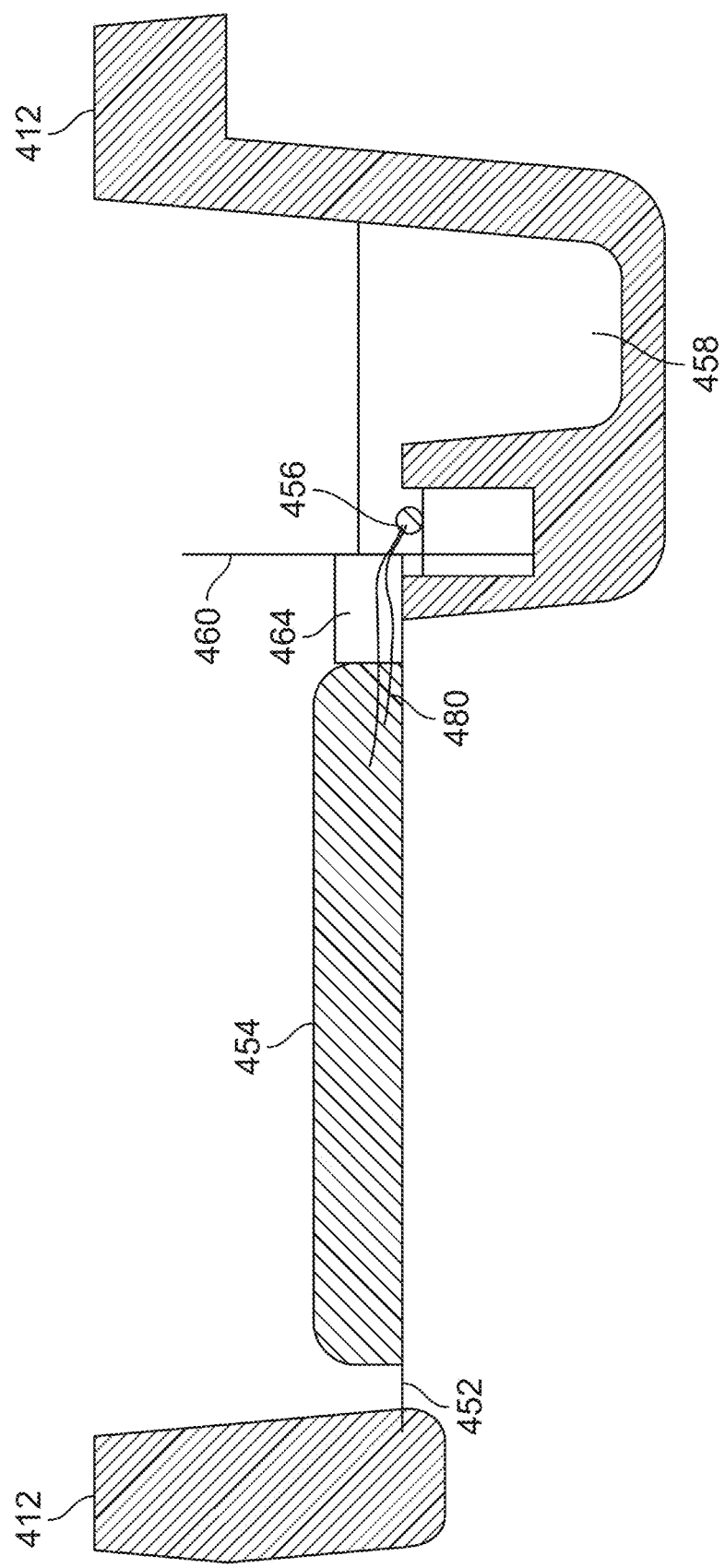
FIG. 24 is a cross-sectional view of the component of FIG. 21, taken along line 22-22 of FIG. 19.

FIGS. 19-20 illustrate another embodiment having closed chambers. A cap 160a, 160b, 160c, 160d is provided that seals each chamber, such that oxygen is provided to the tissue only through endothelial barrier 114 via the vascular medium 106. Each cap 160a, 160b, 160c, 160d can be provided with an aperture 162a, 162b, 162c, 162d that can be used a sample port for media exchange or a sight glass to view the progress of the tissue growth.

FIGS. 21-25 illustrate a tissue insert 412 for the culture of neurological organoids. Insert 412 includes a skin support membrane 452, e.g., 60 μm pore size, to support the growth of skin tissue 454 thereon A plurality of neurospheres (~250 μm diameter) are disposed on the insert 412 and separated from the skin 454 by an axon permeable membrane 460 (~5 μm pore size) supported by a pair of pillars 462. A well 458 is provided to contain neuromedium (~80 μL). A hydrogel 464 is supplied to allow axonal sprouting 480.

Figure 25:
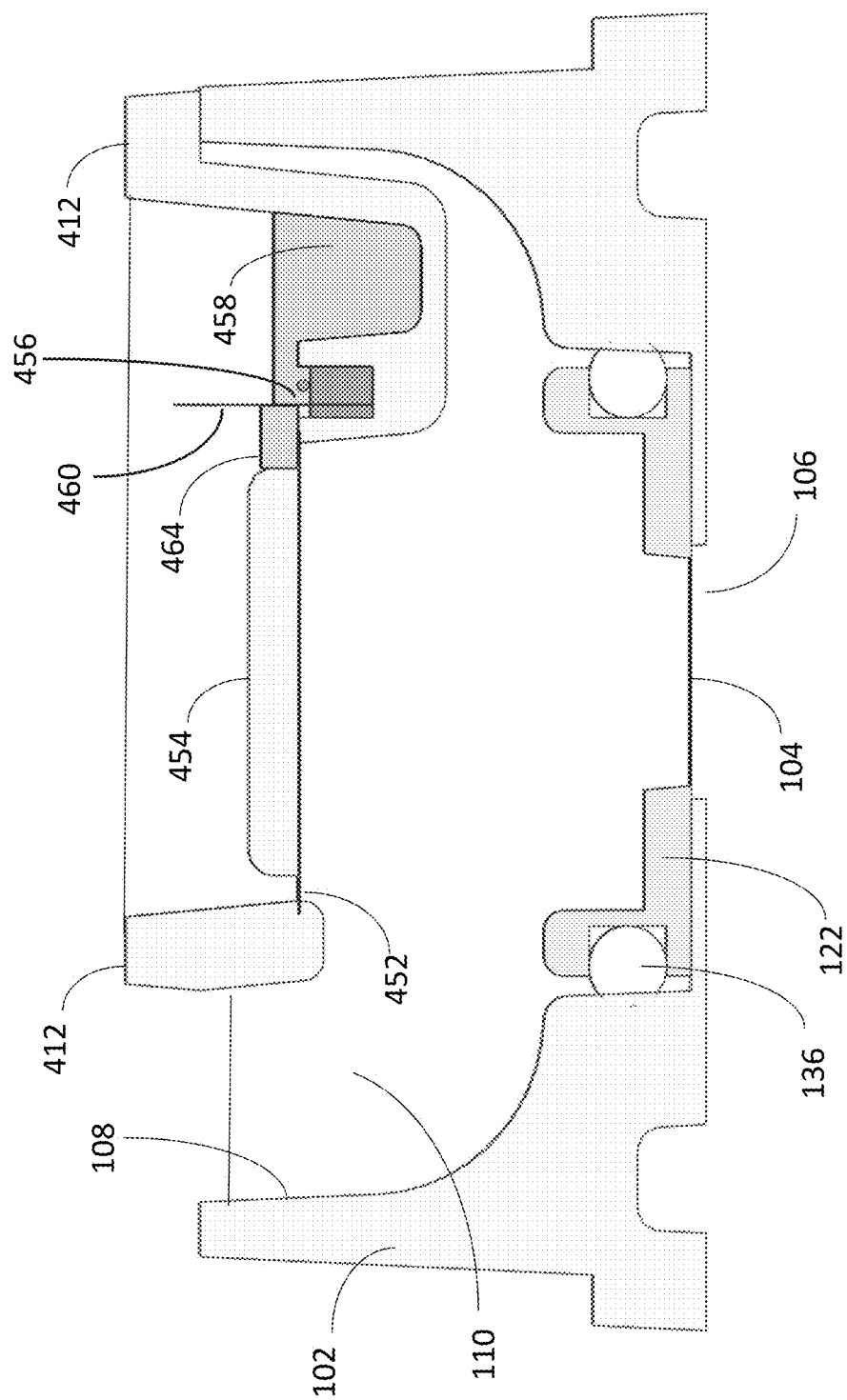
FIG. 25 is a cross-sectional view of the component of FIG. 24, positioned with the OOC platform.
Figure 28:
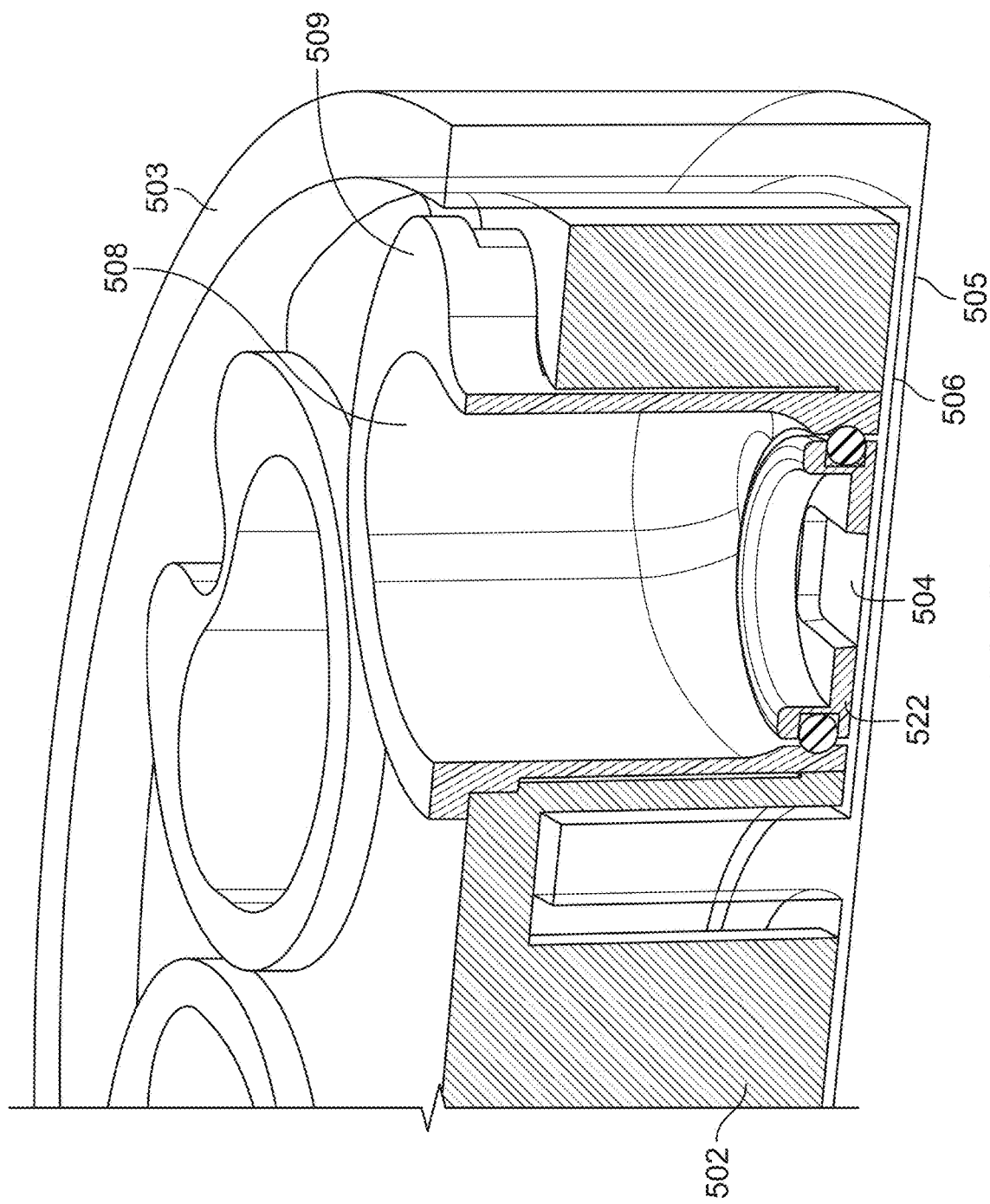
FIG. 28 is a partial cross-sectional view of the OOC platform of FIG. 26, taken along line 28-28 of FIG. 26.

As illustrated in FIG. 25, tissue insert 412 is positioned within a chamber 108 of the OOC platform 102. The chamber 108 is filled with a tissue-specific medium, e.g., ~1°mL of skin medium.

As discussed above, pumps 150/350 are used to circulate the vascular medium and apply fluidic shear to the endothelial barrier. FIGS. 26-29 illustrate another embodiment in which Couette flow is used to apply fluidic shear to the endothelial barrier. As illustrated in FIG. 26, OOC platform 502 comprises a circular configuration which is rotatably mounted within a circular outer member 503 having a bottom plate 505. A gap 506 is defined between the bottom surface of platform 502 and the top surface of plate 505.

A plurality of chamber inserts 509 are positioned within the platform 502, each of which defines a chamber 508 therein. Each chamber insert 509 further defines an aperture on the bottom portion for receiving a porous membrane insert 522. Porous membrane insert 522 is substantially identical to porous membrane insert 122 described herein above, and includes a barrier membrane 504 which supports and endothelial barrier 144 (not shown).

OOC Platform 502 rotates within outer member 503. Outer member 503 and platform 502 are coupled to induce rotary motion of platform 502. In some embodiments platform 502 is directly mechanically coupled to a rotary mechanism as is known in the art. In some embodiments, platform 502 is magnetic coupled to a rotary mechanism beneath plate 505 to induce rotation.

Figure 29:
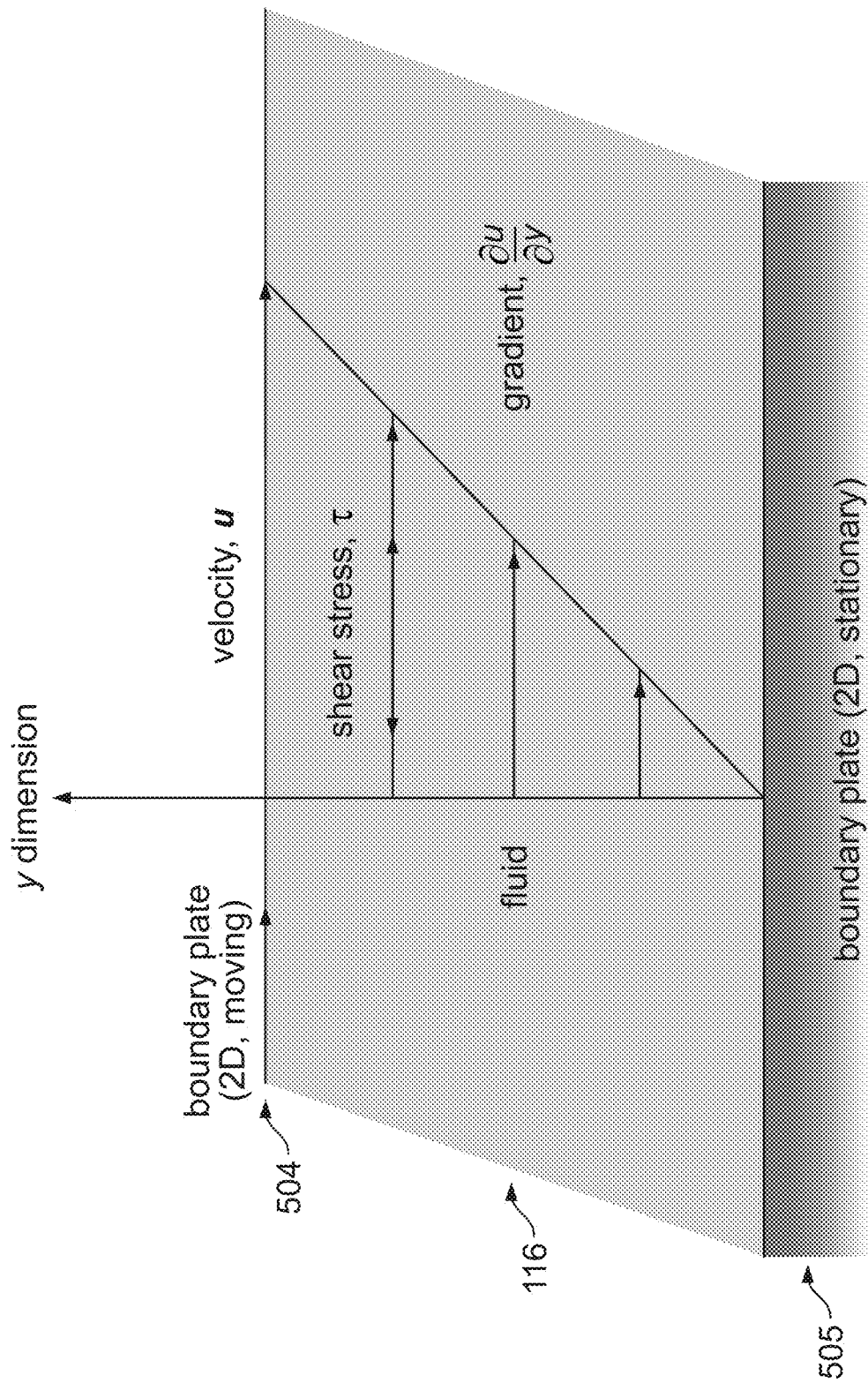
FIG. 29 is a graph illustrating the velocity vs. distance for fluid in the OOC platform of FIG. 26.

As illustrated in FIG. 29, rotary motion of the platform 502 with respect to the bottom plate 505 induces a Couette flow of the vascular medium 116 within the space 506. Since the bottom portion of platform includes the endothelial barrier 114 (supported by porous membrane 504), the Couette flow applies a fluidic shear to the endothelial barrier 144. The fluidic shear is believed to facilitate the exchange of media from the channel to each tissue-specific chamber.

Figure 32:
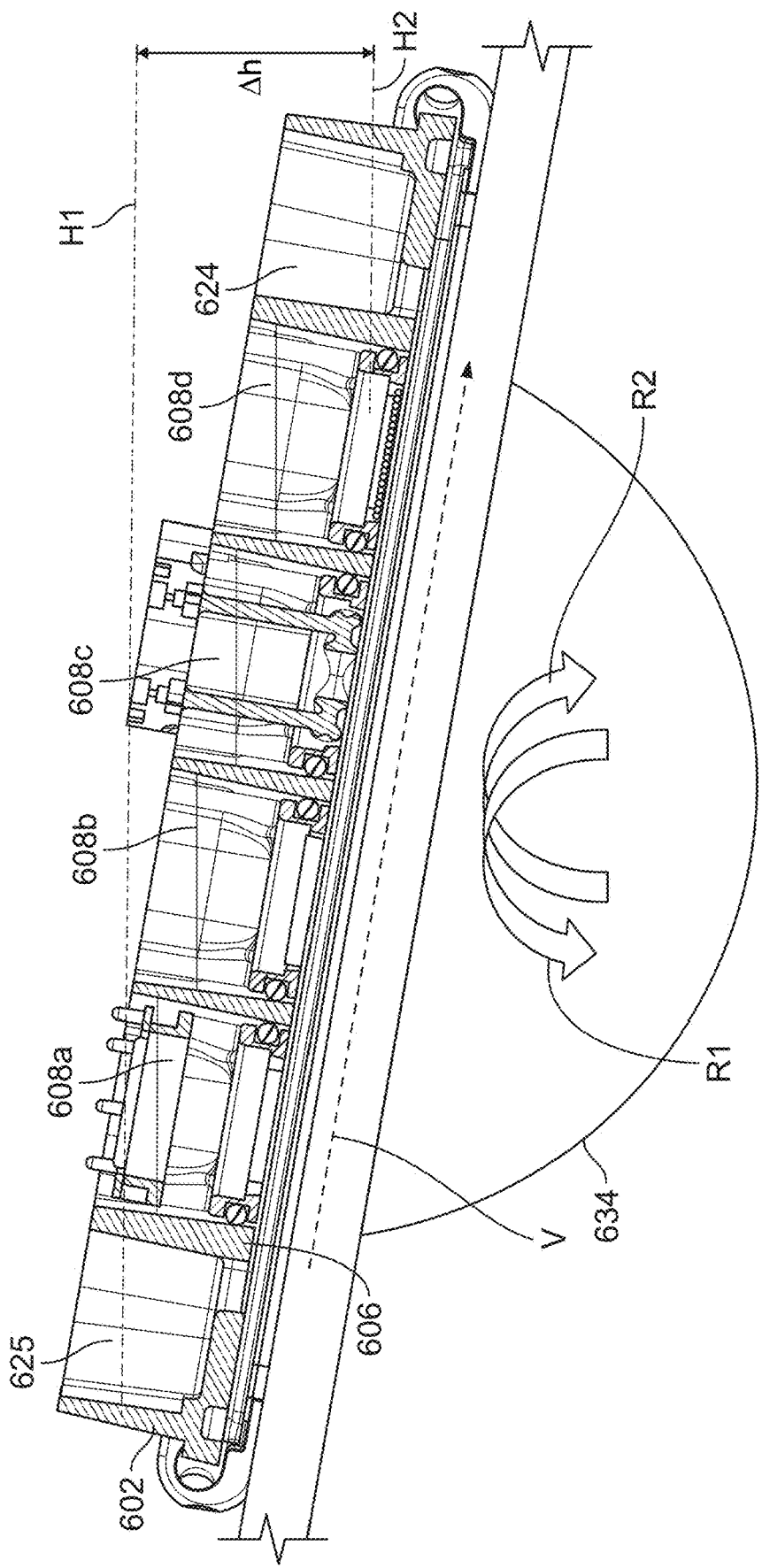
FIG. 32 is an enlarged side of the OOC platform of FIG. 31.

FIGS. 30-33 illustrate another embodiment in which a rocker mechanism is used to apply fluidic shear to the endothelial barrier. As illustrated in FIG. 30, OOC platform 602 includes a pair of reservoirs 624, 625 for storing vascular medium. Unlike platform 102, platform 602 does not include inlet 188 and outlet 120, but it is in most other respect substantially identical to platform 102. As illustrated in FIG. 32, platform 602 includes a channel 606 in communication with reservoirs 624 and 625.

System 600 is provided with a rocker mechanism that includes a pivot 634 and a base 632. Platform 602 rests on a plate 630 which is fixed to a pivot 634. Pivot 634 is capable of limited rotation about base 632. As illustrated in FIG. 32, platform 602 is capable of rotation in directions R1 and R2 with respect to base 634. For example, when, platform 602 rotates in direction R2, reservoir 625 is raised a height of ΔH (H1-H2) above reservoir 624. Vascular medium 116 flows through channel 606 in direction V towards reservoir 624. The flow of vascular medium 116 applies a fluidic shear to endothelial barrier 114. The fluidic shear is believed to facilitate the exchange of media from the channel to each tissue-specific chamber. When the platform 602 subsequently pivots in direction R1, the vascular medium flows back from reservoir 624 to reservoir 625, thereby applying a fluidic shear to the endothelial barrier 114 in the opposite direction.

EXAMPLES

The OOC platform described herein has been used to engineer human tissues from iPS cells to serve as physiologically relevant organ models, known as organs-on-chip (OOC). Development of OOC preclinical models of human solid tumors-such as Ewing sarcoma (ES) and osteosarcoma (OS), that more accurately recapitulate the disease seen in patients would greatly accelerate identification of new drugs with likelihood to show safety and therapeutic benefits in clinical trials. Monolayer cultures of cancer cells fail to recapitulate the ES and OS tumor phenotypes and lack the native-like tumor milieu. Tumor growth, metastasis, and response to therapy are critically dependent on cancer cell interactions with the native bone matrix, supporting cells, and secreted regulatory factors. Similarly, cardiac tissues bioengineered from human iPS cell are starting to serve as physiological models. In particular, human iPS cell-derived cardiac tissues can be matured in culture to display adult-like physiology, enabling more predictive drug studies than cell monolayers, cell aggregates or animal models.

A multi-center Eurosarc clinical trial of linsitinib, a small-molecule tyrosine kinase inhibitor of the insulin-like growth factor receptor (IGF-1R) and insulin receptor (INSR), was carried out in patients with advanced ES. Targeting of the IGF-1R pathway in ES showed high efficacy only in a small subset of patients, and the reasons for such heterogeneity in response remain unclear. Local IGF-1 expression has proven to be of prognostic value for the aggressiveness of OS, showing increased presence in patients with metastasis, no response to chemotherapy, and shorter survival times. A variety of therapeutic strategies targeting the IGF pathway have been successful in OS cell monolayers and OS xenografts but had only limited success in clinical trials. The discrepancies between the results obtained in cell monolayers, mouse models, and clinical studies suggest a need for testing the IGF-1R inhibitors like linsitinib in human tissue models.

Similarly, cardiotoxicity of linsitinib has been shown in clinical trials on patients with other types of cancers, and was associated with proarrhythmic events, like tachycardia and atrial fibrillation. IGF-1R signaling has an important role in normal cardiomyocyte function, with the IGF pathway being activated in the physiological hypertrophic response to exercise and hypertension. Animal studies with inactivation of the insulin and IGF1 receptors showed the development of dilated cardiomyopathy and lethal heart failure, with the knock-out of this receptor further increasing the mortality. The use of other tyrosine kinases' inhibitors like herceptin and imatinib mesylate was also associated with heart failure. Together, these studies suggest the necessity for determining cardiac toxicity of novel tyrosine kinase inhibitors using predictable preclinical models.

Figure 33:
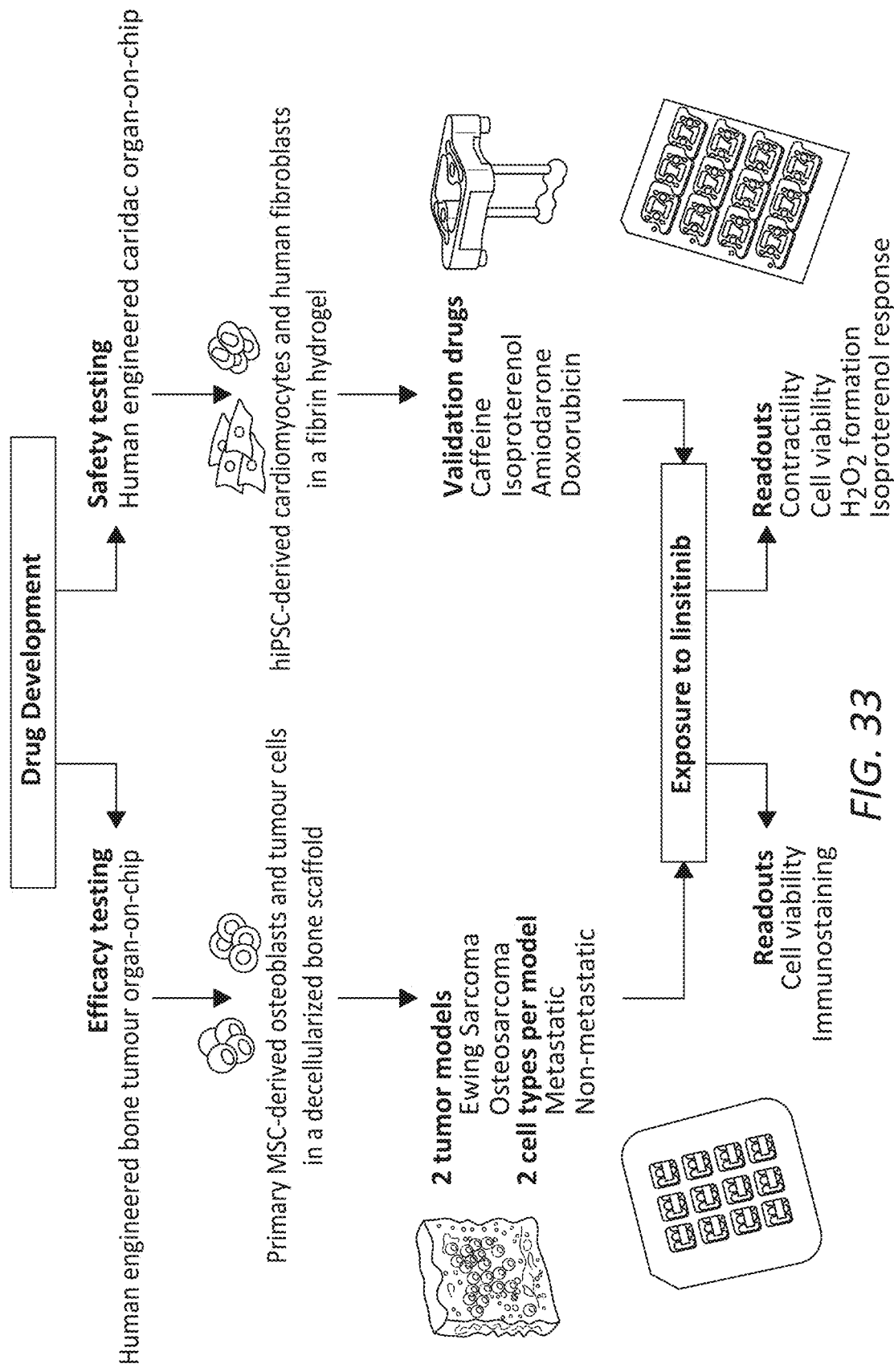
FIG. 33 is a schematic diagram of the experimental design.

To demonstrate the potential role of human OOC models in drug screening, a dual OOC approach to test both the efficacy and safety of linsitinib is provided (FIG. 33). The ES and OS human tissue models were implemented in a therapeutic screening of linsitinib, using two tumor models: metastatic and nonmetastatic, to assess drug efficacy. For drug safety, the effects of linsitinib were investigated on our developed human cardiac OOC. Combined, these studies demonstrate the enhanced predictive capacity of human OOC models and suggest the use of multiple OOC systems to address the different needs of the preclinical screening process.

Figure 34:
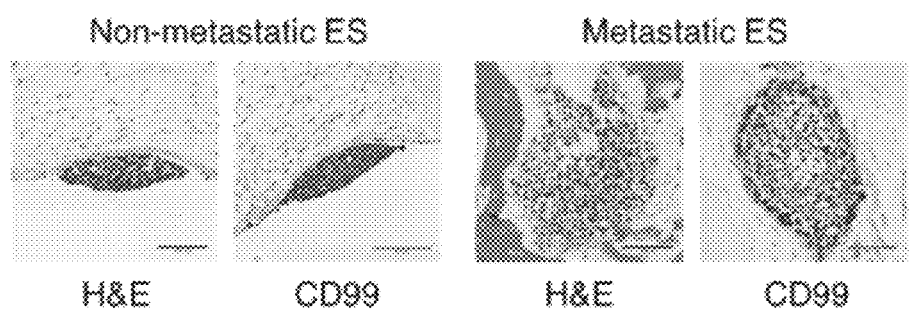
FIG. 34 is an immunohistochemical (IHC) analysis of non-metastatic and metastatic Ewing sarcoma organ-on-chip (OOC).

Organ-on-chip Ewing Sarcoma model development: The tissue-engineered ES (TE-ES) tumor model development was based on methodologies described in Villasante A, Marturano-Kruik A, Vunjak-Novakovic G., "Bioengineered human tumor within a bone niche.," Biomaterials. Elsevier Ltd; 2014; 35 (22): 5785-94. Two types of ES tumor cells were used for the models: metastatic (SK-N-MC cell line) and non-metastatic (RD-ES cell line), both of which expressed ES cell marker CD99 (FIG. 34). FIG. 34 is an immunohistochemical (IHC) analysis of non-metastatic (derived from RD-ES cells) and metastatic (derived from SK-N-MC cells) Ewing sarcoma organ-on-chip (OOC). H&E staining demonstrates tumor morphology within tissue engineered bone niche. Both tumor types are positive for Ewing sarcoma marker CD99.

Figure 35:
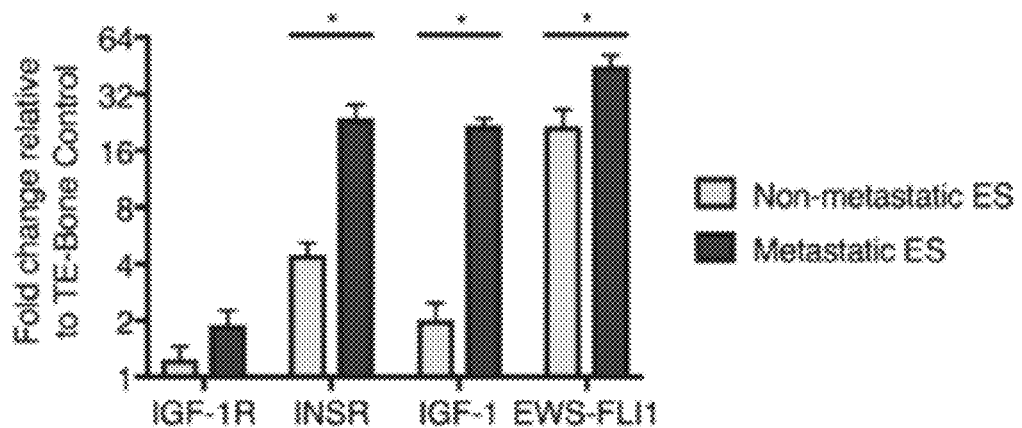
FIG. 35 is a graph representing gene expression of Ewing sarcoma translocation marker EWS-FLI1 and linsitinib targets in both non-metastatic and metastatic Ewing sarcoma OOCs.

FIG. 35 represents gene expression of Ewing sarcoma translocation marker EWS-FLI1 and linsitinib targets in both non-metastatic and metastatic Ewing sarcoma OOCs. Levels were normalized to β actin and shown relatively to the tissue engineered bone control.

Gene expression analysis using qRT-PCR revealed a significant increase in the ES translocation marker EWS-FLI1 as compared to bone control (FIG. 35), consistent with previous results that detailed the importance of incorporating the native milieu in tumor model development. Immunohistochemical (IHC) staining predictably showed the presence of both the inactivated and the phosphorylated IGF-1R in our tissue engineered tumors. Gene expression analysis by RT-qPCR of linsitinib targets in our TE-ES models showed similar IGF-1R levels as seen in the bone control (FIG. 35). Meanwhile, significantly higher expression of INSR and of the receptor ligand IGF-1 were observed for both non-metastatic and metastatic TE-ES models. Standard monolayer drug screenings are incapable of taking into account drug target expression within off target cell types, in this case osteoblasts.

Monolayer Ewing sarcoma culture also fails to model the tumor heterogeneity seen across patients. A variety of tumor sizes and locations along the bone scaffold was observed, which has an impact on intra-tumor heterogeneity and phenotype, with ES cells present along the edges of the scaffolds showing reduced staining for the proliferation marker Ki67.

Organ-on-chip Osteosarcoma model development: The approach used for ES was extended to develop another, more prevalent, bone tumor: osteosarcoma.

FIGS. 36A, 36 B, 37 A and 37 B are IHC analysis of nonmetastatic (derived from U2-OS or Saos2 cells) and metastatic (derived from KHOS/NP cells) osteosarcoma OOC; tissue engineered bone scaffold is shown as control. H&E staining demonstrates tumor morphology within tissue engineered bone niche. Both tumor types are positive for osteosarcoma marker EPHA2.

After 2 weeks of culture, H&E staining showed the formation of OS tumors both by metastatic (KHOS/NP) and non-metastatic (U2-OS and Saos2) cell lines (FIGS. 37 B, 36B and 37A, respectively). Given the phenotypic similarity of osteosarcoma cells to the cells of the native bone microenvironment, as well as the extreme heterogeneity observed in the disease, the use of distinct markers for OS makes tumor characterization highly important. IHC staining showed that the EPHA2 receptor, a highly expressed protein in OS patients, was strongly expressed in all osteosarcoma models (TE-OS), as compared to the bone controls (FIG. 36A). The metastatic TE-OS model also stained positively for the marker CD133, another marker for OS, showing that our model could be used to further validate OS markers in a more physiologically relevant system. Just as with the ES tumor models, tumor heterogeneity was observed across the TE-OS tumor models, which is a feature of solid tumors that needs improved models.

Figure 38:
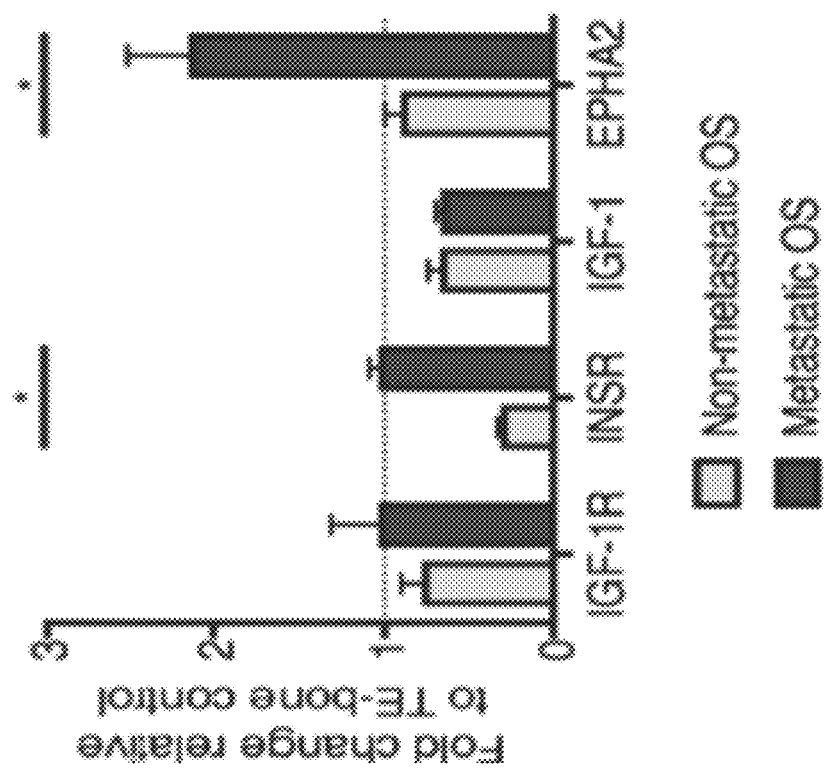
FIG. 38 is a graph illustrating gene expression of osteosarcoma marker EPHA2 and linsitinib targets in non-metastatic (U2-OS) and metastatic (KHOS/NP) osteosarcoma OOCs. Levels were normalized to β actin and shown relatively to the tissue engineered bone control. Data is presented as average+SD; *P<0.05; unpaired two-tailed Student's t test. All scale bars: 100 μm.

FIG. 38 is a plot illustrating gene expression of osteosarcoma marker EPHA2 and linsitinib targets in non-metastatic (U2-OS) and metastatic (KHOS/NP) osteosarcoma OOCs. Levels were normalized to β actin and shown relatively to the tissue engineered bone control.

RT-qPCR showed no statistical difference in EPHA2 expression in the non-metastatic TE-OS model as compared to the bone control but did show a slight increase in the metastatic one (FIG. 38). Gene expression analysis of the linsitinib targets revealed no significant differences in expression between the TE-OS models and bone control, with the exception of lower INSR expression in the non-metastatic model. As with the TE-ES models, the strong expression of drug targets amongst the osteoblasts present in native tumor microenvironment shows a need for the coculture of primary bone tumors within functional bone.

Figure 39:
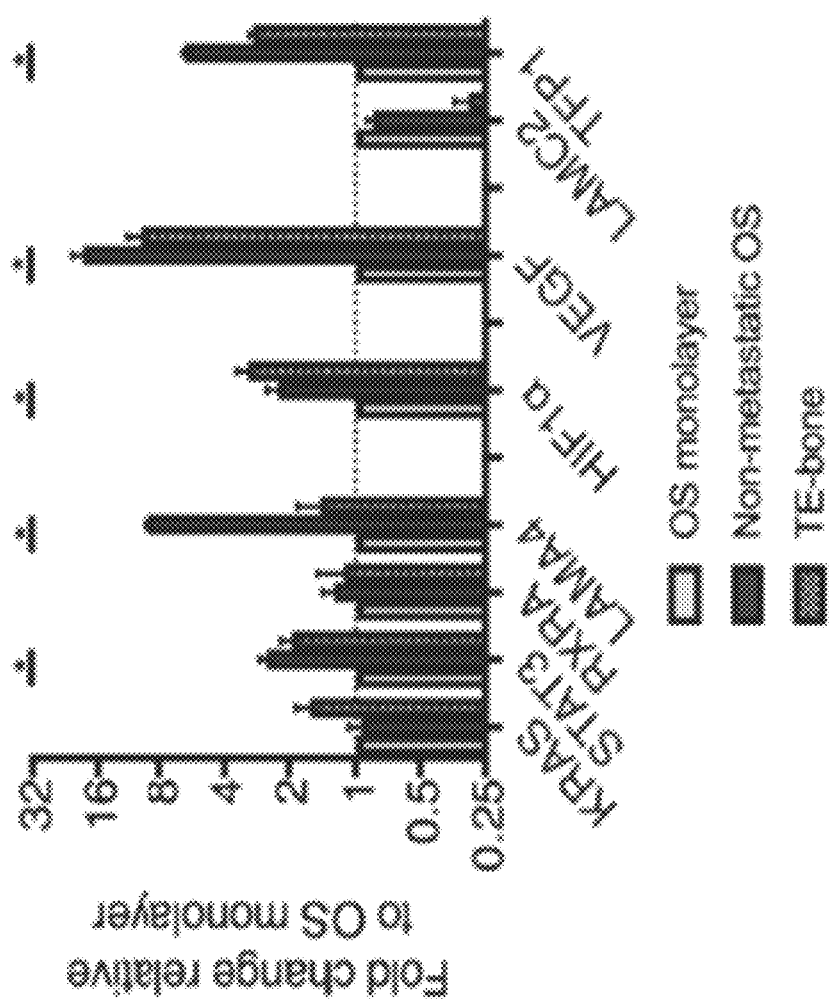
FIGS. 39 and 40 are graphs illustrating Gene expression of cancer related genes and genes related to the native human tumor phenotype in non-metastastic (U2-OS, FIG. 39) and metastatic (KHOS/NP, FIG. 40) osteosarcoma OOCs.
Figure 40:
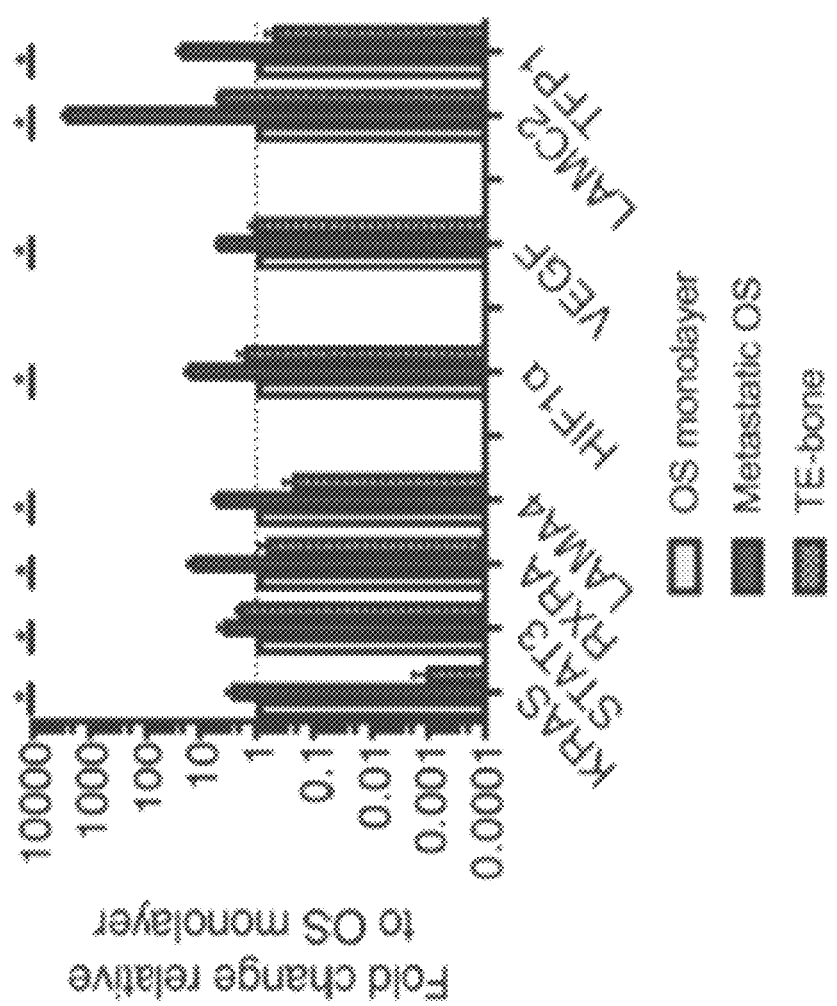

FIGS. 39 and 40 are graphs illustrating Gene expression of cancer related genes and genes related to the native human tumor phenotype in non-metastastic (U2-OS, FIG. 39) and metastatic (KHOS/NP, FIG. 40) osteosarcoma OOCs. Gene expression levels were normalized to β actin and shown relatively to the respective cancer cell line monolayers from which each OOC was derived. Tissue engineered bone lacking tumors is included as a control. Data is presented as average+SD; *P<0.05; unpaired two-tailed Student's t test. All scale bars: 100 μm.

Further gene expression analysis showed significant increases in expression of four cancer related genes (KRAS, RXRA, STAT3, LAMA4) in our metastatic TE-OS model, relative to the respective cancer cell monolayer (FIG. 40). Meanwhile, the non-metastatic TE-OS model displayed significant increases only of STAT3 and LAMA4 (FIG. 39). Both models displayed a high background osteoblast expression of STAT3. As with the TE-ES models, we observed a significant induction of hypoxia-inducible factor 1-α (HIF1-α), a response to the type of hypoxic phenotype noted in patient tumors, over that seen in monolayer. Additionally, it is well known that hypoxia driven, HIF1-α mediated induction of vascular endothelial growth factor (VEGF-α) is a critical component of tumor angiogenesis, the tumor's response to a microenvironment that is low in oxygen and nutrients, and it can be seen across both of the TE-OS models. Notably this HIF1-α mediated angiogenesis is particularly increased in the non-metastatic OS model, which aligns with the more static nature of the cell line that would need to establish itself and take root in the bone microenvironment.

Vasculogenic mimicry, or the ability of tumor cells to form functional perfusion channels, was observed through induction of endothelium-associated gene TFP1 across both models (FIGS. 39-40). There was not only a stronger expression of TFP1 in the metastatic OS than in either the monolayer or non-metastatic OS model, but also a massive increase in the vasculogenic mimicry marker LAMC2. This effects is in line with the known association of vasculogenic mimicry as a prognostic marker for aggressive OS tumors, and with the observations that an invasive, metastatic cell line is needed for establishing vascular mimicry.

Responses of ES and OS organ-on-chip models to linsitinib: The ongoing phase II clinical trial is using linsitinib at a plasma concentration of 12 μM in patients with refractory or relapsed ES. The importance of the IGF pathway in OS tumors motivated the studies of linsitinib in four different tumor models (ES and OS; metastatic and non-metastatic). To track cancer cell populations and their responses to drugs, an HIV-based lentiviral system was used to introduce a CMV promoter, combined GFP-luciferase vector into ES (SK-N-MC and RD-ES) and OS cell lines (U-2 OS, Saos2, and KHOS/NP).

Titration studies in cancer cells were performed to demonstrate that the GFP-luciferase expression-dependent luminescence signal could serve as an indicator of cancer cell number and viability. An initial linsitinib titration experiment was performed on both TE-ES and TE-OS models over the same 21-day treatment cycle that was used in patients in the Eurosarc trial (FIG. 41), with luminescence signal serving as an indicator of cancer cell viability. This experiment revealed a dose response and showed that the 12 μM dosage in patient's plasma in the clinical trial was sufficient to cause significant responses in ES and OS models. Immunohistochemical staining of the ES model showed reduced proliferation via Ki67-staining while a terminal deoxynucleotidyl transferase (TdT) dUTP nick-end labelling (TUNEL) assay showed increases in apoptosis, corroborating the luminescence viability findings Drug treatment experiments recapitulating the patient treatment regimens and the patient plasma concentration of 12 μM of linsitinib were then carried out on the nonmetastatic and metastatic TE-ES and OS models.

FIGS. 42 and 43 are graphs illustrating non-metastatic (RD-ES cell line derived, FIG. 42) and metastatic (SK-N-MC cell line derived, FIG. 43) Ewing sarcoma OOCs were exposed to linsitinib (12 μM) according to the drug treatment regimen. Luminescence as a function of cancer cell number and viability was measured (mean±s.e.m., n=6 for day 3, and n=3 for day 7 and 21, biologically independent per group). Significance was determined by unpaired two-tailed Student's t test of treatment group at specific day with respective control; *P<0.05; P<0.01; *P<0.001.

Following 3, 7, and 21 days of treatment, luminescence signals were measured for all samples in order to establish cancer cell number and viability. Already after 3 days, a significant drug response was observed in both the nonmetastatic and metastatic ES models (FIGS. 42-43); significant responses were also observed at day 7 and day 21 in both models. There was however a discrepancy observed between the nonmetastatic and metastatic ES models. Linsitinib appeared to cause an initial significant drop in cancer cell population in the non-metastatic model and this population stopped expanding after the treatment. Critically, even though a significant response to the drug was observed in the metastatic ES model after 3 days, a decrease in drug efficacy was observed afterwards, and this treated population continued to expand throughout the 21-day treatment cycle. These results indicate resistance to the inhibitor which is often observed clinically in patients with metastatic ES. Further investigations using this tumor model could elucidate why certain cancer cell types are resistant while others are highly responsive to IGF-1R inhibitors. This is actually one of the goals of the ongoing clinical trial recruiting the patients with relapsed or refractory ES, which is strongly associated with metastatic ES.

Figure 44:
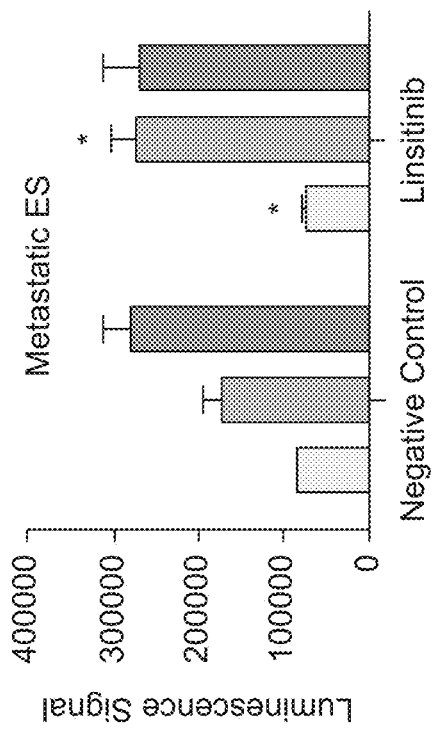
FIGS. 44 and 45 are graphs illustrating non-metastatic (U2-OS cell line derived, FIG. 44) and metastatic (KHOS/NP cell line derived, FIG. 45) osteosarcoma OOCs exposed to linsitinib (12 μM) according to the drug treatment regimen outlined.
Figure 45:
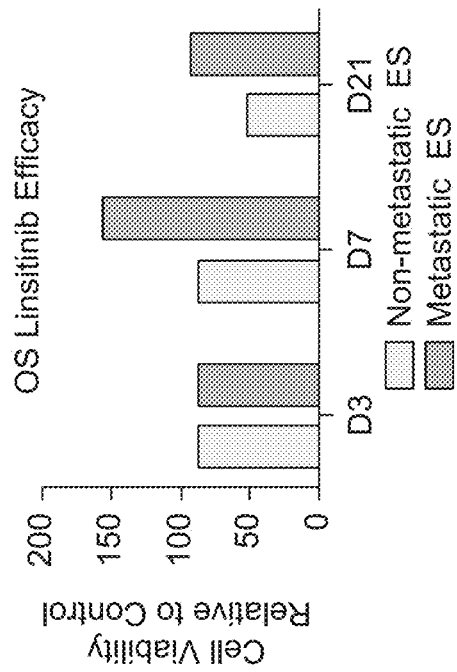

FIGS. 44 and 45 are graphs illustrating non-metastatic (U2-OS cell line derived, FIG. 44) and metastatic (KHOS/NP cell line derived, FIG. 45) osteosarcoma OOCs exposed to linsitinib (12 μM) according to the drug treatment regimen outlined. Luminescence as a function of cancer cell number and viability was measured (mean±s.e.m., n=6 for day 3, and n=3 for day 7 and 21, biologically independent per group). Significance was determined by unpaired two-tailed Student's t test of treatment group at specific day with respective control; *P<0.05; P<0.01; *P<0.001.

Figure 46:
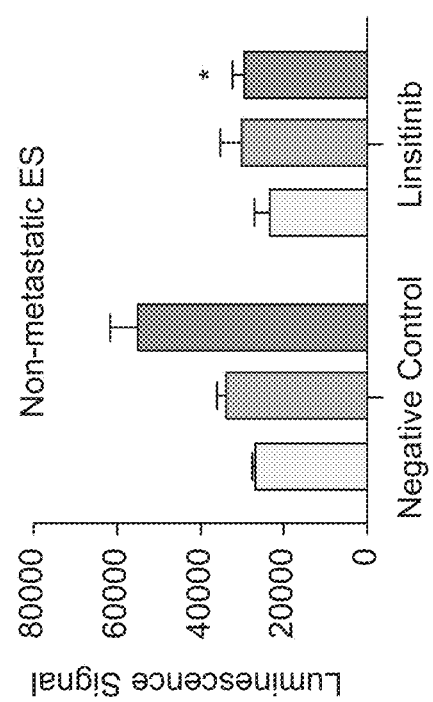
FIGS. 46 and 47 are graphs illustrating average drug efficacy (ratio of mean luminescence signal of treatment group to mean luminescence signal of control group) at days 3, 7, and 21 of the linsitinib treatment regimen.
Figure 47:
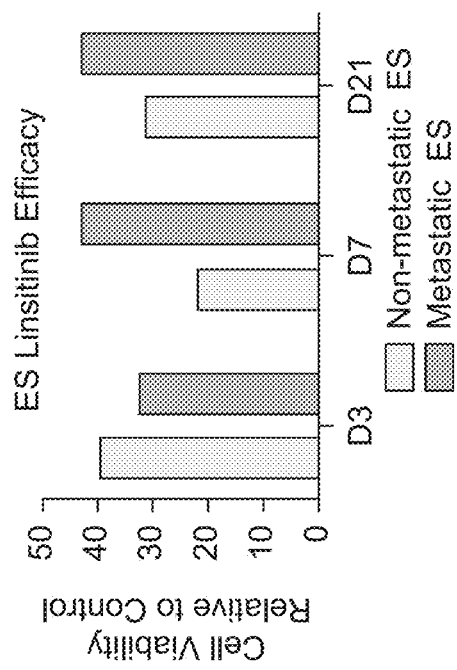

FIGS. 46 and 47 are graphs illustrating average drug efficacy (ratio of mean luminescence signal of treatment group to mean luminescence signal of control group) at days 3, 7, and 21 of the linsitinib treatment regimen.

In the TE-OS models, after 3 days no significant response was observed in the non-metastatic model, while significant drug response was seen in the metastatic one. These trends reversed over the course of the 21-day treatment. A significant response was seen in the non-metastatic model only after 3 weeks of drug treatment, with a treated cancer cell population that was no longer expanding, suggesting clinical trial potential of Linsitinib for non-metastatic OS. Inversely, the inhibitor appears to have stopped being effective for metastatic OS by day 7, seemingly causing the tumor to rapidly expand before stabilizing by D21 (See FIGS. 44-47). This result aligns with what is often seen clinically, namely that patients with metastatic OS have a poorer response and survival rate than patients with non-metastatic OS.

Development of human cardiac organ-on-chip model: Using an adapted version of Joseph Wu's cardiac differentiation protocol. (Burridge P W et al., Chemically defined generation of human cardiomyocytes. Nat Methods [Internet]. 2014; 11 (8): 855-60), human iPS cells were differentiated into cardiomyocytes, with high efficacy. The human tissue models are believed to serve as the missing link between preclinical and clinical trials, and developed a 3D model of human heart tissue. Fibrin hydrogel encapsulating human iPS cell-derived cardiomyocytes and dermal human fibroblasts was compacted around two flexible pillars (See, tissue model 112*a* in FIG. 11). The pillars subjected the hydrogel to mechanical loading designed to mimic that in the native heart. The hydrogel compaction caused passive tension in the tissues as they're stretched and aligned between the pillars. Synchronous contractions forced the tissues to work against the pillars. After the tissues were matured, over 4 weeks of culture, they were exposed to drugs with known cardiac side effects, to validate the model.

FIGS. 48-51 illustrate the validation of human cardiac organ-on-chip through exposure to drugs with known cardiac effects.

Figure 48:
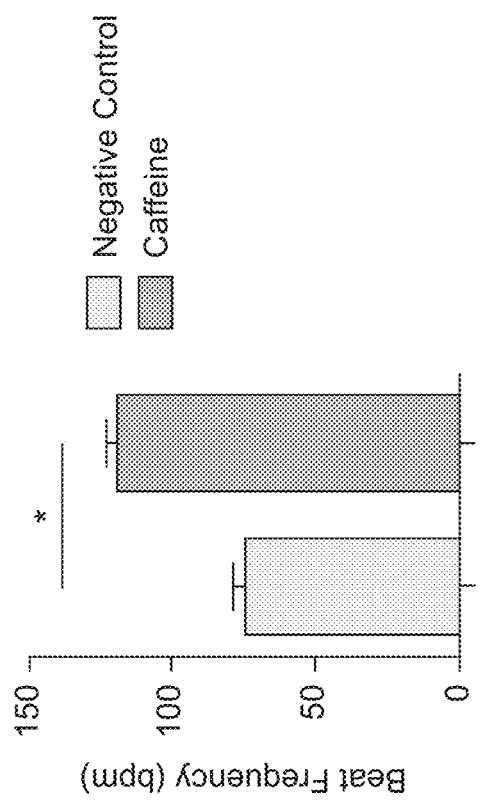
FIG. 48 illustrates human cardiac OOC response to caffeine (50 mM) (mean±s.e.m., n=5 biologically independent samples per group).
Figure 49:
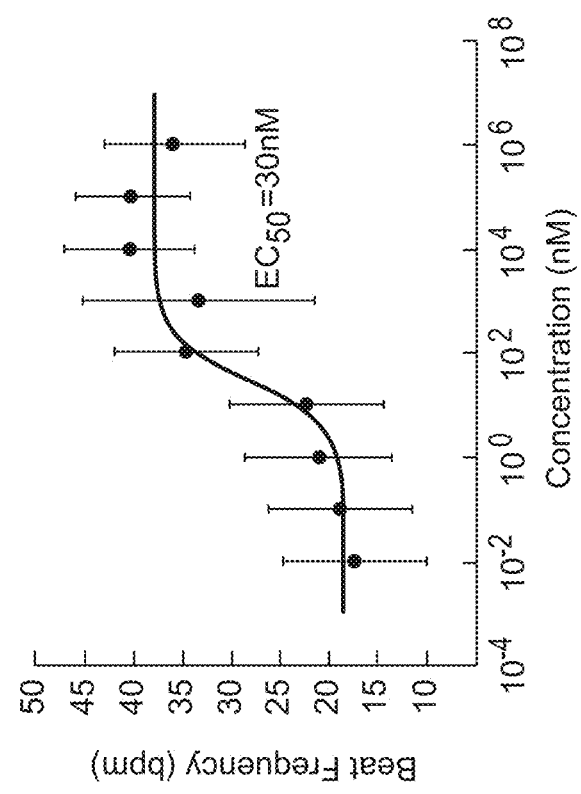
FIG. 49 illustrates isoproterenol dose response on human cardiac OOC ((mean±s.e.m.).

Caffeine is an inducer of ryanodine receptor-mediated calcium release with a known tachycardie side effect. Cardiac tissues exposed to caffeine demonstrated an increase in beat frequency, as observed in human myocardium (FIG. 48). The tissues were exposed to isoproterenol, a nonselective beta-adrenergic agonist and one of the gold standards for assessing the ability of a cardiac tissue model to recapitulate beta-adrenergic responses. We observed the expected increase in beat frequency, with an EC50 value of 30 nM (FIG. 49).

Figure 50:
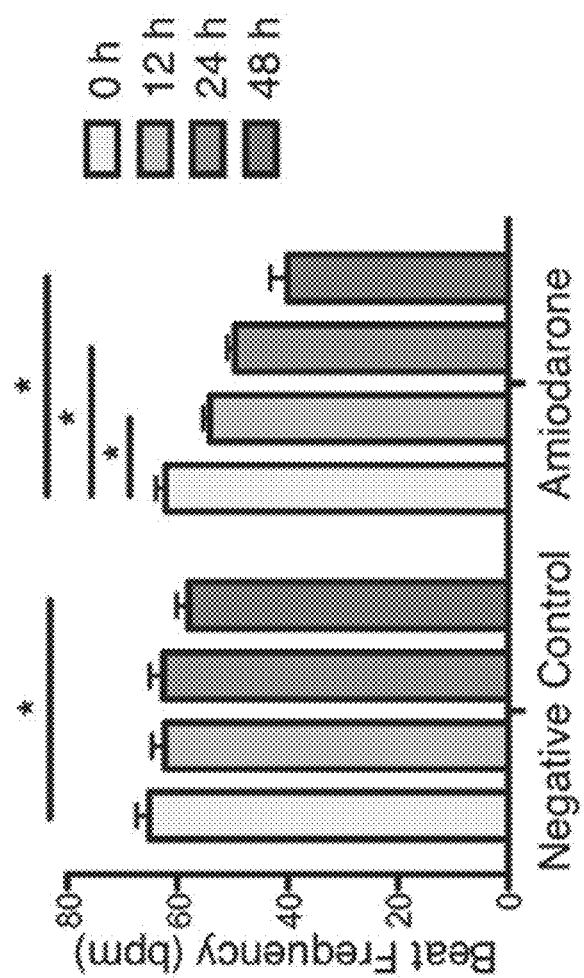
FIG. 50 illustrates human cardiac OOC response to amiodarone (2.42 M) over 48 hours (mean±s.e.m., n=6 [negative control] and 7 [amiodarone] biologically independent samples). *P<0.05 by unpaired, two-tailed Student's t-test or two-way ANOVA with Bonferroni post-test.

Amiodarone, an antiarrhythmic therapeutic agent, is used to treat and prevent various types of irregular heartbeats by blocking the potassium channels and increasing the effective refractory period. When cardiac tissues were exposed to amiodarone, the beating frequency decreased, as expected (FIG. 50).

Figure 51:
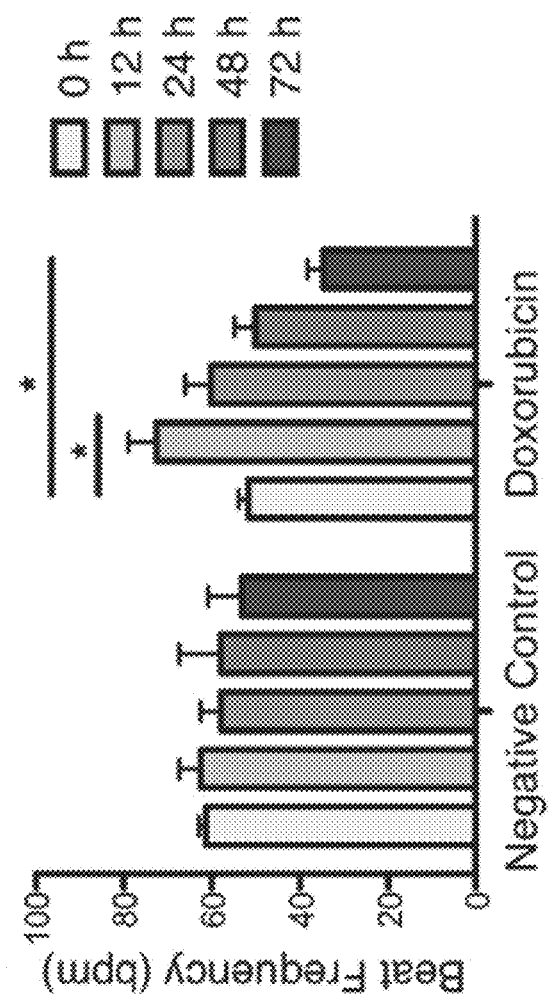
FIG. 51 illustrates human cardiac OOC response to doxorubicin (1 µM) over 72 hours (mean±s.e.m., n=7 biologically independent samples per group). *P<0.05 by unpaired, two-tailed Student's t-test or two-way ANOVA with Bonferroni post-test.

While linsitinib is an anti-cancer drug still undergoing clinical trials, doxorubicin is a chemotherapy medication used to treat several types of cancer with known and well documented cardiotoxic side effects. This toxicity can be acute, with manifestations of sinus tachycardia and supraventricular tachycardia in the first days of treatment, or chronic, manifesting as dilated cardiomyopathy, which can lead to congestive heart failure. When exposed to doxorubicin, the cardiac model presented an initial increase in beat frequency, but with prolonged exposure to the drug its beat frequency decreased. The cardiac model was capable of recapitulating the clinically observed cardiotoxicity of doxorubicin (FIG. 51). Overall, the cardiac model was able to recapitulate the physiological effects of four drugs observed clinically in patients.

Figure 52:
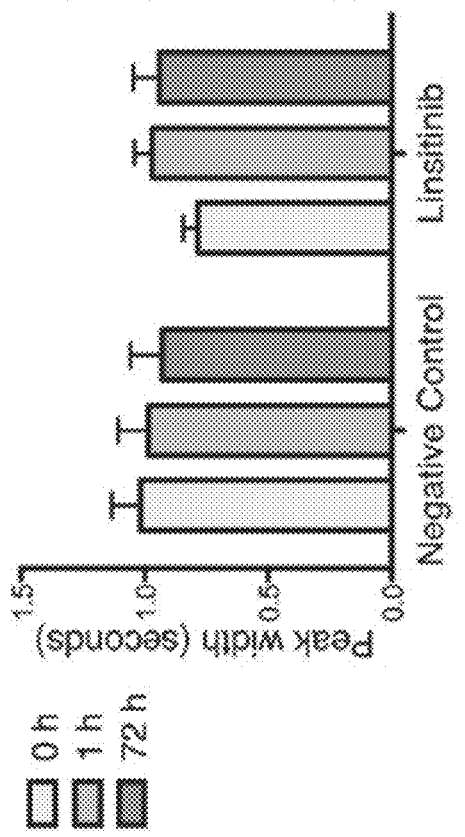
FIG. 52 is a graph illustrating contractility characterization (beat frequency) of human cardiac OOC after exposure to linsitinib (12 µM) (mean±s.e.m., n=11 biologically independent samples per group).
Figure 53:
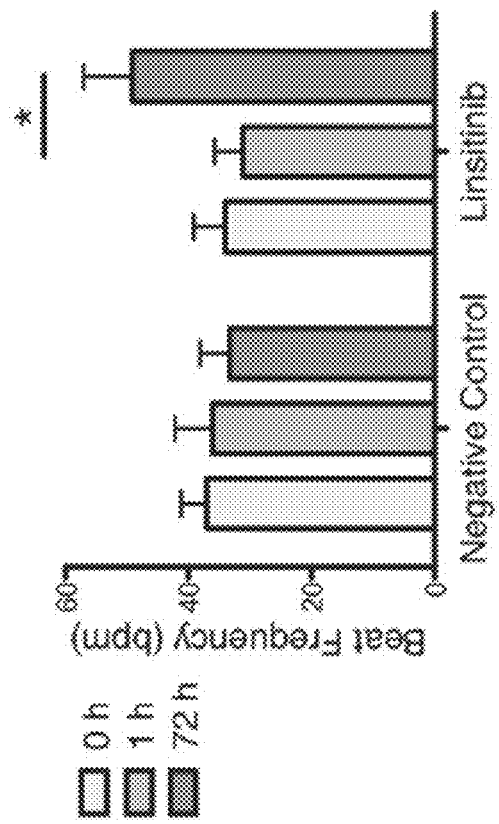
FIG. 53 is a graph illustrating contractility characterization (peak width) of human cardiac OOC after exposure to linsitinib (12 µM) (mean±s.e.m., n=11 biologically independent samples per group).
Figure 54:
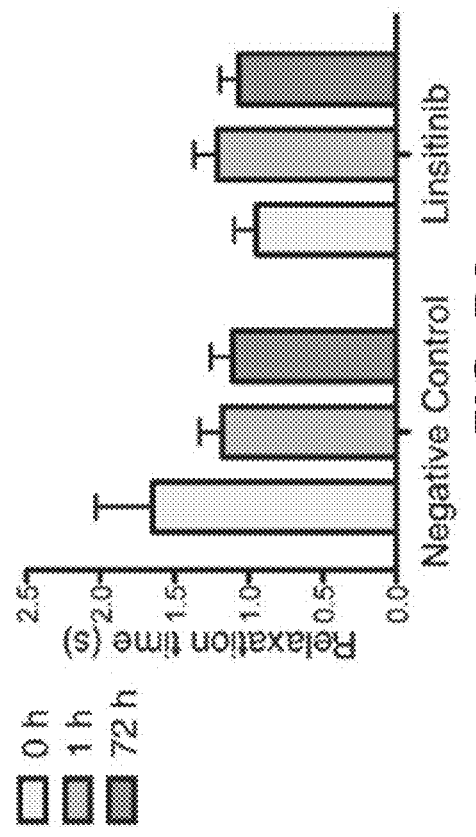
FIG. 54 is a graph illustrating contractility characterization (relaxation time) of human cardiac OOC after exposure to linsitinib (12 µM) (mean±s.e.m., n=11 biologically independent samples per group).
Figure 56:
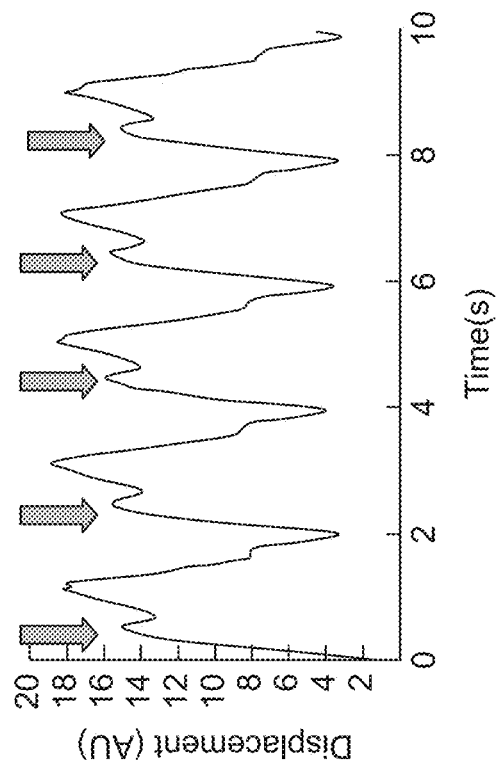
FIGS. 55-56 are representative traces of contractility of human cardiac OOC. Arrows indicate proarrthymic events.
Figure 55:
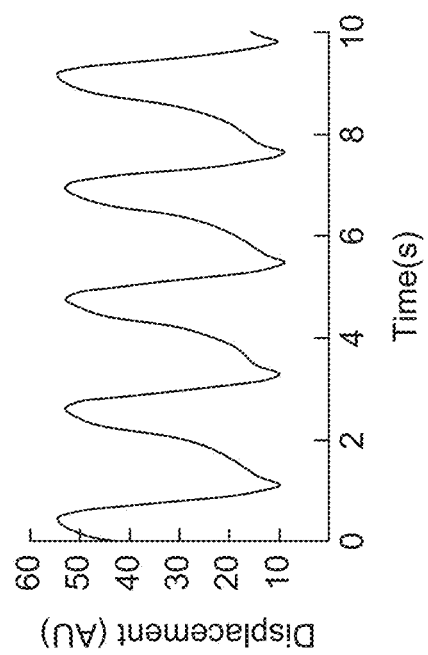

Recapitulation of physiological responses of the heart organ-on chip model to cancer therapeutics: After validating the cardiac OOC, the model was used to study linsitinib, which has been shown effective in the 3D human bone tumor model. Tissues were exposed to the same therapeutic concentration profiles of linsitinib as the bone tumor models. The cardiac model responded by increased beating frequency after 3 days of exposure to the drug, and without changes in the relaxation time or peak width (FIGS. 52-54). The contractility traces of tissues exposed to linsitinib showed the occurrence of proarrythmic events (FIGS. 55-56).

Figure 57:
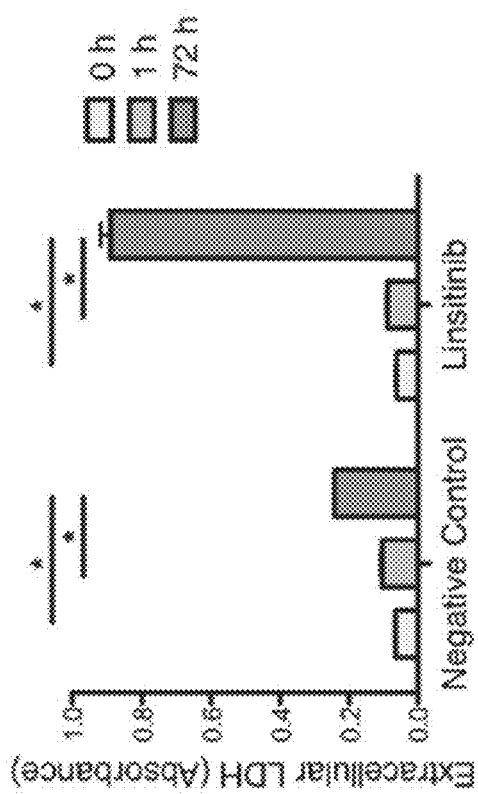
FIG. 57 is a graph illustrating extracellular LDH after linsitinib exposure (mean±s.e.m., n=3 biologically independent samples per group).
Figure 58:
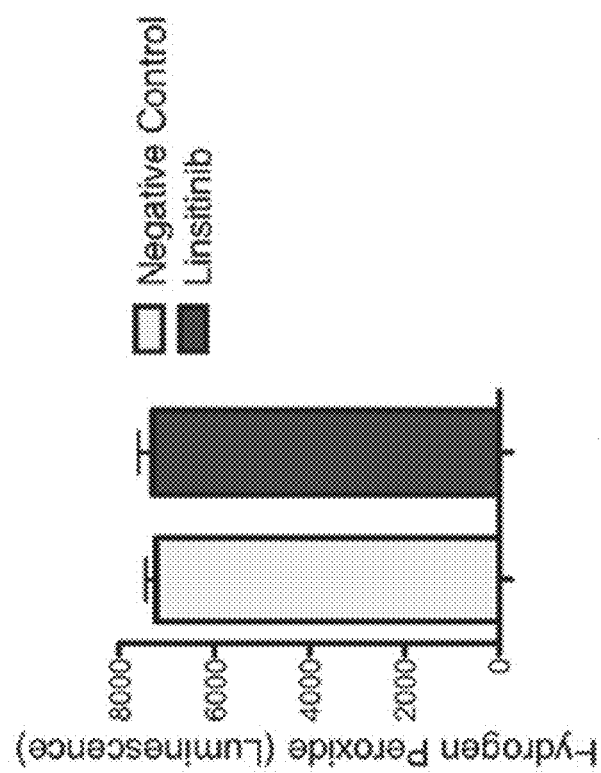
FIG. 58 is a graph illustrating hydrogen peroxide formation after linsitinib treatment (mean±s.e.m., n=5 biologically independent samples per group).

The cardiac organ-on-chip model presented increased levels of extracellular lactate dehydrogenase (LDH), which is released from damages cells, thus serving as a biomarker of cellular toxicity and cytolysis (FIG. 57). However, increases in levels of reactive oxygen species were not observed (FIG. 58).

Figure 59:
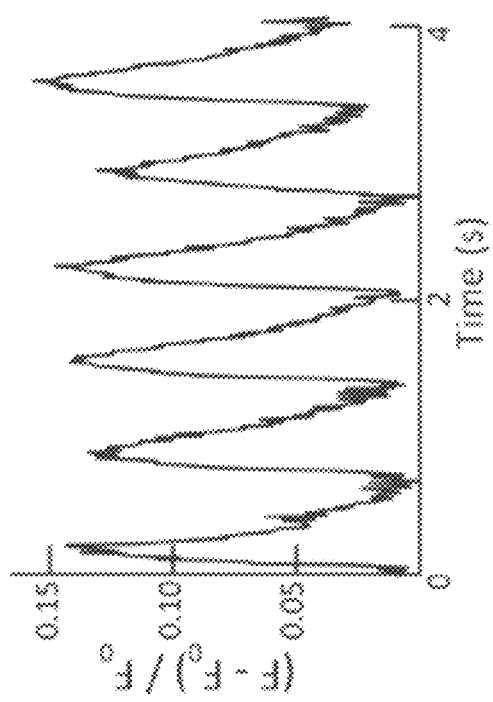
FIGS. 59-60 are representative traces of calcium transients of human cardiac OOC after isoproterenol exposure (1°µM). Arrows point to proarrthymic events *P<0.05 by two-way ANOVA with Bonferroni post-test.
Figure 60:
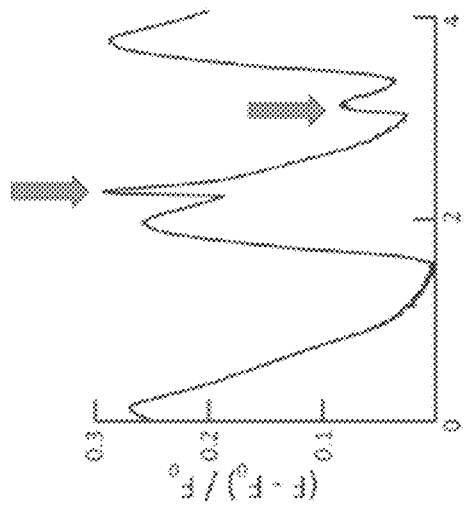

When the tissues exposed to lisitinib were subsequently exposed to isoproterenol, the inotropic responses were not observed and instead the tissues presented proarrhthymic events (FIGS. 59-60).

Overall, linsitnib induced tachycardia and proarrhythmic events, decreased cell viability, and altered the physiological responses to isoproterenol in cardiac tissues. These findings indicate that human cardiac OOC models could serve as models for testing of cardiotoxicity.

The predictive capacity of human OOC systems for preclinical screening of anticancer drugs is demonstrated. The models currently used to screen drug efficacy and safety fail to successfully predict clinical responses, thus limiting the development of much needed cancer therapeutics. To address this need, an OOC model disclosed herein for efficacy screening provides the cancer cells with the native-like microenvironment of the bone tumor, and also developed an OOC model for screening of cardiotoxic effects of cancer drugs.

The OOC models were validated by demonstrating the responses to drugs with known clinical effects. The ability to recapitulate clinically observed responses was further demonstrated by testing of linsitinib in all OOC models (four tumor OOCs: metastatic and nonmetastatic ES and OS; cardiac OOC), by measured anticancer drug efficacy in tumor OOCs and proarrhythmic side effects in cardiac OOC.

The materials and methods used are discussed herein.

Cell culture: Human iPSC cells were obtained from B. Conklin, Gladstone Institute (WTC-11 line); maintained in mTeSR™1 medium (STEMCELL Technologies), changed on a daily basis, on 1:60 growth-factor-reduced Matrigel (Corning) and passaged when 85-90% confluent using 0.5 mM EDTA (Invitrogen). For the first 24 hours (h) after passaging, the culture medium was supplemented with 5 µM Y-27632 dihydrochloride (Tocris).

Human mesenchymal stem cells (MSCs) were isolated from commercially obtained fresh bone marrow aspirates (Cambrex) by attachment to the plastic surface, as previously described. Cells were expanded to the fourth passage in mesenchymal stem cell medium consisting of high glucose Dulbecco's modified Eagle's medium (DMEM; Thermo Fisher Scientific) supplemented with 10% fetal bovine serum (FBS; Thermo Fisher Scientific), 1% penicillin-streptomycin (Life Technologies), and 0.1 ng ml-1 bFGF (Life Technologies).

Ewing sarcoma (ES) cell lines: metastatic SK-N-MC (HTB-10) and non-metastatic RD-ES (HTB-166) were obtained from the American Type Culture Collection (ATCC). SK-N-MC cells were cultured in Eagle's Minimum Essential Medium (EMEM; ATCC) and RD-ES cells were cultured in RPMI-1640 Medium (ATCC), according to the manufacturer's specifications. Both culture media were supplemented with 10% FBS and 1% penicillin/streptomycin.

Osteosarcoma cell lines non-metastatic U2-OS (HTB-96), Saos-2 (HTB-85), and metastatic KHOS/NP (R-970-5) were also purchased from ATCC. U2-OS cells were cultured in DMEM supplemented with 10% FBS and 1% penicillin/streptomycin. Saos-2 cells were cultured in McCoy's 5A medium (ATCC) and KHOS/NP cells were cultured in EMEM, where both media were supplemented with 10% FBS and 1% penicillin/streptomycin.

The cells were maintained at 37° C. in Heracell™ 150 incubators (Thermo Fisher Scientific) with 5% $CO_2$. All cultures were maintained with 2 ml medium per 10 $cm^2$ of surface area and were routinely checked for *mycoplasma* contamination using a MycoAlert Plus Kit (Lonza). Pluripotent cells were routinely checked for expression of pluripotent markers.

GFP-Luciferase transduction and cell sorting: A LentiSuite for HIV-based system (System Biosciences) was used according to the manufacturer's instructions to generate stable, CMV-GFP-T2A-Luciferase vector expressing ES (SK-NMC and RD-ES), and OS cell lines (U2-OS, Saos2, KHOS/NP). Briefly, HEK-293T (CRL-3216) cells were transfected with lentiviral and the GFP-Luciferase vector of interest, viral particles were purified and concentrated using a PEG-it Virus Precipitation Solution (System Biosciences). Cancer cell lines were transduced with the virus at MOI=2 using Lipofectamine 3000 reagent (Thermo Fisher Scientific), according to the manufacturer's protocols. GFP+ transduced cancer cells were selected and sorted for using an Influx cell sorter (BD Biosciences) in the Columbia Center for Translational Immunology (CCTI), Flow Cytometry Core, at the Columbia University Medical Center.

3D bone matrix preparation: Calve metacarpal joints (Green Village Packing) were cut into axial sections 2 mm thick, using a vertical bandsaw. Sections to fabricate scaffolds were selected from a condyle region based on approximate pore size of 0.5 mm. In order to convert the sections into the desired scaffold geometry, they were cleaned under high-pressure streamed water, dried, and machined in a 3-axis computer numerical control (CNC) milling machine. The bone was machined with a standard two flute endmill to a final geometry of 4 mm×4 mm×1 mm (length×depth× thickness). To remove cellular material, the scaffolds were washed with 0.1% EDTA in phosphate-buffered saline (PBS; Santa Cruz Biotechnology), 0.1% EDTA in 10 mM Tris, and 0.5% SDS in 10 mM Tris, followed by treatment with a solution of DNase and RNase in 10 mM Tris buffer.

Decellularized bone scaffolds were thoroughly rinsed in deionized water and freeze-dried. The scaffolds within the density range of 0.37-0.45 mg/$mm^3$ where sterilized in 70% ethanol and conditioned in mesenchymal stem cell medium overnight before seeding with cells. To demonstrate the effectiveness of the decellularization protocol, DNA content of the bone before and after decellularization was quantified using Quant-iT™ PicoGreen™ dsDNA Assay Kit (Thermo Fisher Scientific) following the manufacturer's protocol and as previously described.

Tissue engineered bone tumor models: Using an established protocol, expanded MSCs were seeded into the bone matrix scaffolds (4 mm×4 mm×1 mm) at a concentration of $10^6$ cells per scaffold, using 40 µL of medium. The cells were allowed to attach for 2 hours, and then supplemented with additional mesenchymal stem cell medium overnight. The following day, osteogenic differentiation of the seeded cells was initiated by addition of low glucose DMEM supplemented with 1 µM dexamethasone (Sigma-Aldrich), 10 mM β-glycerophosphate (SigmaAldrich), and 50 µM L-ascorbic acid-2-phosphate (Sigma Aldrich). Each scaffold was incubated in 4 mL of osteogenic media, with media changes three times a week, for 3 weeks, allowing for the MSCs to differentiate into functional, maturing osteoblasts.

Two weeks following the initiation of osteogenic differentiation, aggregates of tumor cells were prepared as described previously. Briefly, 0.3×$10^6$ cells were used to form ES aggregates and 0.5×$10^6$ cells were used to form OS aggregates. After 1 week of culture, the primary bone tumor aggregates were infused into the differentiated osteoblast-seeded bone scaffolds (3 aggregates per scaffold, placed apart of each other). Tumor models were established for each of the two ES cell types (non-metastatic RD-ES, metastatic SK-NMC) and three OS cell types (non-metastatic U2-OS and Saos2, metastatic KHOS/NP). TE-RD-ES were cultured in the RPMI medium, TE-U-2 OS in DMEM, TE-Saos2 in McCoy's 5A, and TESK-N-MC and TE-KHOS/NP both in EMEM. Scaffolds without aggregates were used as healthy bone controls for each tumor model (termed TE-bone) and were cultured in the respective cancer cell line medium. All culture media were supplemented with 10% FBS and 1% penicillin/streptomycin.

Cardiac differentiation: Cardiac differentiation of human iPS cells was initiated in 90% confluent cell monolayers by replacing the mTeSR™1 medium with CDM3 (chemically defined medium with 3 components, which consists of RPMI Medium 1640 (1×, Gibco), 500 µg/mL of recombinant human albumin (Sigma-Aldrich) and 213 µg/mL of L-Ascorbic Acid 2-phosphate (Sigma-Aldrich)). Medium was changed every 48 h. For the first 48 h, medium was supplemented with 3 µM of the glycogen synthase kinase 3β inhibitor CHIR99021 (Tocris). On day 2 of differentiation, medium was changed to CDM3 supplemented with 2 µM of the Wnt inhibitor Wnt-C59 (Tocris). After day 4 of differentiation, medium was changed with CDM3 with no supplements. Contracting cells were noted around day 10, medium was changed to RPMI Medium 1640 supplemented with B-27™ Supplement (50×; Gibco) and were subsequently used in experiments without selection for cardiomyocytes.

Cardiac platforms: Tissues were formed onto polydimethylsiloxane (PDMS, Dow Corning Sylgard 184) pillars that were molded onto a polycarbonate support frame. Pillar modules were designed to interface with both the forming tissues and the OOC platform by press-fit installation.

The pillars were formed by centrifugal casting of PDMS through, and extending from, the polycarbonate support structures. The supports were first inserted into Delrin (polyoxymethylene) molds fabricated by CNC machining and PDMS with a 10:1 ratio of silicone elastomer base to curing agent was centrifugally cast at the relative centrifugal force (RCF) of 400 for 5 min, and cured in an oven at 60° C. for 1 hour.

The resulting component consisted of one pair of pillars to support the formation of one tissue. Pillars were 1 mm in diameter, 9 mm in length, spaced at the 6 mm axis-to-axis distance, and designed to subject the tissues to mechanical loading, mimicking the forces human myocardium are exposed in the heart. Hydrogel compaction caused passive tension in the tissues, as they were stretched between the two pillars, inducing elongation and alignment.

Tissues were formed on PDMS pillars by inserting the pillars into a formation reservoir (9 mm length×3.2 mm width×4.3 mm depth) that surrounded the pillars and was filled with 100 µL of cell suspension in hydrogel. An array of 6 formation reservoirs accommodates formation and subsequent culture of 6 individual tissue modules.

The tissue culture platform thus consisted of 12 fixture locations for 12 pillar/tissue modules, the size and spacing of which is based on a 48 well plate pattern.

Cardiac model development: Cardiac tissues were formed by cell encapsulation in fibrin hydrogel. Human iPS cell-derived cardiomyocytes at day 16 of differentiation were combined with normal human dermal fibroblasts (NHDF; Lonza) at a ratio of 75% hiPSC-CMs and 25% NHDF, for a total of 1 million cells per tissue. The hydrogel was formed by mixing 33 mg/mL of fibrinogen from human plasma (Sigma-Aldrich) with 25 U/mL of thrombin from human plasma (Sigma-Aldrich), on a 84:16 ratio. The hydrogel mixed with the cells was dispensed into each well of the tissues formation reservoir and allowed to polymerize at 37° C. for 15 min before adding RPMI Medium 1640 supplemented with B-27™ containing 0.2 mg/ml aprotinin (Sigma-Aldrich). Subsequently, medium was changed every other day supplemented with 0.2 mg/ml aprotinin for the first 7 days. After 7 days, tissues were used in experiments.

Drug treatments: Cardiac tissues were validated using caffeine (50 mM in water; Sigma-Aldrich), amiodarone hydrochloride (2.42 µM in DMSO; Sigma-Aldrich), isoproterenol hydrochloride (a series of different drug concentration in water; Sigma-Aldrich) and doxorubicin hydrochloride (1 µM in water; Sigma-Aldrich), all diluted in RPMI Medium 1640 supplemented with B-27™.

Linsitinib (OSI-906) (Santa Cruz Biotechnology) was dissolved at a 10 mM concentration in DMSO (Corning) and mixed in with the respective cell medium at a 12 µM concentration unless otherwise noted. Tissues were randomly assigned to experimental groups. Medium was changed every day. Cardiac tissues were exposed to linsitinib for 3 days.

The bone tumor models were exposed to a physiological treatment regimen consisted of cycles that involved 3 consecutive days of treatment followed by 4 days without drug, unless otherwise stated.

Histology: Samples were washed in PBS, fixed in 10% formalin at room temperature for 24 hours, and decalcified for 24 hours with Immunocal solution (Decal Chemical Corp.). Samples were then dehydrated in graded ethanol solutions, paraffin embedded, and sectioned to 5 µm thickness. For immunohistochemistry, tissue sections were deparaffinized with CitriSolv (Thermo Fisher Scientific) and rehydrated with graded series of ethanol washes. Antigen retrieval was performed by incubation in citrate buffer (pH 6) at 90° C. for 30 min, while endogenous peroxidase activity was blocked with 3% $H_2O_2$. After washing with PBS, sections were blocked with horse serum (Vector Labs) and stained with primary antibodies overnight in a humidified environment.

The primary antibodies used were polyclonal rabbit IgG to CD99 (1:500; ab108297), polyclonal rabbit IgG to phosphorylated IGF-1R (1:50; ab39398), polyclonal rabbit IgG to Ki67 (1:100; ab15580), polyclonal rabbit IgG to EPHA2 (1:200, ab5386) and polyclonal rabbit IgG to CD133 (1:100; ab19898). After washing with PBS, samples were incubated with anti-rabbit secondary antibodies for 1 h at 25° C. and developed as described previously (Vector Laboratories).

Slides were counterstained with Hematoxylin QS (Vector Labs). The low-magnification—high-resolution images of histological sections were obtained by digitizing the tissue sections using the Olympus dotSlide 2.4 digital virtual microscopy system (Olympus) at a resolution of 0.32 µm.

To assess apoptosis, paraffin embedded tissue sections were first deparaffinized with CitriSolv, rehydrated with graded series of ethanol washes, and then stained with a Click-iT® TUNEL Alexa Fluor® imaging assay (Thermo Fisher Scientific). Following nuclear counterstaining with DAPI (Life Technologies), the TUNEL labelled slides were imaged with an IX81 inverted fluorescent microscope (Olympus) and a Pike F032B camera (ALLIED Vision), using NIS-Elements AR software, and processed using ImageJ (NIH).

Quantitative real-time PCR: Total RNA was isolated using Trizol (Life Technologies), following the manufacturer's instructions. RNA preparations (2 µg) were treated with a High-Capacity cDNA Reverse Transcription Kit (Applied Biosystems) to generate cDNA. Quantitative real-time PCR was performed using Fast SYBR™ Green Master Mix (Applied Biosystems). mRNA expression levels were quantified applying the ΔCt method, ΔCt=(Ct of gene of interest—Ct of β-Actin). Primer sequences were those reported in our previous studies.

Contractility videos: Tissue contractility was measured by tracking the change in tissue area as a function of time. Live-cell, bright-field videos were acquired at rates of up to 100 frames per second using a Zyla 4.2 sCMOS camera (Andor) controlled with custom software. Acquired video frames were inverted and an automated intensity threshold was used to identify cell location in the video frame.

First, a baseline time point in the video corresponding to a relaxed tissue state was selected. Absolute differences in cell area from the baseline frame were then calculated to create a time course of cell area dynamics as a function of time. The resulting time courses were analysed using a native MATLAB (MATHWorks) automated peak finding algorithm to determine locations of maximum cell contraction indicated by the locations of local maxima in the time courses.

Beat period lengths were determined from the length of time between the pairs of local maxima. Beat frequencies were determined by inverting beat periods; relaxation times were measured from the length of time required for the tissue to relax from the peak contraction amplitude of the local maxima to the calculated relaxation amplitude.

Cell viability: Cancer cell viability was measured for GFP-Luciferase labelled cancer cells using ONE-Glo luciferase substrate that was prepared according to manufacturer's protocol (Promega). Samples were collected following 3, 7, and 21-day cycles of Linsitinib treatment. Cardiac cell viability was assessed through the Pierce LDH Cytotoxicity Assay Kit (Thermo Fisher Scientific). Samples were collected at 0 h, 1 h and 72 h.

Hydrogen peroxide assay: After drug treatment, hydrogen peroxide ($H_2O_2$) levels in cardiac tissues were measured using ROS-Glo™ H2O2 Assay (Promega).

Isoproterenol response: Samples were loaded with Fluo-4, AM, cell permeant (Invitrogen) in RPMI Medium 1630 supplemented with B27 for 30 min at 37° C. Videos were acquired at a rate of 100 frames per second using a Zyla 4.2 sCMOS camera as described in 'Contractility analysis'. Videos were analysed in MATLAB using a custom script that calculated the temporal changes in calcium fluorescence intensity. Each frame was normalized to a baseline background region chosen by the user to give baseline-corrected changes in minimum and maximum fluorescence values for each frame. The temporal changes in fluorescence intensity were presented in calcium transient traces from which the measurements were obtained. The calcium transient timing was determined as the peak-to-peak values of two successive beats as defined by the peak maxima.

Calcium transient traces were also analyzed 10 minutes after exposure to 1 µM isoproterenol hydrochloride, diluted in RPMI Medium 1630 supplemented with B27™.

Statistical methods: Data were analyzed in Excel (Microsoft) and graphed in Prism (GraphPad). Data are presented as mean±SEM. Significant differences defined by $P<0.05$ for all statistical methods unless otherwise noted. No blinding or randomization was used. Differences between experimental groups were analyzed by unpaired, two-tailed Student's t-test or two-way ANOVA with Bonferroni post-test.

Figure 61:
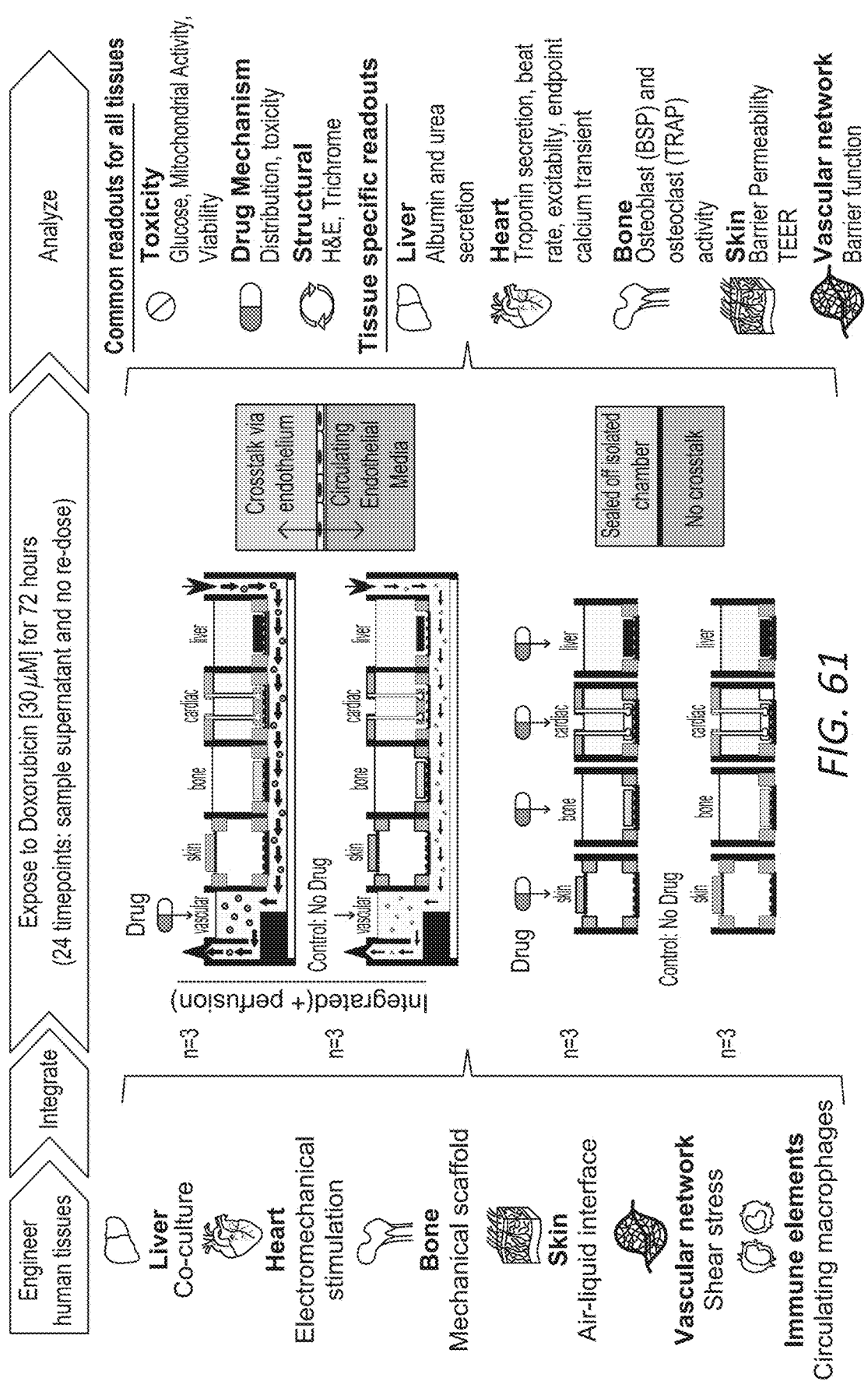
FIG. 61 illustrates a Doxorubicin drug study design.

Treatment with the anticancer drug Doxorubicin (Dox) revealed physiological off-target responses at a clinical therapeutic cumulative dose of 30 µM, as determined by dosing according to the surface area of the tissues to correspond directly to how patient dosages are administered clinically. Common tissue responses were measured for each tissue individually, 72 hours after their assembly into the integrated platform and exposure to 30 µM concentration of doxorubicin introduced into the circulatory perfusion. FIG. 61 illustrates the Doxorubicin (Dox) drug study design including four conditions tests (integrated control, integrated Dox, isolated control, isolated Dox).

Figures 65, 66:
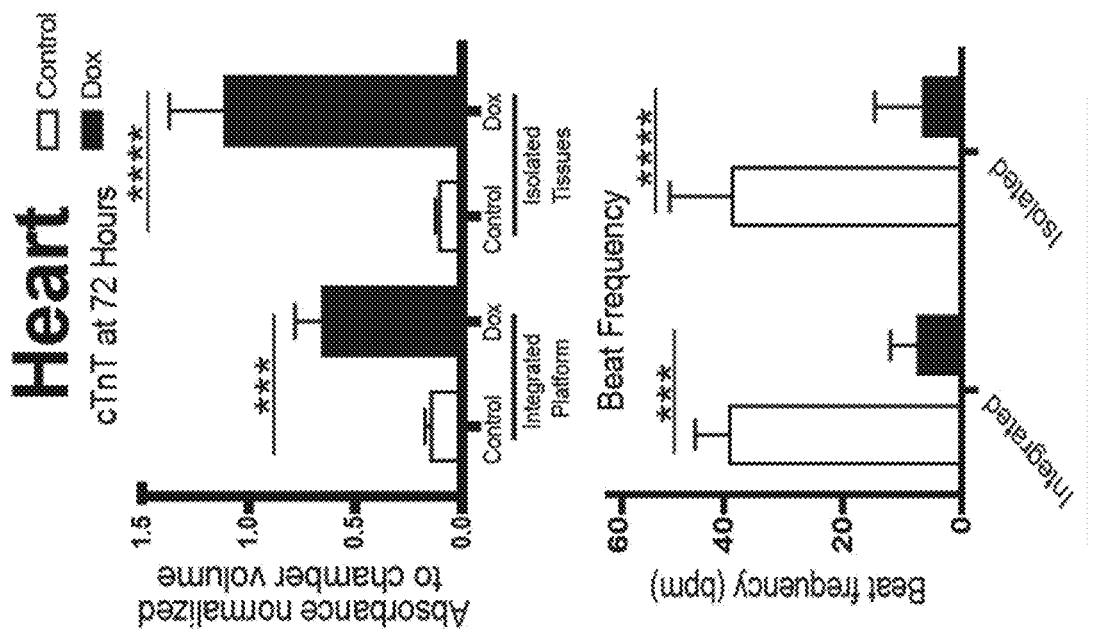
FIGS. 65-66 are graphs representing functional changes to the cardiac compartment.
Figure 67:
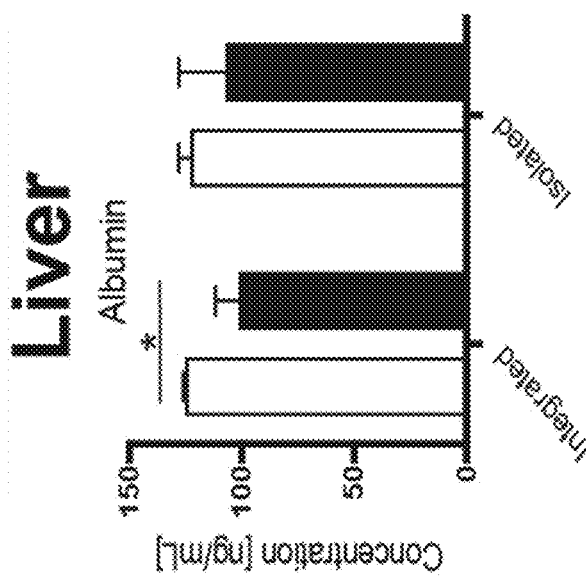
FIGS. 67-68 are graphs representing changes in liver functionality.
Figure 68:
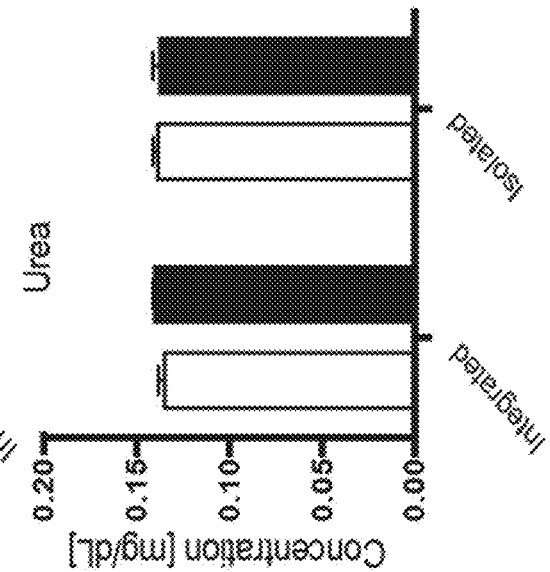
Figure 69:
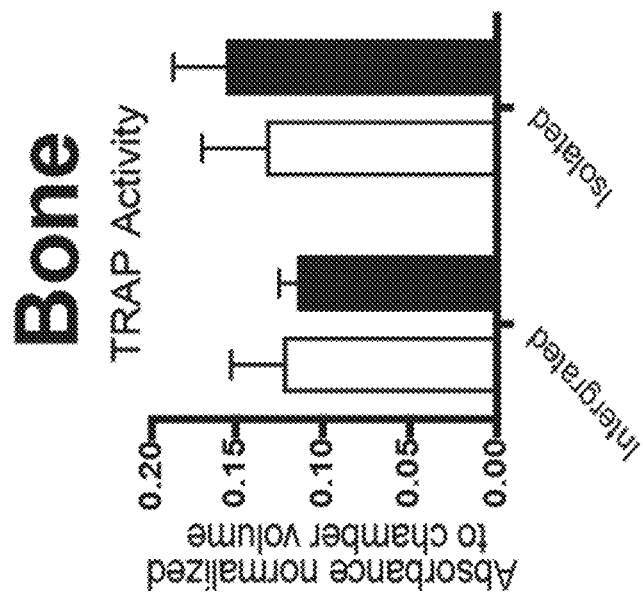
FIG. 69 is a graph representing changes in bone remodeling (via TRAP activity.)
Figure 70:
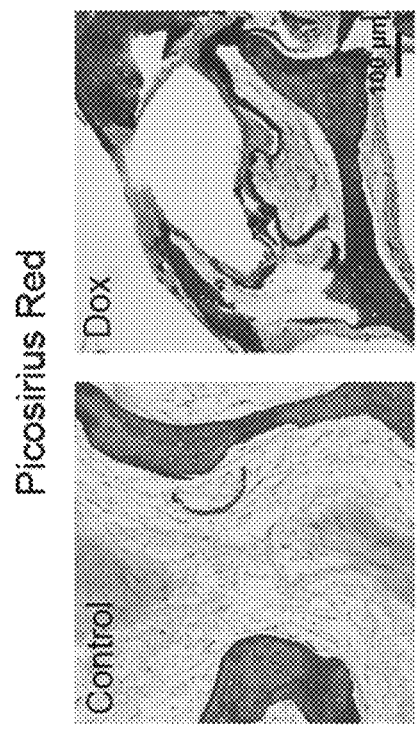
FIG. 70 is a Picosirius Red staining of collagen demonstrating changes of soft tissue within the bone matrix after 72 hours.
Figure 71:
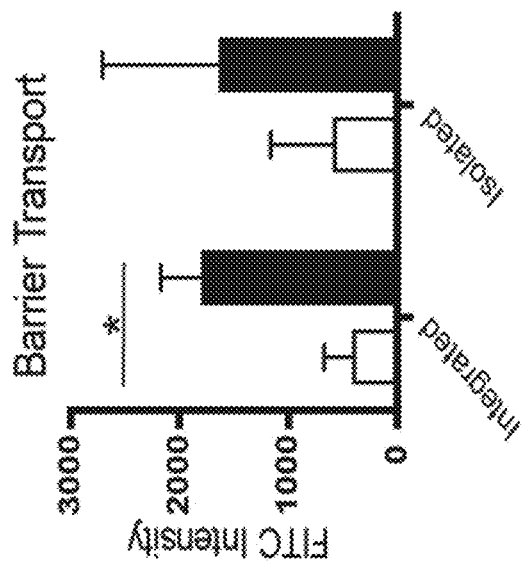
FIGS. 71-72 are graphs representing changes in skin barrier transport and TEER functionality.
Figure 72:
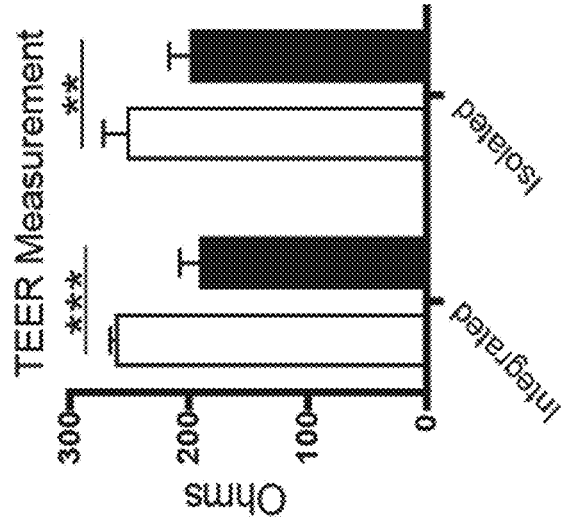

All three measured toxicity readouts: cell viability (FIG. 62), glucose consumption (FIG. 63), and mitochondrial activity (FIG. 64), showed significant decreases for all tissue types. To evaluate changes in cardiac cell viability and metabolism in response to doxorubicin, we measured the decreased contractile and conductive behavior (as the most sensitive indicator of toxicity), cell metabolism, cell viability, and the increased release of troponin to correlate with clinical measures of cardiac cell damage and death (FIGS. 65 and 66). Liver tissues show decreased albumin and unaffected urea production, as seen clinically [ref], only in the integrated experimental groups (FIGS. 67 and 68). Bone tissues show stable TRAP responses (FIG. 69) but increased cell death within histological sections (FIG. 70), suggesting that osteoblasts are potentially more affected by Dox than osteoclasts. As expected for skin tissues, the transport permeability increased (FIG. 71) and electrical resistance decreased in response to Dox (FIG. 72), with comparable values for the isolated skin culture and integrated platform. The permeability of the vascular endothelium, measured by transport of 3 kDa FITC dextran, markedly increased following exposure to Dox, suggesting that the vasculature can become more leaky in response to endothelial cell toxicity, as observed in vivo.

Additionally, we evaluated miRNAs as novel early biomarkers of off-target Dox cardiotoxicity. Using the identical GeneChip™ miRNA 4.0 Array (ThermoFisher) as used clinically and in previously-published monolayer studies, we found that our heart tissues show both upregulated and downregulated miRNAs that more closely match clinical results as compared to iPSC-derived cardiomyocytes in monolayer culture (FIG. 73), detailing the predictive power of our matured and integrated tissues. Compared miRNAs from integrated tissues show fold changes in the same directions as those clinically measured, whereas our 3D isolated heart tissues failed to recapitulate the correct magnitude in several cases (miR-143-3p, miR-320a, and miR145-5p). Notably, these miRNAs are related to immune modulated cardiac injury and signaling from other organs, further supporting the use of the InterOrgan platform in recapitulating appropriate human responses.

Another embodiment of the OOC platform is disclosed and illustrated in FIGS. 74-81. As illustrated in FIG. 74, OOC platform 702 includes a plurality of apertures 703 for receiving components, such as components 718, 720, 730, 732 and 734. Platform 702 includes a plurality of apertures 750 (illustrated in dashed lines) as described below. Components 718 and 720 provide for the introduction and removal of vascular medium 116 into the platform 702. Components 730, 732, and 734 provide wells or chambers 708 for the culture of tissue-engineered organoids as discussed herein with respect to platforms 102, 202, 302, 502 and 602. Platform 702 supplies vascular medium 116 to the tissue chambers 708 via a channel, in which the channel is a porous tube 706. The platform 702 is modular. As illustrated in FIG. 74, components 718, 720, 730, 732 and 734 are selected and positioned within apertures 703 as required for a particular tissue culture study.

Figure 75:
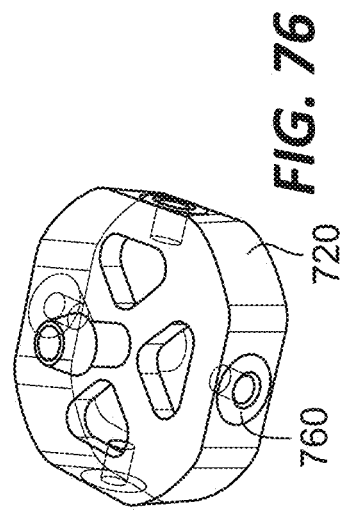
FIGS. 75-76 are perspective views of inlet and outlet flow components, respectively, of the OOC platform of FIG. 74.

As illustrated in FIG. 75, inlet component 718 received the vascular medium 116, e.g., from a pump (not shown) and supplies the medium to the various tissue culture components 730, 732, 734.

Figure 76:
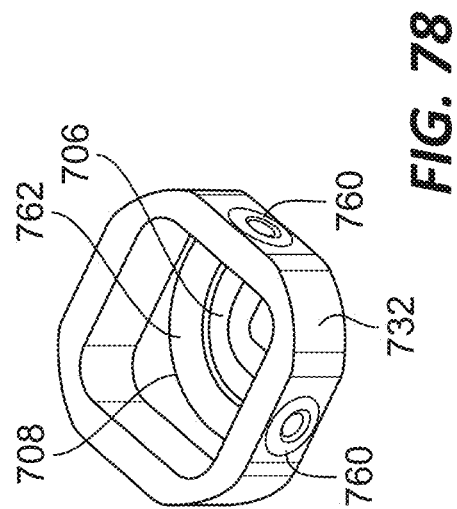

As illustrated in FIG. 76, outlet component 720 receives the vascular medium 116 from the various tissue culture components 730, 732, 734 for recirculation.

Figure 77:
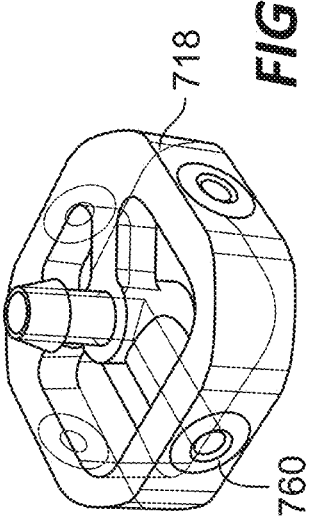
FIGS. 77-79 are perspective views of tissue culture wells of the OOC platform of FIG. 74.
Figure 78:
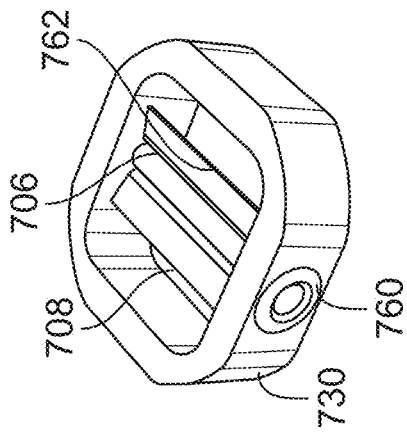
Figure 79:
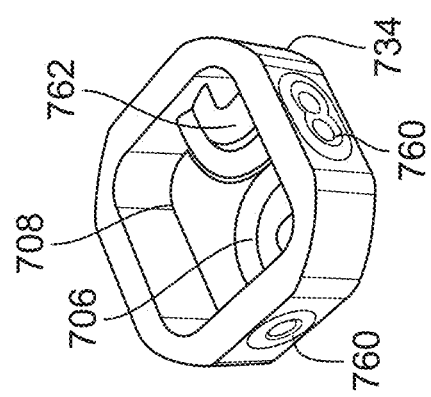

Tissue culture components 730, 732, 734 are illustrated in FIGS. 77, 78 and 79, respectively. Each tissue culture component includes a well or chamber 108 for containing a tissue-specific medium (as discussed above regarding tissue-specific medium 110) and a tissue-engineered organoid (as discussed above regarding organoids 112). A porous tube 706 carries vascular medium 116 into the chamber via inlets/outlets 760. The porous tube 706 is fabricated from a porous membrane (as discussed above regarding porous membrane 104, to which a layer of endothelial cells forming an endothelial barrier 114 is bonded). Thus an exchange between the vascular medium 116 and the tissue-specific medium 110 occurs as discussed herein above.

Component 730 (FIG. 77) includes a straight porous tube 706 and two ports 760. Component 732 (FIG. 78) includes a porous tube 706 having a right angle configuration and two ports 760. Component 734 (FIG. 79) include two porous tubes 706, each having a right angle configuration. Component 734 includes two inlet ports 760 and a single outlet port 760. When components 730, 732, and 734 are inserted into platform 702, the ports 760 are in communication with the apertures 705 of the platform in order to establish fluid flow.

FIGS. 80 and 81 illustrate a technique for manufacture of the porous tube 706. As illustrated in FIG. 80, one or more layers of porous membrane 704 are placed over a temporary forming tube 764. By use of an overmolding process, thermoplastic membranes 762 are applied that maintain the central lumen form of the porous rods 706.

While the disclosed subject matter is described herein in terms of certain non-limiting exemplary embodiments, those skilled in the art will recognize that various modifications and improvements may be made to the disclosed subject matter without departing from the scope thereof. Moreover, although individual features of one embodiment of the disclosed subject matter may be discussed herein or shown in the drawings of the one embodiment and not in other embodiments, it should be apparent that individual features of one embodiment may be combined with one or more features of another embodiment or features from a plurality of embodiments. In addition to the specific embodiments claimed below, the disclosed subject matter is also directed to other embodiments having any other possible combination of the dependent features claimed below and those disclosed above. As such, the particular features presented in the dependent claims and disclosed above can be combined with each other in other manners within the scope of the disclosed subject matter such that the disclosed subject matter should be recognized as also specifically directed to other embodiments having any other possible combinations. Thus, the foregoing description of non-limiting example embodiments of the disclosed subject matter has been presented for purposes of illustration and description. It is not intended to be exhaustive or to limit the disclosed subject matter to those embodiments disclosed herein.

What is claimed is:

1. A modular microphysiological system, comprising:
two or more inserts each defining a well formed by a wall portion surrounding the well, the well extending between a top portion and a bottom portion, the top portion defining a first opening and the bottom portion defining a second opening, and the bottom portion including a permeable membrane positioned across at least part of the second opening; and
a platform defining two or more chambers each configured to receive a corresponding insert of said two or more inserts,
wherein a flow channel is formed between the platform and the two or more inserts when each of said two or more inserts is received by a corresponding chamber of said two or more chambers, and
wherein each of the two or more chambers extends from a top portion of each chamber to a bottom portion of each chamber and the bottom portion of each of the two or more chambers defines an aperture configured to receive a corresponding insert of the two or more inserts.

2. The modular microphysiological system of claim 1, wherein the two or more inserts each further comprise an endothelial barrier formed from a layer of endothelial cells.

3. The modular microphysiological system of claim 2, wherein the endothelial barrier is adhered to the permeable membrane.

4. The modular microphysiological system of claim 1, wherein the second opening defined at the bottom portion of each of the two or more inserts is about 8 mm by 4 mm.

5. The modular microphysiological system of claim 1, wherein the permeable membrane comprises pores of about 20 pm.

6. The modular microphysiological system of claim 1, wherein a recess is defined in the wall portion of each of the two or more inserts and the recess is configured to receive a sealing ring.

7. The modular microphysiological system of claim 1, wherein the platform further comprises a pump configured to circulate a vascular fluid in said flow channel.

8. The modular microphysiological system of claim 1, wherein the platform further includes an inlet reservoir and an outlet reservoir, and said flow channel is in fluid communication with the inlet reservoir and outlet reservoir.

9. The modular microphysiological system of claim 1, further comprising a rocker mechanism, wherein the rocker mechanism includes a base plate and a pivot fixed to the base plate, wherein the pivot is capable of limited rotation about the base.

10. The modular microphysiological system of claim 1, further including two or more tissues each disposed in a corresponding insert of said two or more inserts, wherein the two or more tissues are selected from cardiac tissue, skin tissue, liver tissue, bone tissue, immune tissue, vascular tissue and lung tissue.

11. The modular microphysiological system of claim 10, wherein said two or more tissues are derived from induced pluripotent stem cells.

12. The modular microphysiological system of claim 11, wherein said induced pluripotent stem cells are derived from the same subject.

13. An integrated modular microphysiological system, comprising:
two or more inserts each disposed in a corresponding chamber of two or more chambers defined in a platform, the two or more inserts each defining a well formed by a wall portion surrounding the well, the well extending between a top portion and a bottom portion, the top portion defining a first opening and the bottom portion defining a second opening, and the bottom portion including a permeable membrane positioned across at least part of the second opening and an endothelial barrier disposed on the permeable membrane, wherein a flow channel is formed between the platform and the two or more inserted inserts, each of the two or more chambers extending from a top portion of each chamber to a bottom portion of each chamber and the bottom portion of each of the two or more chambers defining an aperture configured to receive a corresponding insert of the two or more inserts.

14. The integrated modular microphysiological system of claim 13, wherein the endothelial barrier of the two or more inserts is in fluid communication with the flow channel.

15. The integrated modular microphysiological system of claim 14, wherein the flow channel contains vascular fluid, and the system includes a fluid management system configured to circulate the vascular fluid at a defined shear rate.

16. The integrated modular microphysiological system of claim 13, wherein the channel is in fluid communication with at least one inlet or outlet, and each of said two or more inserts is in fluid communication with a media inlet flow path and a media outlet flow path.

17. The integrated modular microphysiological system of claim 13, further comprising a tissue disposed in each of the two or more inserts, wherein the tissue is selected from cardiac tissue, skin tissue, liver tissue, bone tissue, immune tissue, vascular tissue and lung tissue.

18. The integrated modular microphysiological system of claim 17, wherein the tissue is derived from induced pluripotent stem cells.

19. The integrated modular microphysiological system of claim 18, wherein said induced pluripotent stem cells are derived from the same subject.

20. The integrated modular microphysiological system of claim 13, further comprising a rocker mechanism configured to apply fluidic shear to the endothelial barrier, wherein the rocker mechanism includes a base plate and a pivot fixed to the base plate, wherein the pivot is capable of limited rotation about the base.

21. The modular microphysiological system of claim 1, wherein each of the two or more inserts is configured to extend through a corresponding aperture of the two or more chambers such that each of the two or more inserts extends through the platform when each of the two or more inserts is received by the corresponding aperture of the two or more chambers.

\* \* \* \* \*